United States Patent
Suffern et al.

(10) Patent No.: US 6,693,997 B1
(45) Date of Patent: *Feb. 17, 2004

(54) HOST COMPUTER DIGITAL SIGNAL PROCESSING SYSTEM FOR COMMUNICATING OVER VOICE-GRADE TELEPHONE CHANNELS

(75) Inventors: Robert C. Suffern, Chicago, IL (US); Andrew L. Norrell, Nevada City, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/609,096

(22) Filed: Jun. 30, 2000

Related U.S. Application Data

(63) Continuation of application No. 09/246,738, filed on Feb. 8, 1999, now Pat. No. 6,097,794, which is a continuation of application No. 08/948,833, filed on Oct. 10, 1997, now Pat. No. 5,872,836, which is a continuation of application No. 08/466,079, filed on Jun. 6, 1995, now Pat. No. 5,724,413, which is a continuation of application No. 08/037,075, filed on Mar. 25, 1993, now Pat. No. 5,646,983.

(51) Int. Cl.[7] .............................................. H04M 11/00
(52) U.S. Cl. ................................ 379/93.28; 379/93.05; 379/93.32; 375/222
(58) Field of Search .......................... 379/88.03, 93.17, 379/93.26, 93.28, 93.32–93.33, 90.01, 93.01, 93.05, 100.15, 100.01; 375/222, 232, 219, 224, 354–356; 370/290, 354; 348/14; 358/406

(56) References Cited

U.S. PATENT DOCUMENTS

| | | | |
|---|---|---|---|
| 4,085,449 A | 4/1978 | Walsh et al. | 375/222 |
| 4,453,259 A * | 6/1984 | Miller | 375/355 |
| 4,455,661 A | 6/1984 | Qureshi | 375/222 |
| 4,518,823 A | 5/1985 | Kessler | 379/93.07 |
| 4,646,320 A | 2/1987 | Krishnan | 375/222 |
| 4,680,773 A | 7/1987 | Amundson | 375/222 |
| 4,700,358 A | 10/1987 | Duncanson et al. | 375/222 |
| 4,890,316 A | 12/1989 | Walsh et al. | 379/93.33 |
| 4,965,641 A | 10/1990 | Blackwell et al. | 379/93.28 |
| 4,989,221 A * | 1/1991 | Qureshi et al. | 375/222 |
| 5,008,901 A | 4/1991 | Wallach et al. | 375/222 |
| 5,170,470 A | 12/1992 | Pindar et al. | 375/222 |
| 5,175,633 A | 12/1992 | Saito et al. | 375/224 |
| 5,283,638 A | 2/1994 | Engberg et al. | 379/90.01 |
| 5,359,709 A | 10/1994 | Blanc et al. | 375/222 |
| 5,365,545 A | 11/1994 | Blackwell et al. | 375/222 |
| 5,646,983 A * | 7/1997 | Suffern et al. | 379/93.32 |
| 5,724,413 A * | 3/1998 | Suffern et al. | 375/222 |
| 5,872,836 A * | 2/1999 | Suffern et al. | 375/222 |
| 6,097,794 A * | 8/2000 | Suffern et al. | 379/93.32 |

OTHER PUBLICATIONS

CCITT Recommendation T.4 on "Standardization of Group 3 Facsimile Apparatus for Document Transmission."

The Theory and Practice Modem Design, by John A. C. Bingham, pp. 166–167, 226–231, and 282–286 (1988).

"Microcomputer RTTY . . . a Software TU—use your 8080 and very little else," 73 Magazine for Radio Amateurs, pp. 78–82 (Jul. 1979).

* cited by examiner

Primary Examiner—George Eng
(74) Attorney, Agent, or Firm—McDonnell Boehnen Hulbert & Berghoff

(57) ABSTRACT

A conventional computer is coupled to an analog telephone transmission link by means of an analog/digital conversion interface adapter. Modem transmission is accomplished by performing the modulation and demodulation functions digitally in the computer's existing processor which executes programs which transfer data between the computer's memory and the interface adapter. Using the same interface adapter and existing processor, the arrangement may be used to send and receive images in the form of standard V.29 format facsimile data, to send and receive data operating as a synchronous IBM 3270 compatible terminal device, or to record and play back conventional voice transmissions rather than data to implement a telephone answering, voice message handling, and telemarketing systems.

11 Claims, 3 Drawing Sheets

HOST COMPUTER DIGITAL SIGNAL PROCESSING SYSTEM FOR COMMUNICATING OVER VOICE-GRADE TELEPHONE CHANNELS

This is a continuation of application Ser. No. 09/246,738 filed Feb. 8, 1999 now U.S. Pat. No. 6,097,794, which is, in turn, a continuation of application Ser. No. 08/948,833, filed Oct. 10, 1997 and issued as U.S. Pat. No. 5,872,836, which is, in turn, a continuation of application Ser. No. 08/466,079, filed Jun. 6, 1995, and issued as U.S. Pat. No. 5,724,413, which is, in turn, a continuation of application Ser. No. 08/037,075, filed Mar. 25, 1993, and issued as U.S. Pat. No. 5,646,983.

COPYRIGHT NOTICE

A portion of the disclosure of this patent document contains material which is subject of copyright protection. The copyright owner has no objection to the facsimile reproduction by anyone of the patent document or the Patent and Trademark Office patent file or records, but otherwise reserves all copyright rights whatsoever. Copyright 1993 U.S. Robotics, Inc.

1. Field of the Invention

This invention relates to electronic communications systems and more particularly to a system for enabling a computer to transmit and receive information over an analog communications link.

2. Background of the Invention

Computers typically use modems to communicate digital information over voice-grade telephone lines. Such modems translate digitally expressed information from the computer into analog tone signals suitable for transmission over the voice-grade telephone facility, and convert such tones back into digital form when received from the telephone line.

High speed modems may advantageously employ digital signal processing techniques for translating outgoing digital data into a sequence of digital values each representing a desired analog output signal sample amplitude. These digital sample values may then be converted into analog form by a digital-to-analog converter for transmission over the telephone facility. Correspondingly, at the receiving station, the incoming analog signal may be converted into a train of digital sample amplitude values which are then processed to reconstruct the original digital data.

The processing of the digital sample values is complex and has heretofor been accomplished by one or more dedicated microprocessors which form the heart of the digital modem. For example, the 9600 baud HST modem manufactured by U.S. Robotics Corporation and described in U.S. Pat. No. 5,008,091 issued on Apr. 16, 1991 employs three microprocessors: (1) a transmitting microprocessor dedicated primarily to the translation of digital data into digital sample values; (2) a receiving microprocessor devoted primarily to the translation of sample amplitude values back into digital data; and (3) a supervisory microprocessor which serves as the interface to the computer to which the modem is connected.

SUMMARY OF THE INVENTION

The present invention, like the digital modems described above, employs analog/digital conversion methods to convert received analog signals into digitally expressed analog sample values and, during transmission, to convert digitally expressed sample values into analog form. Unlike prior digital modems, however, in the present invention the digital sample value signals are not processed by a separate processor or processors within the modem unit, but are rather processed by the microprocessor already present in the connected computer. As a consequence, the cost of the modem is substantially reduced because the need for separate processors is eliminated.

The arrangement contemplated by the invention is implemented by the combination of a conventional host computer employing a microprocessor and a low-cost interface unit consisting of telephone line adaptor circuitry, an analog/digital converter, and a direct digital interface to the host computer's system I/O bus. The telephone interface unit exchanges digitally-expressed analog sample amplitude values directly with the connected host computer, and the microprocessor within the host computer handles the remainder of the digital processing.

When operating as a modem, digital data can be processed into a sequence of digitally expressed sample values in accordance with a selected one of several accepted modem formats and transmission speeds. Given processors of speeds typically available, such modem processing can take place in real time to eliminate the need for storing the digital sample data in memory; for example, using the preferred embodiment of the invention to be described, a relatively slow Intel 80286 (IBM-AT class) processor operating at 12 mhertz has been shown to have adequate computational capability to perform the modulation and demodulation processing needed for 2400 baud full-duplex modem operation.

Without requiring any additional hardware, the system may be programmed to send and receive graphical data as standard V.29 format facsimile data, or to send and receive data synchronously operating, for example, as an IBM 3270 compatible terminal device. Moreover, when the digital sample values represent conventional voice transmissions rather than data, the system may be used to provide automated voice recording and playback functions to implement a telephone answering, voice message handling, and telemarketing systems.

These and other functions may be added or revised without requiring any hardware modifications by simply changing standard programs which execute on the host processor in standard ways.

These and other features and advantages of the present invention will become more apparent by considering the following detailed description of a preferred embodiment of the invention. In the course of this description, reference will frequently be made to the attached drawings.

DETAILED DESCRIPTION

Figure 1:
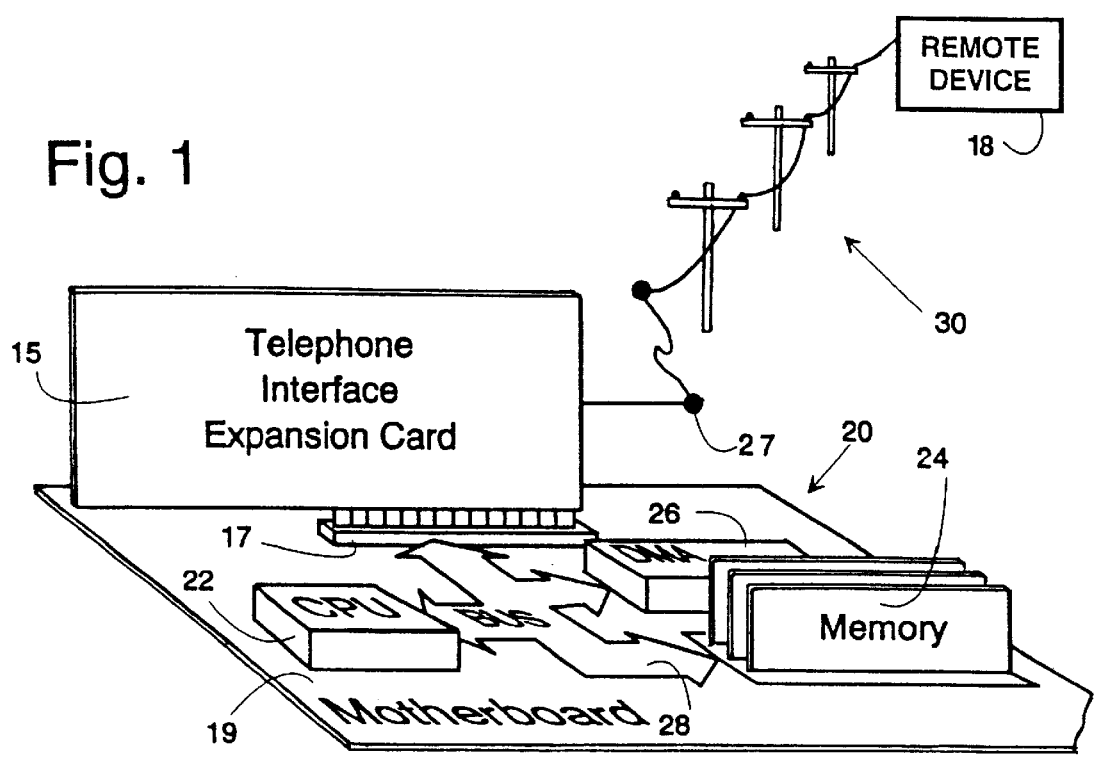
FIG. 1 illustrates the major hardware components of the preferred embodiment of the invention.

The preferred embodiment of the invention as illustrated in FIG. 1 consists of auxiliary components mounted on an expansion card 15 which plugs into an available socket 17 on the motherboard 19 of a conventional IBM-compatible Personal Computer indicated generally at 20. The host computer 20 includes a conventional single-chip integrated microprocessor 22 which executes programs stored in a RAM memory unit which is depicted in FIG. 1 as a group of SIMM (single inline memory module) devices 24 mounted on the motherboard 19. The RAM memory 24 is typically loaded with programs to be executed by the microprocessor 22 from their permanent storage location on a magnetic disk drive (not shown). The programs described which will be described below in connection with this preferred embodiment of the invention are executable on any IBM-compatible personal computer using the MS-DOS operating system. In order to provide adequate computational capacity, the microprocessor 22 is preferably be selected from the Intel 80286, Inte1386 or Inte1486 families of processors, or their functional equivalents, and should operate at a clock rate of at least 12 megahertz. In the description to follow, reference will also be made to the host computer's standard DMA (direct memory access) controller seen at 26 in FIG. 1. The host computer 20 includes an internal system bus 28 which interconnects the microprocessor 22, the random access memory 24, the DMA controller 26 and the expansion card 15 via the expansion socket 17.

Figure 2:
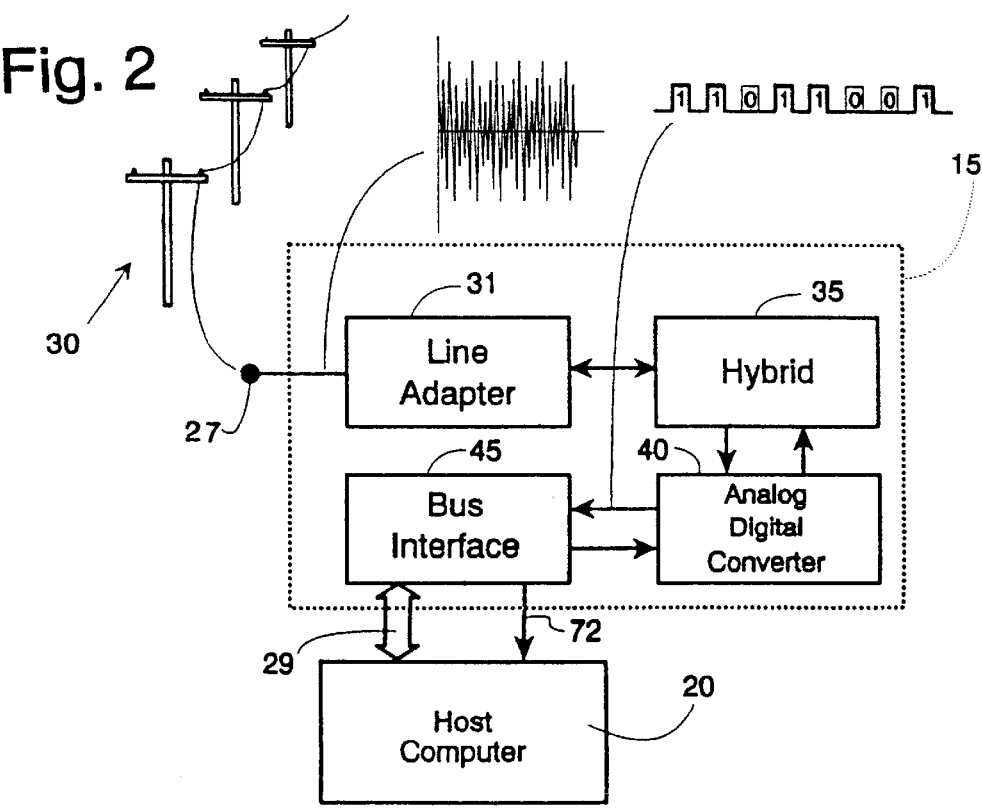
FIG. 2 is a block diagram of the major components of the interface card.

As seen in both FIGS. 1 and 2, the expansion card 15 is provided with a standard telephone jack 29 through which a connection is made to a conventional voice-grade telephone line 30. The major components included on the interface card 15 are seen FIG. 2. The card 15 takes the form of a standard "half-size adapter card" which plugs into an available expansion slot 17 on the host computer 20 to connect to the host computer's internal bus 28. Detailed information on the structure and operation of the interface bus 28, as well as other aspects of the personal computer system 20, may be found in the applicable *IBM Technical Reference Manual*, IBM Corporation, Boca Raton, Fla. 33432. Details concerning the Intel family of microprocessors and their companion DMA controllers appears in the *Intel Microprocessor and Peripheral Handbook* (1990), Intel Corporation, Santa Clara, Calif.

The interface card sends and receives analog signals over a voice-grade analog telephone line which is connected at the terminal 29. Two standard RJ11 telephone jacks (not show) may be used to provide convenient external connections to standard telephone equipment, one Jack accepting a plug from the telephone line and the second a plug from a telephone station set which may share use of the line.

As seen in FIG. 2, the interface card includes a line adaptor circuit interconnects the telephone terminal 29 with a hybrid circuit which splits the analog voice-band signal into inbound and outbound components which are respectively sent to and received from the analog ports of an analog/digital converter 40 (also called the "AIC" or "analog interface chip"). Converter 40 samples received voice-band signals, encodes the sample amplitudes into digitally-expressed values, and sends these values via bus interface circuitry seen at 45 in FIG. 2 to the host computer 20. As described in more detail below, the conventional processor within the host computer 20 processes incoming digitally-expressed sample values to perform one of a variety of functions, depending on the nature of the incoming signal.

Outbound communications originate within the host computer 20 which processes the information to be sent to create a sequence of digitally-expressed sample amplitude values which are sent via the interface circuitry to the converter 40 which transforms the digital sample values into the corresponding voice band analog signal which is applied via the hybrid circuit 35 and the line adapter 31 to the telephone line connected to terminal 29.

Signal Reception

Figure 3:
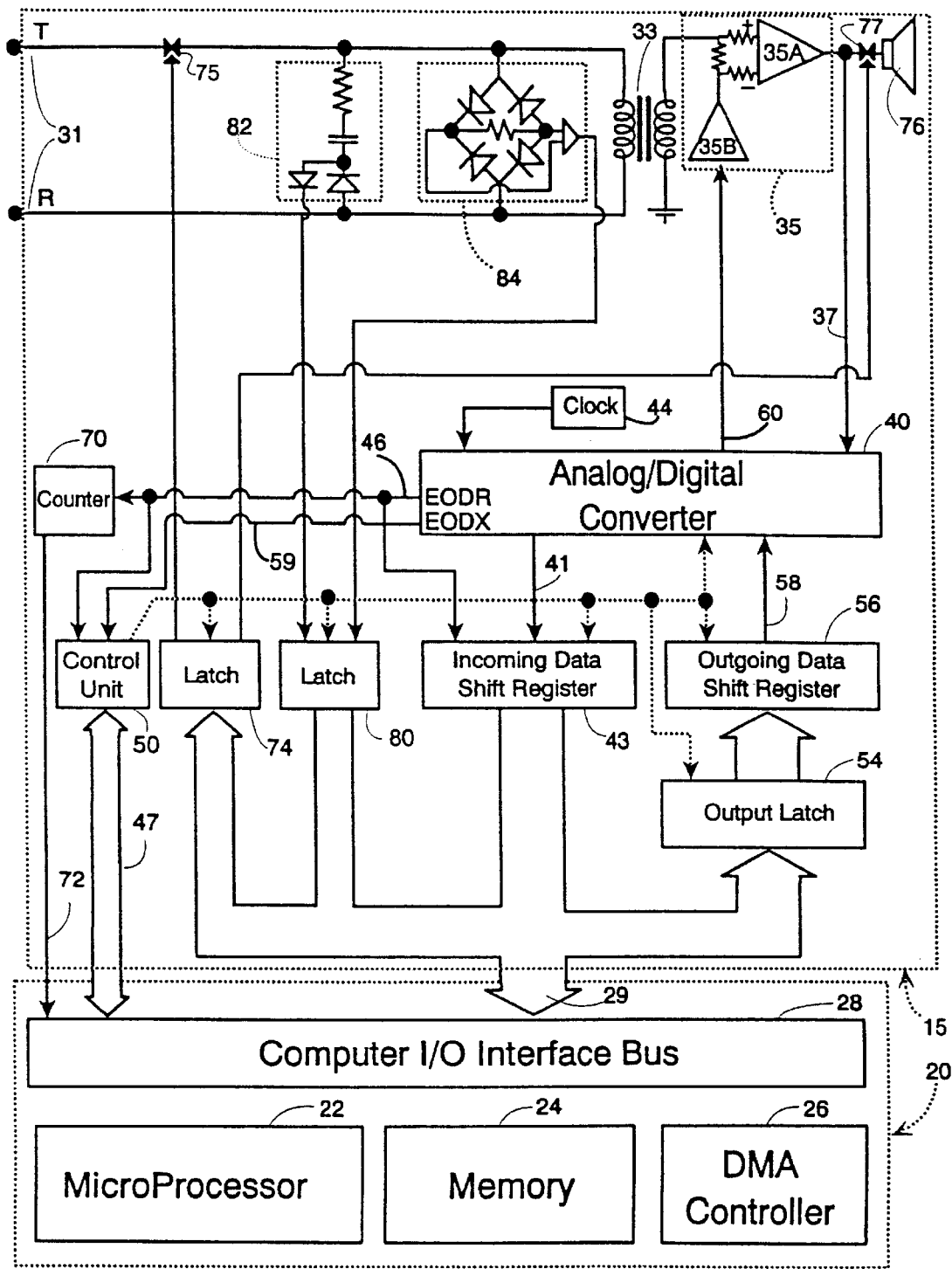
FIG. 3 is a detailed block diagram of the interface card.

The processing of the incoming voice-grade signal in the interface card is shown in more detail in FIG. 3. The incoming voice-band signal arriving at terminals 31 seen in FIG. 3 may be a conventional telephone voice signal, a modulated-tone data signal from a modem, a facsimile signal, or some other signal capable of being transmitted over conventional telephone links. Regardless of their content, incoming and outgoing signals are processed in the same way by the interface card 15.

Arriving signals from the telephone link are applied directly via a transformer 33 to the input of an amplifier 35A within a hybrid network 35. The signal appearing at the output of amplifier 35A is applied to the analog input terminal 37 of a two-way analog/digital converter 40. The hybrid network 35 is of conventional design and includes a transmit amplifier 35B which is interconnected with the input to amplifier 35A by means of a resistive network which is arranged such that the transmitted signal from amplifier 35B is greatly reduced in magnitude at the output of the receiving amplifier 35A.

The converter 40 preferably takes the form of a single integrated circuit device comprising a Model TLC32044 voice band analog interface unit manufactured by Texas Instruments, Dallas, Tex. Detailed information on the structure and operation of the TLC32044 is contained in Data Sheet D3098 (1988) available from Texas Instruments. The TLC32044 integrates an input analog bandpass filter, an analog-to-digital converter including a sample-and-hold circuit and a successive-approximation encoder which converts the input analog signal on line 37 into a 14-bit resolution digital signal. For processing outbound signals, the TLC320444 includes a 14-bit resolution digital-to-analog converter and a low-pass output reconstruction filter.

The incoming analog signal is applied via line 37 seen in FIG. 3 to the converter 40 and the resulting digitally-expressed sample values are delivered via a bit-serial line 41 into an incoming-data shift register 43. When the converter 40 completes the encoding of a sample of the incoming telephone signal, the shift register 43 holds a 16-bit binary word whose 14 most significant bits specify the amplitude of a sample. The value accumulated in shift register 43 is then transmitted via a data bus 29 to the data port pins of the computer's interface bus 28 during a DMA memory transfer operation as next described.

The analog/digital converter 40 is timed by a clock signal from a clock generator 44 seen in FIG. 3. when the converter has delivered the last (least significant) bit via its bit-serial output 41, an EODR (end of data received) output 45 from converter 40 activated to inform a control unit 50 that the data in the incoming shift register 43 is ready for transmission. Control unit 50 then issues a direct memory access request signal which is transmitted to the interface bus 28 via a control line in the group of control lines depicted in FIG. 1 at 47.

The interface card 15 preferably makes use of two separate DMA channels which are available in IBM-compatible Personal Computers for use by external devices. The receive channel, which moves incoming information via the shift register 43, is activated by a request to DMA channel 6 (DREQ6 at pin D13 on the standard IBM system bus 28). The DMA controller 26 within the personal computer 20 responds with a DMA acknowledge signal which is returned to the control unit 50 via one of the control lines 47

(connected to receive the signal DACK6 at pin D12 on the system bus 28). The control unit 50 responds to the DMA acknowledgement by gating the information from shift register 43 to the computer interface bus 28 via the data bus lines 29.

Signal Transmission

The analog output signal to be transmitted over the phone line is generated by the analog/digital converter 40 which receives digital words, each comprising a 14-bit sample amplitude value and two control bits, from the I/O interface bus 28 via the bus lines 29, an output latch register 54, and an outgoing-data shift register 56. The latch register 54 holds one digital sample while the sample previously received from the bus 28 is being sent, one bit at a time, from the shift register 56 to the analog/digital converter 40 via the bit-serial line 58.

The transfer of information between the bus 28 and the output latch register 54 is also accomplished by means of a DMA transfer. In this case, when the analog/digital converter completes the conversion of a word from the shift register 56, it issues an EODX (end of data transmit) signal on line 59 to the control unit 50 which in turn issues a transfer request to DMA channel 5 by activating one of the lines in the control bus 47 (signal DREQ5 applied to pin D11 of the interface slot to bus 28). The DMA controller 26 acknowledges that it is ready to handle the request by activating another of the control lines 47 (signal DACK5 at pin D10 of the interface slot). The control unit responds by transferring the contents of output latch 54 into shift register 56, and by enabling the output latch 54 to receive the data from interface bus 28 via the data bus 29.

The bit-serial data applied to converter 40 via line 58 is converted into an analog signal appearing at analog output 60 of the converter 40. The analog output signal on line 60 is then transmitted by the hybrid amplifier 35B and the transformer 33 to the tip and ring terminals 31 of the connected telephone line.

Supervisory Control

The microprocessor 22 within the personal computer 20 is directly connected via the interface bus 28 to the interface card 15 and provides general supervisory control over its operation. To accomplish this, the EODR signal on output 45 (one of which appears each time the translation of an incoming analog sample is completed) is applied to increment a 4-stage counter 70 which issues an output interrupt signal on line 72 for each group of 16 incoming words. The interrupt signal on line 17 is applied to a selected one of the available interrupt request lines on the interface bus 28 (the particular line IRQ3 to IRQ7 at interface slot pins B21–B25 may be jumper-selected at the time of installation to avoid conflicts with other peripherals issuing interrupts).

When data is being sent or received over the telephone line 30, control of the execution of microprocessor 22 is passed to an interrupt handling routine resident in the memory 24. This single routine, the details of which are set forth in the accompanying assembly language listing for the INTS module, calls routines for handling both transmission and reception in accordance with the currently selected mode of operation. These interrupt handling routines process incoming data words from incoming data shift register 43 as those incoming words are assembled in a RAM storage area by the DMA transfer mechanism described above. Secondly, the interrupt handling routines process outgoing information, assemble the outgoing data words indicative of analog sample amplitudes in a RAM storage area pending the DMA transfers to the output latch 54. Note that the single interrupt from line 72, issued on every 16th received word, triggers the handling of the received data being accumulated in the DMA buffer as well as the assembly, in the transmit DMA buffer, of the outgoing data to be converted into analog sample values.

In addition, the microprocessor has access at any time to information about the status of the telephone line, and may send control commands to the interface unit 30 to control that unit's operation. The control lines 47 which exchange control information between the control unit 50 and the interface bus 28 include address lines (at interface slot pins A22–A29 to bus 28) which must contain a particular pattern of bits (in the range 35C to 35F, hexadecimal) designating information to or from the interface unit. When the appropriate address is detected, data from the interface port is placed in the board control latch register 74 to control the line. One bit position of latch 74 may be advantageously used to control an electronic off-hook switch seen at 75 in FIG. 1 (which is closed or placed "off hook" to connect the interface unit to the telephone line). A second bit position in the control latch register 74 may be used to connect a speaker 76 to the output of the amplifier 35A by activating a switch 77. A third bit position may be used to reset the AIC 40.

Correspondingly, a sense latch register 80 includes bit positions which are set by the status of the telephone line. A first bit is set whenever a ringing signal detector 82 connected across the telephone line terminals 31 detects the presence of ringing signals of a predetermined amplitude. A loop current signal detector seen at 84 sets a second bit whenever loop current exceeding a predetermined value is present, indicating an active connection to another system. These status signals may be obtained at any time by a programmed inquiry which places the appropriate I/O address on the address leads within control bus 47.

Programming Overview

In the preferred embodiment of the invention, all digital processing of the digitally-expressed analog sample values which are supplied by and delivered to the interface card 15 are processed by the microprocessor in the host computer. Similarly, the digital information which specifies the telephone line status, as well as control information which takes the telephone line on and off hook, is handled by the host microprocessor. As a consequence, substantially any communication and communication control function using a voice-band channel may be implemented with the hardware disclosed above (and nothing more) by providing appropriate programming for the host computer 20.

Figure 4:
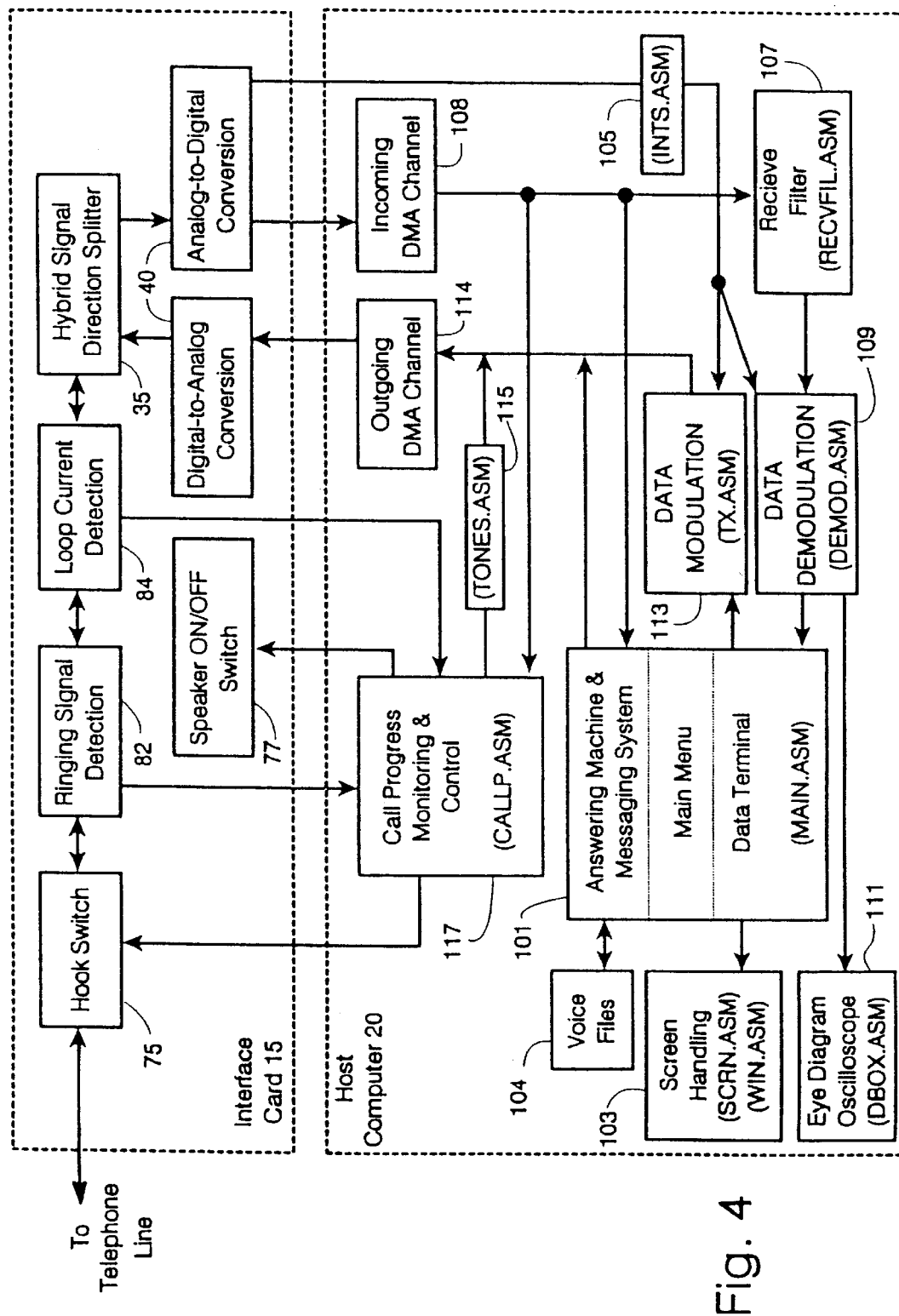
FIG. 4 is a functional block diagram illustrating the interaction of the major functions implemented by the host processor under program control.

The program listing presented at the conclusion of this specification provides numerous functions which allow the combination of the host computer and the interface card to support a rich assortment of voice and data communications applications. The listed source programs are written in conventional assembly language and may be assembled, linked and executed on any IBM-compatible Personal Computer which has sufficient operating speed and which is equipped with the expansion card described above. The assembly language which defines the program and data structures needed to implement the illustrative embodiment is divided into 12 separately listed modules which are summarized below and depicted in FIG. 4 of the drawings:

| Module | Description |
|---|---|
| MAIN.ASM | The MAIN.ASM module seen at 101 in FIG. 4 initializes the interface card hardware and the screen, transmit and receive buffers in the host computer's RAM memory. It displays the main menu by calling the screen handling routines in SCRN.ASM and WIN.ASM as seen at 103 and decodes any user keystrokes which control the system's operation. In addition, it provides routines capable of answering the phone, recording and playing back voice messages to and from standard DOS disk files as indicated at 104, as well as routines that manage the system when it is operating as a data terminal when keystroke data are directly transmitted and received (via modem processing) over the telephone link. |
| INTS.ASM | This module indicated at 105 handles the interrupts generated by the interface card each time 16 incoming digital samples have been accumulated in the host computers RAM memory by prior DMA transfers as determined by the counter 70 seen in FIG. 3. The interrupt handler calls routines for handling data transmission and reception. In addition, INT.ASM responds to telephone ringing signals generated by detector 82 and line current indications from loop current detector 84 on the interface card 15 as seen in FIGS. 3 and 4. |
| RECVFIL.ASM | This module, seen at 107 in FIG. 4, contains the filtering routines used to pre-process the incoming analog signal samples which are received via the incoming DMA channel seen at 108 in FIG. 4. When the system is operating as a 1200/2400 baud modem, the RECVFIL.ASM routines 107 process the accumulated digitally expressed sample values from the interface card and performs band-splitting and phase-splitting digital filtering to create filtered samples for demodulation, as well as automatic gain control and baud rate synchronization. |
| DEMOD.ASM | This module, shown at 109 in FIG. 4, demodulates the filtered sample value from RECVFIL.ASM into data. |
| DBOX.ASM | The DBOX.ASM module at 111 provides routines which allow the host computer's screen to provide an oscilloscope-like eye-diagram display useful for monitoring the performance of the system during modem data reception. |
| TX.ASM | This module, seen at 113, modulates digital data to be transmitted into sample amplitudes which are placed into the transmit buffer from which they are moved via the outgoing DMA channel seen at 114 to the interface card for digital-to-analog conversion into a voice-band analog modem output signal which is transmitted over the phone line. TX.ASM also provides digital filtering to confine the transmitted analog signal to its assigned passband. |
| TONES.ASM | This module, indicated at 115, generates touch-tones and answer tones used by the system to perform conventional dial-up telephone signalling. |
| CALLP.ASM | The call progress monitoring and control module seen at 117 provides supervisory control of the telephone link. It performs band-pass filtering of the receive samples from the interface card in order to detect ringing signals, answer tones, and touch-tone signals, and uses the tone generating routines in TONES.ASM at 115 to produce comparable outgoing tones. |
| WIN.ASM | This module, indicated at 103 along with SCRN.ASM, manages the pop-up windows which appear on the host computer's screen as part of the user interface. This module employs pre-generated character definitions which are specified in the separately listed include file SFT_WINS.INC. |
| SCRN.ASM | This module provides screen management routines used when the system is operating in terminal mode. |
| EQUATES | This module defines commonly used numbers and keycodes referred to in the other modules. |

Thee MAIN.ASM module initializes the system and provides the primary user interface. In the discussion of MAIN.ASM and the other modules which follows, unless otherwise noted, the routines being discussed will be identified by their labels and may be found within the listing for the particular module being described.

When the system is started (typically by the entry of the program's name at the operating system's standard command prompt), it is loaded for execution from disk, and execution begins at the label SOFT_MODEM. The amount of memory allocated to the program is reduced to the size of the program plus the size of the stack, and the routine ALLOCATE_BUFFERS is used to create 8k (16-bit word) memory buffers for the both the transmitted and received sample amplitude values. The video display is then initialized and the routines INIT_AIC and INIT_DMA are called to initialize the TLC32044 analog interface circuit 40 on the interface card 15, and to initialize both the transmit and receive DMA channels. A call is then made to the routine WEDGE_INT (listed in INT.ASM) which hooks into the COM2 interrupt (reconfigurable as COM1 through COM4).

A check is then made to determine if the user supplied the name of a voice-recording file to be played back along with the program name when the program was called at the DOS command line. If so, the routine PLAYBACK_MSG (to be discussed) is called immediately, with control thereafter being passed to MAIN_EXIT to terminate the program. In this way, the program can be loaded to play back a recorded voice message without invoking any other functions.

If no recorded message file was specified, ON_HOOK and SPEAKER_OFF are called to insure that hook switch 85 and speaker switch 77 on interface card 15 are both open, and the routine MAIN_SCREEN is begun. The routine INIT_SCREEN (in WIN.ASM) clears the screen and pops up a window for the main menu. The routine at GET_KEY monitors keyboard input and incoming ringing signals.

If ringing signals are detected, the routine ANSWERING_MACHINE is called to take the telephone line off-hook and then call the routine PLAYBACK_MSG to play back a pre-recorded voice message. The routine PLAYBACK_MSG moves the contents of a disk file, which is a sequential file of digitally-expressed voice sample amplitudes, into the transmit buffer, with each transfer being followed by a call to TX_DMA_ON which enables a DMA transfer of the transmit buffer's contents for digital-to-analog conversion by the interface card 15. To conserve disk space, the file of digitally-expressed voice samples may be compressed prior to storage and decompressed prior to playback. After the recorded voice message is played for the caller, SEND_TONES (in TONES.ASM) sends a prompting tone to advise the caller that recording is starting.

The ANSWERING_MACHINE routine then calls RECORD_MSG to record the incoming message. A DOS file is opened to record the message, the routine INIT_AIC is called to ready the analog interface circuit 40 to receive at 9600 samples/second, and the incoming samples from the interface board are moved by DMA transfer to the receive buffer from which they are recorded on disk, in 4 kilobyte blocks, in a standard DOS file.

Main Menu Functions

The routine in MAIN.ASM beginning at MENU_COMMAND processes user keystrokes to invoke functions selected by the user from the following available options which demonstrate the system's capabilities:

KEY  OPERATION

F1  Go to data mode by calling ORIGINATE_MODE_INIT followed by COMM_MODE, which takes keystrokes entered by the user and sends them to the transmitter (to be discussed), and looks for characters from the receiver and puts them on the screen. When operating in terminal mode, the user can press the F2 key to enter the display box mode by calling INIT_DBOX (in DBOX.ASM) in which case the received characters are buffered and keystrokes are processed through the display box menu.

F2  Record voice off the telephone line by calling RECORD_MSG discussed above.

F3  Play back a recorded voice message by calling PLAYBACK_MSG discussed above.

F4  Send an answer tone over the phone line by calling SEND_TONES (listed in TONES.ASM) as discussed above.

F5  Perform ORIGINATE_MODE by dialing a phone number (using DIAL in TONES.ASM) and, if answered, attempts to establish a modem link (using CALLP_MAIN in CALLP.ASM which initiates the expansion card and enables the receiving DMA transfers) in 1200 baud originate mode (by calling INIT_RECV in DEMOD.ASM), and then calls COMM_MODE to perform communications with the remote modem.

F6  Execute call progress functions by calling CALLP_MAIN (listed in CALLP.ASM).

F7  Execute tone detection by calling TOUCH_TONE_DETECT (listed in CALLP.ASM).

F8  Execute automated voice message handling by calling MESSAGING_SYSTEM. This routine uses DTMF (listed in TONES.ASM) to produce the dual dial tones for each digit to be dialed in a number taken from a list of numbers to be dialed. MESSAGING_SYSTEM plays back a message asking the person who answers the remote phone to press the touchtone "1" key on their stationset, then waits to accept the response, at which time MESSAGING_SYSTEM plays back a prompting message and then records the called party's response using PLAYBACK_MSG and RECORD_MSG, and then terminates the conversation by calling ON_HOOK.

Alt-H Toggle between on/hook and off/hook using CHK_ON_OFF_HOOK.

Alt-S Toggle the speaker between on and off conditions using CHK_SPKR.

Alt-P Change parity by calling NEW_PARITY.

Alt-A Toggle answering machine enabled/disabled states using CHK_ANSWER_MODE.

F10  Exit the program and return control to DOS after calling DISABLE_INT (listed in INTS.ASM) to restore the original COM2 interrupt vector and disabling DMA transmission and reception.

Screen Handling Routines

As seen in the listing WIN.ASM, the routine FILL_SCREEN fills the screen with a background color, WINDOW_UP moves a previously stored window image from a screen buffer to the active screen, and WINDOW_FLIP swaps the active screen memory with the contents of a screen buffer.

The screen is initialized for the terminal mode by a call to INITCOMM_SCREEN (listed in SCRN.ASM) which is called when data mode is entered. This routine paints the screen blue by calling INIT_SCREEN (in WIN.ASM), which in turn calls WINDOW_UP, brings up data mode windows which indicate speed and parity, and then saves the written screen to a screen buffer for later use.

SCREEN_OUT (listed in SCRN.ASM) performs the terminal mode functions. After checking for special characters, received characters are displayed on the screen. Special characters are the line feed, carriage return and backspace characters, which are handled by the appropriate display-point repositioning functions. If the cursor is on the last line of the screen, a line feed or carriage return character causes the screen lines to scroll upwards. The routine PRINT_PARITY listed in SCRN.ASM is called to place the currently active parity and word length indications on the screen.

The display box mode is entered by calling INIT_DBOX listed in DBOX.ASM. INIT_DBOX calls routines which draw an oscilloscope face on the screen along with a menu of display box options (DBOX_MENU) and initializes the video controller to enable modification of all video planes. The display box may have up to eight points on the screen (POINT0–POINT7) each of which is defined by a data structure of type SCOPE_POINT. The routine PLOT_POINT places yellow dots on the screen using the publicly declared horizontal and vertical coordinates X and Y. Each dot displayed consists of three lines of dots. RESTORE_OLD removes the yellow pixels and replaces them with either light gray, dark gray or blue, depending on whether the pixel is positioned on the blue background of a reference line. DO_COLOR reads the old point out of the data structure and is called three times, once for each color. SAVE_COLOR saves the bits is also performed once for each color and saves the bits where the new dots will go. GET_COLOR reads the video RAM and checks for an intersection between a new oscilloscope dot and the desired color. The eye diagram of the incoming signal is produced by the demodulation routine DEMOD in DEMOD.ASM which, at the label DISPLAY_BOX, sets the variables X and Y and calls PLOT_POINT.

Call Progress Monitoring

The routines for monitoring and controlling the telephone circuit connected to the interface card 15 are listed in CALLP.ASM which begins by defining various coefficients and delay line values used by the call progress filters.

The routine CALLP_FILTERS executes a filtering algorithm for each input sample value in the received sample buffer, and calculates a mean square output level value for each filter. As indicated by the comment lines in the assembly language listing, the DC component is first removed from the sample value, and the input sample is then processed by the ANSWER_TONE_FILTER routine, at the end of which a check is made to determine if the system is currently waiting for the answer tone to end (which occurs during the originate mode training sequence to be described). The voice filtering algorithm may then performed to obtain a means square voice level indication (in the CALLP.ASM listing, the voice filter algorithm has been commented out to reduce runtime, but is retained here for illustration). Next, the call progress filtering routine is performed to detect dial tones, busy tones, and ringing signals. The mean square level (power level) output from each filter is transferred into a holding location for CALLP_MAIN to test later whenever SAMPLE_COUNT is decremented to zero.

The DTMF_FILTERS algorithm performs basically the same function as the call progress filters described above, except that the dual tones are written. In this illustrative embodiment, a filter for the touch-tones for "1" only are present, and the detection of a received "1" tone is used in the example voice message handling system implemented by the routine MESSAGING_SYSTEM (in MAIN.ASM) described above. The routine GET_TOUCH_TONE detects the "1" touch tone and waits for it to terminate.

The call progress system is initialized by CALLP_INIT which initializes the analog interface circuit 40 and the input counters. The mean square outputs are inspected every 256 sample times (35.5 millisecond intervals) to simplify division of the mean square values.

CALLP_MAIN performs the DMA initialization and waits for 256 samples to be received and the filter outputs to be computed. It then tests the mean square values to determine if an answer tone has a sufficient magnitude (at least 4000H and also greater than ¼ of the total energy on the line), and that such a tone has been present for a predetermined duration. CALLP_MAIN also calls PRINT_CALLP which displays the mean square filter output levels (useful for testing and debugging). The routines TOUCH_TONE_DETECT and PRINT_DTMF are similarly available to indicate the receive levels coming through the DTMF filters for testing purposes.

The routine GET_END_ATONE is called after a valid answer tone has been detected. It resets the call progress counters to 4.44 milliseconds in order to detect the end of an answer tone more quickly. This routine also enables the transmitter DMA to start the 1200 bps transmitter as part of the training sequence leading to 2400 baud transmission. The routine then waits for the remote location to terminate the answer tone, which triggers the beginning of the 1200 bps receiver function. As soon as the end of the answer tone is detected, the AIC is set to receive at 9600 samples per second.

Receiver Filtering, AGC and Interpolation

The digitally expressed incoming analog sample amplitudes are processed by the microprocessor 22 in the host computer system 20 to filter the desired received signals from other signals outside its passband, to split the incoming signal into its two phase-shifted quadrature components, to regulate the signal level of the incoming signal by means of automatic gain control processing, and to compensate for variations in the baud rate of the incoming data by an interpolation procedure. All of these steps, which occur prior to demodulation, are handled by the module listed in RECVFIL.ASM.

Filtering consists of running the samples through either a high or low bandpass filter to reject the modem's local transmitter. Phase splitting reduces the samples to two sets of complex numbers (real and imaginary) for each baud time of samples (the baud rate being 600 per second), resulting in 1200 complex numbers per second.

The phase splitting occurs at FILTER_PQ in RECVFIL.ASM. FILTER_PQ is a two stage filter specifically designed to reduce the number of multiplication's and thus reduce execution time. Because of the computational burden placed on the host computer's processor when filtering and demodulating the incoming analog samples, it is essential that efficient algorithms be employed if processors which are in widespread use are to be capable of handling the high baud rates employed by conventional modems now in use. The efficiency of the FILTER_PQ routine, when combined with the efficient demodulation scheme to be described, has been shown to be capable of receiving and demodulating a conventional V.22bis, 2400 baud modem transmissions when executed by a conventional IBM-AT class Personal Computer employing an Intel 80286 microprocessor operating at 12 Mhz.

As can be seen at the label FILTER_LOOP, the Cosine and Sine variables are either zero or plus or minus ¼. These values reduce the number of multiplication's and improve operation speed. LOW_STAGE1 and HI_STAGE1 do the pass-band to base-band conversion (4800 and 9600 sample rate conversion down to 2400 samples per second). LOW_STAGE1 performs the front end filtering of the receive low band samples. 4800 samples per second are reduced to 2400 by reading in a single sample and skipping the second because the second Cosine is zero for a total of two samples per loop. HI_STAGE1 reads in the 9600 samples a total of two times, skipping every other one (4 samples per loop) thus reducing the number of samples to 2400. Next the output of the first stage is sent through STAGE2 to be filtered.

At REAL_DONE, the output value of this routine is divided by 128 or 16 depending on the ACC reaction speed (AGC computed over 16 or 128 samples) and then the absolute value is added to the AGC sum. Each output is then ACCed to bring it up to the correct level.

The same samples are then processed in the same way by the imaginary filter, DO IMAGINARY. At IMAG_DONE, the imaginary number is added to the AGC sum variable and the multiplication is performed to yield the automatic gain controlled output value. At this point, one quarter baud times worth of samples (one 2400th of a second) have been computed, and the process proceeds by reducing the sample rate to 1200 through the interpolator. Because two or four samples per loop are being handled, the routine is optimized to reduce the number of delay line shifts needed.

The INTERPOLATOR_ROUTINES perform the baud loop timing for the modem by computing one set of real and imaginary numbers for each two sets of input samples. The routine also looks for differences in timing between the input sample rate and the remote transmitter's sample rate. If the remote transmitter's crystal frequency is a littler faster than the sampling rate established by the analog interface circuit 40 so that, for example, the remote transmitter is sending 1201 real and imaginary pairs per second instead of the standard 1200, the INTERPOLATOR_ROUTINES will generate an additional pair of samples every second. Conversely, one fewer pair will be generated if the remote end is operating at a slower rate than expected. This allows the disclosed arrangement to lock onto the remote end's transmitted baud rate without having to adjust the rate at which samples are delivered via the fixed-rate DMA transfers required by the host computer system.

INTERPOLATOR_ROUTINES is called by a pointer named BAUDLP_VECTOR immediately after the label ADD_IMAGINARY in RECVFIL.ASM. This routine alternates between buffering the first set of samples and secondly, computing the 1200 rate real and imaginary inputs required by the receiver. Inside SAVE_S1 there is a counter called QUAD_COUNT which, when decremented to zero, indicates that it is time to compute new interpolator coefficients by a jump to NEW_COEFF. This routine looks at the BAUD_X variable in DEMOD.ASM for an underflow or an overflow. These conditions indicate it may be time to compute and extra set of real and imaginary numbers or to skip the next pair. The final sets of real and imaginary numbers (Ps and Qs) are stored in buffers called REAL_BUFFER and IMAG_BUFFER. Because the FILTER_PQ routine can return back with anywhere from 1 to 3 sets of Ps and Qs, those sets are buffered so that DEMOD can handle the under flow/overflow.

When INTERPOLATOR_ROUTINES is finished, control is returned to FILTER_PQ which then loops three more times, followed by a check to determine if the end of the receive sample buffer has been reached, and if the filter delay lines are full. If so, the delay line variables are copied from the end of the buffer to the beginning, the pointers are reset, and the routine is exited. By using long buffers for the delay lines, it is unnecessary to constantly shift these numbers within the delay lines, thus saving execution time.

Demodulation

When filtering and interpolation are completed, control is returned to label EQUALIZER_BUF_CHECK in DEMOD (listed in DEMOD.ASM). A check is performed to determine if there are two sets of Ps and Qs in the buffers. If present, they are copied to equalizer input buffers named EQR_DELAY and EQI_DELAY. At this time, the BAUD_SUM variable is set for use by the baud loop routine used for interpolation. BAUD_SUM is set by adding the absolute values of the first set of Ps and Qs and subtracting the second set.

The next routine provides automatic gained controlled amplification (AGC). The first thing done is a check of the baud counter to see if four or thirty-two baud times have passed (corresponding to the 16 or 128 divisor used to calculate the AGC average in FILTER_PQ as discussed above). If appropriate, a check is then to determine if the flag that indicates a valid energy level on the phone line has been set. If not, at ENERGY_CHECK, the current energy level (AGC_AVERAGE) is inspected to see if it is above the minimum. level (−43 dBm) indicated by ENERGY_THRESHOLD. If there is still no energy, jump (via NO_ENERGY) to EQUALIZER_FULL_CHECK at the end of DEMOD which insures that the equalizer delay lines do not overflow.

If there is energy for the first time, calculate a new AGC multiplier (at NEW_LEVEL) and start up the receiver. This routine is needed when the user has entered F1 from the initial command buffer (direct to data mode) in order not to run the adaptive equalizer with no input signal. If energy has already been detected and the correct number of baud times has been reached, control is passed to AGC_TESTS.

Before the AGC tests are performed, a routine labeled CHECK_ALPHA slows down the equalizer gain term after 256 baud times. The variable ALPHA is high during training so as to bring the receiver up more quickly. After 256 baud times, ALPHA is reduced to increase performance and reduce variability.

If the AGC is in wide band mode (fast reacting), control then passes to WIDEBAND_AGC; otherwise, a check is made to see if the new AGC_AVERAGE is either one-half the level or greater than 1.5 times the last AGC_AVERAGE. If it is, control is passed to NEW_LEVEL to compute an AGC multiplier just on that new value. This lets the receiver act quickly to gain hits on the phone line. If neither of these tests pass, the routine adds ⅛th of the new to ⅞ths of the old level, and computes a new multiplier from the sum. In this way the AGC reacts smoothly and does not vary quickly, which improves performance on a line with little signal level variations.

COMPUTE_AGC takes the new AGC_AVERAGE and computes AGC_XSUBE and AGC_MANT, two variables which are used to adjust any receive signal level the optimal level needed by the receiver. Also, the AGC is changed from wide-band to narrow mode after the first 32 baud times (as seen immediately before the label DISPLAY_BOX in the AGC routine).

DISPLAY BOX checks the RECV_FLAGS register to see if the user is in the display box view mode. If so, the current display box variable is gathered by calling the routine pointed to by DBOX ROUTINE and then the appropriate point is plotted on the oscilloscope screen as noted earlier.

The next routine updates the baud loop variables used by the interpolator routine in FILTER_PQ. The baud loop is controlled by two different loops. A first order baud loop does fine tuning and a second order loop makes coarse adjustments to get the baud loop close to the optimal timing. Every eight baud times the sign of BAUD_SUM is checked. Depending on the sign, a decimal 160 is added or subtracted from BAUD_X. Also, BAUD_SUM is divided by 128 and added to LOOP_INT2, the second order baud loop integrator. LOOP_INT2 is then checked to make sure it stays within the bounds of F200 to 0EFF, hexadecimal. This puts a maximum limit on how much the baud loop can correct for timing differences between itself and the remote modem.

At BAUD_LOOP2, a counter called LOOP2_CNT is decremented. When it reaches zero, the sign of LOOP_INT2 is checked and 160 is added or subtracted from BAUD_X. At label GET_NEW-COUNT, LOOP2_CNT is reloaded from the table BAUD_LOOP2_TABLE (defined at the beginning of the DEMOD.ASM listing immediately before the code). The value loaded from BAUD_LOOP2_TABLE is determined by an offset into the table which comes from the high order eight bits of LOOP2_INT. As LOOP2_INT grows to bigger levels, LOOP2_CNT is reloaded with a smaller and smaller count, causing the second order baud loop to make more frequent adjustments to BAUD_X. BAUD_X is then used by the interpolator to know when to skip or add an extra set of Ps and Qs to the equalizer delay line.

The routine EQUALIZER_OUTPUT generates the actual receive data point from the incoming Ps and Qs. The algorithm performs a complex number multiplication between the complex numbers in the equalizer delay line and the complex taps. Each of the last 7 baud times (14 taps) of Ps and Qs are multiplied with their respective taps and the results are summed. What results is the complex number RZN+j IZN, which is the data point.

In the following routine, PHASE_ROTATION, the equalizer output is rotated into the correct quadrant by the Cosine and Sine of the phase angle PHI. This is done through the multiplication of RZN+j IZN by negative COSINE+j SINE. The resulting point is RYM+j IYM.

The next routine performs the calculations to determine which point in the signal constellation RYM+j IYM is closest to. Once this is determined, the data pattern associated with this point is known and the demodulation of the analog signal is complete. Also, the nearest perfect point is saved into DEC_R+j DEC_I and an error vector from this point to the point we demodulated is generated and stored into R_ERROR+j I_ERROR. There are separate routines 1200 and 2400 baud because the signal constellations are different.

For 1200 baud, because there is only four possible points, the process is as simple as comparing the signs of both RYM and IYM to determine which of the quadrants the point resides in. At label DECISION_1200, the sign of RYM is tested. If it is positive, the absolute decision'point, 49*256, is placed in DEC_R. and this value is subtracted from RYM to get the error vector, R_ERROR. Also, the offset into DECISION_TABLE, where the actual data sent from the other end is decoded, is placed into the BL register. This process is repeated for IYM to yield DEC_I and I_ERROR. At the label READ_DECISION, the receive data is read out of DECISION_TABLE and placed into RECV_DATA.

The process for decoding data at 2400 bits per second is a little different in that there are sixteen possible decision points. Consequently, the routine inspects the sign of RYM and j IYM, as well as their magnitudes. Once the error vectors and decision points are determined, the code branches to READ_DECISION and the receive data is read out of DECISION_TABLE as in the 1200 case above.

The next step is to update the taps with the counter-rotated error vector. By doing this, the taps learn what types of errors are being generated by the phone line and they move in a direction that can correct for these errors. The counter-rotated error vector is scaled down by ALPHA so that the taps cannot be significantly changed by any one baud time error. The counter rotation is done my multiplying R_ERROR+J I_ERROR by COSINE−j SINE, and then again multiplied by ALPHA. The results are placed in AREN+j AIEN.

The routine DO_TAP_UPDATE multiplies all fourteen of the taps (RW+j IW) by (AREN+J AIEN). Before this, however, the taps are all "bled" a little to keep them from becoming too big. This is done by repeating the macro BLEED_TAP (defined at the beginning of the DEMO-D.ASM listing) 28 times, each time adding four to a negative tap or subtracting four from a positive tap, thus pulling all taps toward zero. BLEED_TAP is performed for both the real and imaginary parts of all taps.

Next, the phase loop is updated so that it can recalculate COSINE and SINE for the next baud time. To do this, the output of the equalizer RYM+j IYM must be multiplied by the negative of the decision point DEC R−j DEC I. Only the imaginary vector is needed so RERR need not be recalculated. Thus, IERR−(IYM*DEC R)−(RYM*DEC I). Also, the routine multiplies IERR by two to meet the needed gain for PHASE_UPDATE.

PHASE_UPDATE employs a first and second order phase loop which locks onto the phase roll of the remote transmitter. PHI is the new phase angle determined by the code. The upper eight bits of PHI are then used to access a pre-computed COSINE and SINE from the tables listed in TONES.ASM. This algorithm use of tables indexed by the phase angle PHI substantially improves execution speed by eliminating multiplications.

The S1_DETECT routine functions is a matched filter which detects the presence of the S1 digit sequence defined in the V.22bis CCITT specification. The S1 transmit sequence is used to signal the remote receiver that the other end is a 2400 baud modem, or that the other end wants to initiate a 2400 baud retrain. The S1 sequence is composed of unscrambled 11's then 00's at 1200 baud that create a specific tone on the line. S1_DETECT determines the presence of the tone by looking at the numbers in the real equalizer delay two baud times apart. If the difference in these numbers is above a certain threshold a counter, S1_COUNTER, is incremented. If the difference is below the threshold, the counter is decremented by four. If the counter ever reaches 20, S1 has been detected.

The routines starting at DATA_DECODE perform the necessary computations to parse the incoming data stream into ASCII characters.

At 1200 baud, the two received data bits are stored in bits 2 and 3 of RECV_DATA.

At 2400 baud, the incoming data is decoded in accordance with the V.22 and V.22bis specification. bits 0 through 3 are valid data. First, differential decoding is performed by subtracting the previous baud times' bits 2 and 3 from the baud time's data. Next, the Gray decoding process checks bit 3 and, if it is zero, bit 2 is inverted. Descrambling parses four bits at a time so that, at 1200 baud, the first baud times data bits are placed into DATA_1200, the routine waits for the second baud times data, and then combines the two at COMBINE_1200_DATA before descrambling. DESCRAMBLE_4 performs the descrambling routine specified in V.22 and V.22bis.

After the descrambler, the data is now in the same format as sent to the modem by the remote data terminal equipment: asynchronous ASCII data. The routine then searches the incoming data for a start bit, parse the next eight data bits into an ASCII character, and then puts the result into the receive character buffer for the terminal loop to display on the screen.

At RECEIVE_PARSER, a state variable R_PARSE_JMP is tested to see if it's zero and, if it is, the routine jumps to CHECK_FOR_START to look at the four bits out of the descrambler to see if there are any zeros present. If there are, the data is moved into R_PARSE_DATA, and R_PARSE_JMP is set to PARSE_8. The next time into the loop, RECEIVE_PARSER jumps to PARSE_8 where the next four receive bits are combined into R_PARSE_DATA. Four data bits are still needed to complete the ASCII data, so R_PARSE_JMP is set to PARSE_12.

At PARSE_12, enough data has been collected to form the character, so it is now necessary to determine where the character is in the received 12 bits of data. This depends on where the start bit is located. PARSE_12 begins by shifting the received 12 bits right until a zero enters the carry flag. Once a zero is detected, the eight data bits of the receive character are in the AL register, from which they can be stored into RX_CHAR_BUF, and the pointers into R_CHAR_BUF are updated. The bit counters are then checked to see how many of the received 12 bits are left. Depending on where the start bit was located there can be up to three data bits left over. These bits are checked to see if there is another start bit. If there is, the routine recreates R_PARSE_DATA so that it has four valid bits in the low order and resets R_PARSE_JKP to PARSE_8. Code outside the interrupt handling routines checks to see if any characters have been placed in RX_CHAR_BUF and displays them in terminal mode.

The last thing done by the receiver, at EQUALIZER_FULL_CHECK, is to make sure that the equalizer delay line buffers are not full. The previous 6 baud times worth of Ps and Qs must always be available; consequently, when the equalizer is full, the last 12 Ps and Qs are copied to the beginning of the EQR_DELAY and EQI_DELAY. Also, the EQUALIZER_IN pointer is reset to point into location 13.

Modulation

The transmitter routines listed in TX.ASM are substantially less complex than the demodulation routines because modulation is a determinate process.

The first two routines in TX.ASM, INIT_TX and SETUP_SAKPLE_COUNT, initialize the transmitter variables. INIT_TX resets the pointers into the transmitter sample buffers and calls SETUP_SAMPLE_CNT which tests to see if transmission is to be performed in the low band (8 samples per baud time) or high band (16 samples per). SETUP_SAMPLE_COUNT also sets up the transmit buffer threshold, SAMPLE_COUNT, to either 100 samples for low band or 200 for high band. SAMPLE_COUNT insures that there are always enough samples in the buffer to handle the case where the transmitter routine will not receive control for a prolonged period (which occurs, for example, when interrupts are turned off while the PC is changing video modes). This safeguard adds a 20 ms delay into the transmit path.

TX1224, the code which performs the actual transmission, is reached through the transmit vector, TX_VECTOR, in the interrupt handling routine SOFTMODEM in INTS.ASM which, as described above, receives control each time the interface card 15 generates an interrupt at every 16th receive sample.

The first thing TX1224 does is check the number of samples in the transmit buffer. If the count is less than SAMPLE_COUNT, another baud times worth of samples is processed. DO_TX is the actual start of the transmitter process. Flags are first checked to see if the system is operating in a forced data mode in which all marks (ones) or the dibit pattern S1 is to be sent. If either of these flags is set, control is passed to SEND_MARKS.

At CHECK_TX_DATA, the routine first checks to see data is being parsed. If so, control is passed to the routine pointed to by T_PARSE_JMP. If not, control is passed to CHECK_TX_CHAR where a test is performed to determine if any ASCII characters to be sent are present in TX_CHAR_BUF. If there are none, control is passed to SEND_MARKS. If characters are ready to be sent, they are read from TX_CHAR_BUF, the pointers to that buffer are updated, and a start bit is inserted into the data before it is stored in SEND_DATA. The parser vector, T_PARSE_JMP, is set to PARSE_4_2_DATA.

The PARSE_DATA routines are listed at the end of TX.ASM. PARSE_4_2_DATA sets the parser vector to PARSE_2_DATA, obtains the next four data bits of the ASCII character and returns. PARSE_2_DATA then takes the last data bit of the character, appends on three stop bits, and checks for another character to be sent. If there are no more characters to be sent, the routine resets T_PARSE_JMP to zero and returns. If there is a character to be sent, the routine gets the character and updates the buffer pointers, and then shifts the character left three bit positions such that this new character is given a start bit. The routine then inserts the two remaining bits of the last character and saves it off. Next, the new character is shifted right by four, a stop bit is inserted, and T_PARSE_JMP to set to PARSE_4_4_DATA. PARSE_4_4_DATA parses the next four bits of the TX char and sets T_PARSE_JMP to PARSE_4_0_DATA. PARSE_4_0_DATA parses the last three bits of the second data byte plus the stop bit and resets T_PARSE_JMP to zero so that the process is returned to state 0.

As seen in TX.ASM at SCRAMBLER, the data is scrambled using the algorithm specified by the V.22 and V.22bis specification. At CHECK_1200, the low order two bits of the scrambler output are saved for the next baud time. The next two processes, GRAY_ENCODE and DIFF_ENCODE perform the appropriate Gray and differential coding defined in the V.22 and V.22bis specification.

The next routines process the transmit data into sample amplitude values which are delivered to the interface card 15 for digital-to-analog translation by the AIC 40. For each possible data value there are six sets of samples, and the pointers to these samples are called AN0_PTR, AN1_PTR, AN2_PTR, BN0_PTR, BN1_PTR, and BN2_PTR. AN0_PTR and BN0_PTR are read from a table at an offset location equal to the current transmit data value. The other four pointers are the AN0 and BN0 pointers saved from the last two baud times. Next, the transmit sample is created by adding the three values pointed to by the AN pointers, multiplying them by 1 or −1 depending on which sample is being formed, and putting the result into TEMP_TX_BUF. Next, the three values pointed to by the BN pointers are added together and the sum is either added or subtracted from the corresponding TEMP_TX_BUF value depending on the 1 or −1 multiplier. This process is done for either 8 or 16 samples, depending on whether transmission is to be made in the low or high band respectively. Once the samples are completely formed in TEMP_TX_BUF, they are copied into the transmit sample buffer making sure to take into account the position of the end of the buffer.

When transmitting low band samples during the training sequence, it is necessary to change the receive sample rate from 7200 samples per second (needed for call progress functions) to 9600 samples per second needed by the receiver code. To change the sampling rate, AIC commands are imbedded into the data stream in the routine SEND_AIC_CMDS. This routines takes a transmit sample, ORs it with binary 3 which tells the AIC there is a command following this data sample, and the puts the command into the next location. To change the sample rate, two consecutive commands are sent.

The process differs during high band transmission. Alternating samples are filled with the sum of the AN's and then the sum of the BN's, and the need to send AIC commands does not arise; consequently, there is always room in the sample buffer for a full baud times worth of samples. Once the TX samples have been moved into the TX sample buffer, the HIGH_BAND_FILTER routine shifts the AN and BN delay lines and returns.

The functions provided to the user by the program described are, of course, merely illustrative of the communications functions which can be implemented by suitably programming the host processor to exchange information with the interface card. In addition to the 1200 baud, originate mode modem communications capability implemented as operational code in the program listing which follows, much of the code necessary to implement 2400 baud V.22bis modem communication is also included in the following listing, although a fully operative 2400 baud system has not been completed and hence the 2400 baud routines that are included have not been fully tested. It should also be noted that the disclosed hardware, suitably programmed, can provide a variety of additional functions, such as facsimile and synchronous data transmission, as well as other modem modulation schemes such as the Bell 208 or U.S. Robotics HST asymmetrical transmission modes. Additional routines for performing more elaborate line equalization, echo suppression, adaptive transmission rate adjustment ("fall forward" and "fall back" to adjust to transmission noise conditions), error correction and data compression algorithms can be readily implemented by programming the host processor to manipulate transmitted and received data, either on either a concurrent, real-time basis, or by processing the data before transmission begins or after it concludes. It should also be noted that, because the telephone interface operates under direct control of the host processor, it is unnecessary to embed control sequences (e.g. AT command code sequences) within the data stream to provide communications control functions. It is accordingly possible to much more rapidly respond to events which occur, either in the host computer, the telephone link, or at the remote data terminal equipment, so that flow control procedures (for example) can be more rapidly, more transparently, and more effectively handled than is currently possible with separate modems which must be controlled by escape signals imbedded in the data stream, typically with mandatory guard times which accompany the unique pattern of characters forming the escape signal.

Most importantly, however, the present invention is implementing virtually any voice or digital communications function which can be accomplished over voice-grade lines without needing different hardware. This versatility is achieved by transferring substantially all of the functionality from the conventional separate communications processor (which is typically programmed with resident firmware and/or employs special purpose analog or digital circuitry for signal processing functions) to the available processor in the host computer, which can be programmed to perform a suite of functions whether presently available or yet to be developed.

It is to be understood that the arrangement which has been described, and which is implemented by the programs listed below, is merely illustrative of one application of the principles of the invention. Numerous modifications may be made by those skilled in the art without departing from the true spirit and scope of the invention.

Program Listing

The assembly language listing for the modules discussed above appears below:

```
;%%%%%%%%%%%% COPYRIGHT 1993 U.S. ROBOTICS, INC %%%%%%%%%%%%%%%%
.model small
.286
.stack 200h
;%%%%%%%%%%%%%%%%%%%%%%%%%%%%%%%%%%%%%%%%%%%%%%%%%%%%%%
;
;            MAIN (the user interface into the modem)
;
;            Main sets up the DMA channels and initializes the modem
;            interrupts.
;
;%%%%%%%%%%%%%%%%%%%%%%%%%%%%%%%%%%%%%%%%%%%%%%%%%%%%%%
            include    equates
            public     vid_mode, rx_sample_segment, tx_sample_segment
            public     ds_segment,tx_dma_ala16,rx_dma_ala16
            public     set_aic_bands,init_dma,speaker_on,speaker_off
            public     on_hook,off_hook,tx_dma_off,rx_dma_off
            public     display_segment,attribute,init_aic
            public     init_aic_tx48_rx72,sreg
            public     init_tx_dma,tx_dma_on
            public     rx_dma_on ,main_flags
extrn init_dbox:near,init_tx:near,init_recv:near
extrn demod:near,tx1224:near,softmodem:near
extrn dbox_address:near,init_timer:near
extrn disable_int:near,wedge_int:near
extrn nul_routine:near,send_tones:near
extrn dial:near,init_screen:near,window_flip:near
extrn ring_detect: near,no_ring_state:near
extrn save_screen:near,restore_screen:near
extrn init_comm_screen:near,screen_out:near
extrn callp_main:near,print_parity:near
extrn touch_tone_detect:near,dtmf:near,init_callp:near
extrn get_callp:near,get_touch_tone:near
extrn rx_char_in:word,rx_char_out:word
extrn tx_char_in:word,tx_char_out:word
extrn rx_char_buf_start:word,rx_char_buf_end:word
extrn tx_char_buf_start:word,tx_char_buf_end:word
extrn recv_flags:word,rx_out:word,baud_count:word
extrn tx_in_ptr:word,tx_flags:word
extrn recv_vector:word,tx_vector:word
extrn freq:word,ring_state:word
extrn main_menu:byte,start_message:byte,end_message:byte
extrn int_flags:byte,outgoing_msg:byte,recording_msg:byte
buffer_word_size equ 8192-1
            stack_length   equ 200h/16
            rx_buf_len     equ 8192 * 2
            tx_buf_len     equ 8192 * 2
.data
            main_flags dw  ?
;           main_flags.0   = 1 No recv data
;           main_flags.1   = 1 Auto-answer in data mode versus voice mode
;           main_flags.2   = 1 TX DMA on
;           main_flags.3   = 1 Ignore Loop Loss
;           main_flags.4   = 1 Loop loss status
;           main_flags.5   = 1 Annouce rings
;           main_flags.8   = 1 Odd/Mark = 0 Even/Space
;           main_flags.9   = 1 Force parity
;           main_flags.10  = 1 Parity ON
            dbox_ok        db  ?     ; <>0 = graphics adaptor present
            vid_mode db    ?         ; save the old video state
            out_latch db   ?         ; image of output latch
            temp_address_low dw      ?
            temp_address_high dw     ?
            init_AIC_tx96_rx96       dw  9,9,3,0ff47h,03h,1e3ch,03h,0dh
                                     dw  03h,3872h,0,0,0,0,0,0
            init_AIC_voice           dw  9,9,3,0ff47h,03h,1c38h,03h,0dh
                                     dw  03h,50a2h,0,0,0,0,0,0 ; RX 7200
            init_AIC_tx48_rx96       dw  9,9,3,0ff47h,03h,383ch,03h,0dh
                                     dw  03h,3c72h,0,0,0,0,0,0
            init_AIC_tx48_rx72       dw  9,9,3,0ff47h,03h,3838h,03h,0dh
                                     dw  03h,3ca2h,0,0,0,0,0,0
            init_AIC_tx96_rx48       dw  9,9,3,0ff47h,03h,1e70h,03h,0dh
                                     dw  03h,387ah,0,0,0,0,0,0
            init_AIC_tx48_rx48       dw  9,9,3,0ff47h,03h,3870h,03h,0dh
                                     dw  03h,3c7ah,0,0,0,0,0,0
            ds_segment               dw  ?
            psp_segment              dw  ?    ; program segment prefix
; Dynamically allocated sample buffers
            tx_sample_segment        dw  ?
```

-continued

```
            tx_dma_ala16        dw  ?
            tx_dma_page         dw  ?
            rx_sample_segment   dw  ?
            rx_dma_ala16        dw  ?
            rx_dma_page         dw  ?
            ram_error_msg       db  cr,1f,'Insufficient RAM',cr,1f,'$'
            shrink_error_msg    db  cr,lf,'Error during RAM shrink',cr,1f,'$'
            display_segment     dw  ?
            attribute           db  ?
       EVEN
            playback_file       db  'msg1.dat',0,0,0,0,0,0,0
; MODEM SPECIFIC REGISTERS
            sreg     dw     1,0,43,13,10,8,2,30,2,17,7,70
.code
SOFT_MODEM PROC NEAR
            mov      dx,@data
            mov      ds,dx
            cld
            mov      psp_segment,es
            mov      ds_segment,ds     ; save for further reference
; shrink RAM to the size of the program
            mov      bx,ss             ; find the end of the program
            add      bx,stack_length   ; add length of the stack in paragraphs
            mov      ax,es
            sub      bx,ax             ; subtract start of the program
            inc      bx                ; add one for good measure
            mov      ah,4ah            ; shrink ram
            int      21h               ; ES points to PSP
            mov      dx,offset shrink_error_msg
            jc       alloc_error
            mov      es,ds_segment
            call     allocate_buffers  ; get the two 8K word sample buffers
            jnc      alloc_ok
            mov      dx,offset ram_error_msg
alloc_error:
            mov      ah,09h
            int      21h
exit_jmp:
            jmp      main_exit
alloc_ok:
            mov      out_latch,0ffh
            mov      ah,0fh            ; get the current video mode and save
            int      10h
            mov      vid_mode,al
; presence test for EGA/VGA
            mov      dbox_ok,0
            xor      bx,bx
            mov      ax,1a00h          ; VGA display info
            int      10h
            cmp      al,1ah            ; AL returned as 1ah if supported
            jne      no_vga
            mov      dbox_ok,0ffh
            jmp      short presence_done
no_vga:
            mov      ah,12h            ; EGA display info
            mov      bl,10h
            int      10h
            cmp      bl,10h            ; if bl remains the same the no EGA
            je       presence_done
            mov      dbox_ok,0ffh
presence_done:
; get the display segment
            int      11h               ; color or monochrome monitor ?
            and      ax,30h
            cmp      ax,30h
            mov      display_segment,mono
            mov      attribute,07h
            je       mono_disp
            mov      attribute,01bh
            mov      display_segment,color seg
mono_disp:
            mov      main_flags,0      ;
       IF board
            lea      si,init_aic_tx96 rx96  ; tx 9600 rx 9600
            call     init_aic
            call     init_dma
            mov      ring_state,offset no_ring_state
            mov      recv_vector,offset ring_detect
            mov      tx_vector,offset nul_routine
```

-continued

```
        call    wedge_int
; check for any command line options
        mov     es,psp_segment
        mov     bx,80h
        mov     cl,[es:bx]              ; get the command line option count
        xor     ch,ch
        inc     bx
        cmp     cx,0
        je      init_ring
space_loop:
        mov     al,[es:bx]
        inc     bx
        cmp     al,' '
        jne     got_char
        loop    space_loop
got_char:
        dec     bx
        lea     si,playback_file
        cmp     cx,12
        jle     get_name
        mov     cx,12
get_name:
        mov     a1,[es:bx]
        inc     bx
        mov     [ds:si],a1
        inc     si
space_off:
        loop    get_name
        xor     al,al                   ; terminate
        mov     [ds:si],a1
        call    speaker_on
        lea     dx,playback_file
        call    playback_msg
        call    speaker_off
        jmp     main_exit
init_ring:
        push    ds
        pop     es
; re-init all the vectors
        mov     ring_state,offset no_ring_state
        mov     recv_vector,offset ring_detect
        mov     tx_vector,offset nul_routine
        call    on_hook
        call    speaker_off
    ENDIF
main_screen:
; hide the cursor
        mov     ah,02h
        xor     bh,bh
        mov     dh,25
        mov     d1,0
        int     10h
        and     main_flags,0700h        ; every thing but parity
        call    init_screen
        call    print_parity
main_loop:
    IF board
        call    on_hook
    ENDIF
no_hangup:
        lea     si,main_menu
        call    window_flip
get_key:
        mov     ah,1
        int     16h
        jnz     menu_command
        test    int_flags,b0
        jz      get_key                 ; check for ring
        and     int_flags,0feh
        test    main_flags,b0
        jnz     aa_data
        lea     si,main_menu
        call    window_flip
        call    answering_machine
        jmp     short main_loop
aa_data:
;       call    aa_comm_mode
        jmp     short main_loop
menu_command:
```

```
                mov     ah,0
                int     16h
                cmp     ax,F1
                jne     chk_record
                lea     si,main_menu
                call    window_flip
                call    originate_mode_init
                call    comm_mode
        IF board
                jmp     short init_ring
        ELSE
                jmp     short main_screen
        ENDIF
chk_record:
                cmp     ax,F2
                jne     chk_playback
                lea     si,main_menu
                call    window_flip
                call    off_hook
                call    speaker_off
                or      main_flags,b3       ; ignore loop loss
                lea     si,start_message
                call    window_flip
                mov     ah,0                ; get a key
                int     16h
                lea     si,start_message
                call    window_flip
                lea     si,end_message
                call    window_flip
        IF board
                lea     dx,out_wsg
                call    record_msg
        ELSE
                mov     ah,0
                int     16h
        ENDIF
                lea     si,end_message
                call    window_flip
                jmp     main_loop
chk_playback:
        IF board
                cmp     ax,F3
                jne     chk_tone
                lea     si,main_menu
                call    window_flip
                call    on_hook
                call    speaker_on
try_again:
                lea     dx,playback_file
                call    playback_msg
                jc      bad_play
                mov     bx,offset playback_file
                inc     byte ptr [bx+3]
no_files:
                call    speaker_off
                jmp     main_loop
bad_play:
                mov     bx,offset playback_file
                cmp     byte ptr [bx+3], '1'
                je      no_files
                mov     byte ptr [bx+3], '1'
                jmp     short try_again
        ENDIF
chk_tone:
                cmp     ax,F4
                jne     chk_dial
                lea     si,main_menu
                call    window_flip
        IF board
                call    speaker_on
        ENDIF
                mov     freq,tone_2225
                mov     ax,1000             ; ten seconds
                call    send_tones
        IF board
                call    speaker_off
        ENDIF
                jmp     main_loop
chk_dial:
```

```
                cmp     ax,F5
                je      originate_mode
                jmp     chk_F6
originate_mode:
                lea     si,main_menu
                call    window_flip
                call    dial
        IFE board
                jmp     no_hangup
        ELSE
                mov     sreg+9,17           ; 600 ms of answer tone
                mov     sreg+7,30           ; 30 second time out
                call    callp_main
                jnc     got_atone
                jmp     main_1oop
got_atone:
                call    setup_loop_current
                or      recv_flags,1h       ;recv_high
                call    init_comm_screen
                and     main_flags,NOT b0
                call    init_recv
                or      recv_flags,08h      ; data mode
;               cmp     dbox_ok,0
;               je      no_dbox1
;               and     recv_flags,0fff7h
;               call    init_dbox
; no_dbox1:
                call    init_rx_dma
                cli
                mov     ax,150
                call    init_timer
                mov     recv_vector,offset demod
; enable DMA channel 2 RECV DMA
                call    rx_dma_on
                sti
wait_connect:
                test    recv_flags,b5
                jz      wait_connect
                call    speaker_off
                mov     rx_char_in,offset rx_char_buf_start
                mov     rx_char_out,offset rx_char_buf_start
                call    comm_mode
                jmp     init_ring
        ENDIF
chk_f6:
                cmp     ax,F6
                jne     chk_ttone_detect
                lea     si,main_menu
                call    window_flip
                call    callp_main
                jmp     no_hangup
chk_ttone_detect:
                cmp     ax,F7
                jne     chk_message_system
                lea     si,main_menu
                call    window_flip
                call    off_hook
                call    speaker_on
                call    touch_tone_detect
                call    on_hook
                call    speaker_off
                jmp     no_hangup
chk_message_system:
                cmp     ax,f8
                jne     chk_on_off_hook
                lea     si,main_menu
                call    window_flip
                call    messaging_system
                jmp     no_hangup
chk_on_off_hook:
        IF board
                cmp     ax,ALT_H
                jne     chk_spkr
                mov     dx,modem_board
                xor     out_latch,1
                mov     a1,out_latch
                out     dx,al
                jmp     get_key
chk_spkr:
```

```
                cmp     ax,ALT_S
                jne     chk_parity
                mov     dx,modem_board
                xor     out_latch,8
                mov     al,out_latch
                out     dx,al
                jmp     get_key
        ENDIF
chk_parity:
                cmp     ax,ALT_P
                jne     chk_answer_mode
                call    new_parity
                jmp     get_key
chk_answer_mode:
                cmp     ax,ALT_A
                jne     chk_exit
                xor     main_flags,b5   ; change answering machine answer mode
                jmp     get_key
chk_exit:
                cmp     ax,F10
                je      main_exit
                jmp     get_key
main_exit:
                call    disable_int
                mov     ah,15           ; CLS
                int     10h
                mov     ah,0
                int     10h
                mov     ah,4ch          ; exit
                xor     al,al
                int     21h
SOFT_MODEM ENDP
;
;%%%%%%%%%%%%%%%%%%%%%%%%%%%%%%%%%%%%%%%%%%%%%%%%%
;
INIT_DMA        PROC NEAR
                call    tx_dma_off
                call    rx_dma_off
                mov     dx wr_cmd       ; command register
                mov     al,00000000b
                out     dx,al
                jmp     $+2
                mov     dx,wr_mode
                mov     al,01010011b    ; channel 1
                out     dx,al
                jmp     $+2
                mov     al,01010110b    ; channel 2
                out     dx,al
                jmp     $+2
                call    init_tx_dma
                call    init_rx_dma
                ret
INIT_DMA ENDP
;
;%%%%%%%%%%%%%%%%%%%%%%%%%%%%%%%%%%%%%%%%%%%%%%%%%
;
INIT_TX_DMA     PROC NEAR
                mov     dx,wr_clr_byte_ptr  ; init flag to low byte
                out     dx,al
                jmp     $+2
                mov     ax,tx_dma_ala16
; AX contains A1-A16 of the tx buffer
                mov     dx,dma_5_address
                out     dx,al
                jmp     $+2
                mov     al,ah
                out     dx,al
                jmp     $+2
                mov     ax,tx_dma_page
                mov     dx,dma_5_page
                out     dx,al
                jmp     $+2
                mov     dx,wr_clr_byte_ptr  ; init flag to low byte
                out     dx,al
                jmp     $+2
; Write the buffer size to each channel
                mov     ax,buffer_word_size
                mov     dx,dma_5_count
                out     dx,al
```

```
                jmp       $+2
                mov       al,ah
                out       dx,al
                jmp       $+2
                ret
INIT_TX_DMA ENDP
;
;%%%%%%%%%%%%%%%%%%%%%%%%%%%%%%%%%%%%%%%%%%%%%%%%
;
INIT_RX_DMA PROC NEAR
                mov       dx,wr_clr_byte_ptr    ; init flag to low byte
                out       dx,al
                jmp       $+2
; setup the receive buffer samples
                mov       ax,rx_dma_ala16
                mov       dx,dma_6_address
                out       dx,al
                jmp       $+2
                mov       al,ah
                out       dx,al
                jmp       $+2
                mov       ax,rx_dma_page
                mov       dx,dma_6_page
                out       dx,al
                jmp       $+2
                mov       dx,wr_clr_byte_ptr    ; init flag to low byte
                out       dx,al
                jmp       $+2
                mov       dx,dma_6_count
                mov       ax,buffer_word_size
                out       dx,al
                jmp       $+2
                mov       al,ah
                out       dx,al
                jmp       $+2
                ret
INIT_RX_DMA ENDP
;
;%%%%%%%%%%%%%%%%%%%%%%%%%%%%%%%%%%%%%%%%%%%%%%%%
;
INIT_AIC        PROC NEAR
; disable DMA channels
                call      rx_dma_off
                call      tx_dma_off
                mov       dx,wr_cmd             ; command register
                mov       al,00000000b
                out       dx,al
                jmp       $+2
                mov       dx,wr_mode
                mov       al,01011001b          ; channel 1
                out       dx,al
                jmp       $+2
                mov       dx,wr_clr_byte_ptr    ; init flag to low byte
                out       dx,al
                jmp       $+2
                mov       ax,tx_dma_ala16
; AX contains A1-A16 of the tx buffer
                mov       dx,dma_5_address
                out       dx,al
                jmp       $+2
                mov       al,ah
                out       dx,al
                jmp       $+2
                mov       ax,tx_dma_page
                mov       dx,dma_5_page
                out       dx,al
                jmp       $+2
                mov       dx,wr_clr_byte_ptr    ; init flag to low byte
                out       dx,al
                jmp       $+2
; Write the buffer size to each channel
                mov       ax,buffer_word_size
                mov       dx,dma_5_count
                out       dx,al
                jmp       $+2
                mov       al,ah
                out       dx,al
                jmp       $+2
end_dma:
```

-continued

```
; reset the AIC
        mov     dx,modem_board
        and     out_latch,0fbh
        mov     a1,out_latch
        out     dx,a1
        mov     cx,100
here2:
        loop    here2
        or      out_latch,4h
        mov     a1,out_latch
        out     dx,al
; DS:SI already setup
        xor     di,di
        mov     es,tx_sample_segment
        mov     cx,16
        rep     movsw
; enable DMA channel 1
        call    tx_dma_on
wait_aic:
        mov     dx,wr_clr_byte_ptr    ; init flag to low byte
        out     dx,a1
        jmp     $+2
        mov     dx,dma_5_count
        in      a1,dx
        mov     bl,al
        jmp     $+2
        in      al,dx
        mov     bh,al
        cmp     bx,buffer_word_size - 14
        jge     wait_aic
; disable DMA channel 1
        call    tx_dma_off
; clear out the AIC commands
        mov     es,tx_sample_segment
        xor     di,di
        mov     cx,ll
        xor     ax,ax
        rep     stosw
; AIC has been initialized
        ret
INIT_AIC ENDP
;
;%%%%%%%%%%%%%%%%%%%%%%%%%%%%%%%%%%%%%%%%%%%%%%%%
;
MISC_ROUTINES PROC NEAR
off_hook:
        mov     dx,modem_board
        and     out_latch,0feh
        mov     al,out_latch
        out     dx,al
        ret
on_hook:
        mov     dx,modem_board
        or      out_latch,l
        mov     al,out_latch
        out     dx,al
        ret
speaker_on:
        mov     dx,modem_board
        and     out_latch,0f7h
        mov     al,out_latch
        out     dx,al
        ret
speaker_off:
        mov     dx,modem_board
        or      out_latch,8
        mov     al,out_latch
        out     dx,al
        ret
MISC_ROUTINES ENDP
;
;%%%%%%%%%%%%%%%%%%%%%%%%%%%%%%%%%%%%%%%%%%%%%%%%
;
ALLOCATE_BUFFERS PROC NEAR
; get TX buffer first
        mov     ah,48h          ; allocate memory
        mov     bx,400h         ; 16K bytes
        int     21h
        jc      error_exitl
```

-continued

```
; now find out if the DMA address register will overflow
; AX = segment
        mov     tx_sample_segment,ax
        mov     bx,ax
        shl     ax,4
        rol     bx,4
        and     bx,0fh
        shr     bx,1
        rcr     ax,1
        shl     bx,1              ; restore A16–A23
        mov     tx_dma_page,bx
        mov     tx_dma_ala16,ax
        cmp     ax,0              ; if the DMA address is positive
                                  ; then don't worry . . . be happy
        jge     no_problem
        add     ax,2000h          ; word count
        cmp     ax,0
        jl      no_problem        ; still enough words
; the last buffer won't work so get the next, it will
        mov     ah,48h            ; allocate memory
        mov     bx,400h           ; 16K bytes
        int     21h
error_exit1:
        jc      error_exit
        mov     tx_sample_segment,ax
        mov     bx,ax
        shl     ax,4
        rol     bx,4
        and     bx,0fh
        shr     bx,1
        rcr     ax,1
        shl     bx,1              ; restore A16–A23
        mov     tx_dina_page,bx
        mov     tx_.dma_ala16,ax
no_problem:
; Now get the RX buffer
        mov     ah,48h            ; allocate memory
        mov     bx,400h           ; 16K bytes
        int     21h
        jc      error_exit
; now find out if the DMA address register will overflow
; AX = segment
        mov     rx_sample_segment,ax
        mov     bx,ax
        shl     ax,4
        rol     bx,4
        and     bx,0fh
        shr     bx,1
        rcr     ax,1
        shl     bx,1              ; restore A16–A23
        mov     rx_dma_page,bx
        mov     rx_dma_ala16,ax
        cmp     ax,0              ; if the DMA address is positive
                                  ; then don't worry . . . be happy
        jge     good exit
        add     ax,2000h          ; word count
        cmp     ax,0
        jl      good_exit         ; still enough words
; the last buffer won't work so get the next, it will
        mov     ah,48h            ; allocate memory
        mov     bx,400h           ; 16K bytes
        int     21h
        jc      error_exit
        mov     rx_sample_segment,ax
        mov     bx,ax
        shl     ax,4
        rol     bx,4
        and     bx,0fh
        shr     bx,1
        rcr     ax,1
        shl     bx,1              ; restore A16–A23
        mov     rx_dma_page,bx
        mov     rx_dma_ala16,ax
good_exit:
        clc
error_exit:
        ret
ALLOCATE_BUFFERS ENDP
;
```

```
;%%%%%%%%%%%%%%%%%%%%%%%%%%%%%%%%%%%%%%%%%%%%%%%
;
RECORD_MSG PROC NEAR
.data
        in_file         db      'msgl.dat',0
        handle          dw      ?
        end_flag        db      ?
        start_msg       db      cr,lf,  'Hit a key to begin recording',cr,lf,'$'
        end_msg         db      cr,lf,'Hit a key to stop recording',cr,lf,'$'
        bad_create      db      cr,lf,  'Bad file create',cr,lf,'$'
.code
        mov     ah,03ch                 : create file
        xor     cx,cx                   ; normal access
        int     21h
        jnc     file_ok
        lea     dx,bad_create
        jmp     error_exit
file ok:
        mov     handle,ax
        lea     si,init_aic_voice       ; tx 9600 rx 9600
        call    init_aic
        call    init_dma
; dma is setup
; enable DMA channel 2 RECV DMA
        call    rx_dma_on
        mov     rx_out,0
        mov     end_flag,0
; set up the next address
record_loop:
        mov     dx,wr_clr_byte_ptr      ; init flag to low byte
        out     dx,al
        jmp     $+2
; how many words are there in the receive buffer?
        mov     dx,dma_6_address        ; get RX in
        in      al,dx
        mov     cl,al
        jmp     $+2
        in      al,dx
        mov     ch,al
        jmp     $+2
        mov     dx,wr_clr_byte_tr       ; init flag to low byte
        out     dx,al
        jmp     $+2
; check to see if the low byte rolled over
        mov     dx,dma_6_address
        in      al,dx
        cmp     cl,al
        je      read_ok
        mov     cl,al
        in      al,dx
        mov     ch,al
read_ok:
        mov     ax,rx_out
        shr     ax,l                    ; words
        add     ax,rx_dma_ala16
        sub     cx,ax
        jns     pos_diff
        add     cx,(rx_buf_len/2)
pos_diff:
;       shr     ax,l                    ; word count
        cmp     cx,800h                 ; 2k words
        jge     save_it
        cmp     end_flag,0
        jne     record_loop
        mov     ah,l
        int     16h
        jnz     end_record
        test    main_flags,b3           ; ignore loop loss
        jnz     record_loop
        test    main_flags,b4           ; loop loss?
        jz      record_loop
end_record:
        mov     end_flag,0ffh
        jmp     short record_loop
save_it:
        push    ds
        mov     cx,1000h                ; 4k bytes
        mov     bx,handle
        mov     dx,rx_out
```

```
                mov         ah,040h
                mov         ds,rx_sample_segment
                int         21h
                pop         ds
                mov         ax,rx_out
                add         ax,1000h
                cmp         ax,rx_buf_len
                jne         no_rollover
                xor         ax,ax
no_rollover:
                mov                             rx_out,ax
                cmp                             end_flag,0
                jne                             end_record_dma
                jmp                             record_loop
end_record_dma:
; disable DMA channel 2 RECV DMA
                call        rx_dma_off
                mov         bx,handle           ; close the file
                mov         ah,03eh
                int         21h
                ret
error_out:
                mov         ah,09h
                int         21h
                ret
RECORD_MSG ENDP
;
;%%%%%%%%%%%%%%%%%%%%%%%%%%%%%%%%%%%%%%%%%%%%%
;
PLAYBACK_MSG PROC NEAR
.data
        out_msg         db          'msg1.dat',0
        bad_open        db          cr,lf, 'Bad file open',cr,lf,'$'
.code
        mov         ah,03dh                     ; open file
        xor         al,al                       ; read access
        int         21h
        jnc         file_open
;       lea         dx,bad_open
;       mov         ah,09h
;       int         21h
        ret
file_open:
        mov         handle,ax
        lea         si,init_aic_voice           ; tx 9600 rx 9600
        call        init_aic
        call        init_dma
; dma is setup
        mov         tx_in_ptr,0
playback_loop:
        mov         ah,1
        int         16h
        jz          no_abort
        jmp         abort_pb
no_abort:
        mov         dx,wr_clr_byte_ptr          ; init flag to low byte
        out         dx,al
        jmp         $+2
        mov         dx,dma_5_address
        in          al,dx
        mov         cl,al
        jmp         $+2
        in          al,dx
        mov         ch,al
        jmp         $+2
        mov         dx,wr_clr_byte_ptr          ; init flag to low byte
        out         dx,al
        jmp         $+2
; check for low byte rollover
        mov         dx,dma_5_address
        in          al,dx
        cmp         al,cl
        je          tx_address_ok
        mov         cl,al
        jmp         $+2
        in          al,dx
        mov         ch,al
        jmp         $+2
tx_address_ok:
```

-continued

```
        mov     ax,tx_in_ptr           ; calculate the tx buffer address
        shr     ax,1                   ; word address
        add     ax,tx_dma_ala16
        sub     ax,cx
        jns     pos_diff2
        add     ax,(tx_buf_len/2)
pos_diff2:
;       shr     ax,1                   ; word count
        cmp     ax,800h                ; less than 2K words in the buffer?
        jge     playback_loop
; file the tx buffer with 2K words of samples
        mov     ah,03fh                ; file read
        mov     bx,handle
        mov     cx,1000h               ; 4K bytes
        mov     dx,tx_in_ptr
        push    ds
        mov     ds,tx_sample_segment
        int     21h
        pop     ds
        push    ax
; enable DMA channel 1 TX DMA
        call    tx_dma_on
        pop     ax
        cmp     ax,0
        je      file_end
        add     tx_in_ptr,1000h        ; adjust input pointer
        cmp     tx_in_ptr,tx_buf_len
        jne     playback_loop
        mov     tx_in_ptr,0
        jmp     short playback_loop
file_end:
        mov     bx,tx_in_ptr           ; calculate the tx buffer address
        shr     bx,1                   ; word address
        add     bx,tx_dma_ala16
wait_end_loop:
; wait for tx_in_ptr and the DMA 5 address to be the same
        mov     dx,wr_clr_byte_ptr     ; init flag to low byte
        out     dx,a1
        jmp     $+2
        mov     dx,dma_5_address
        in      al,dx
        mov     cl,a1
        jmp     $+2
        in      a1,dx
        mov     ch,al
        jmp     $+2
        mov     dx,wr_clr_byte_ptr     ; init flag to low byte
        out     dx,a1
        jmp     $+2
; check for low byte rollover
        mov     dx,dma_5_address
        in      a1,dx
        cmp     a1,c1
        je      tx_address_ok2
        mov     c1,a1
        jmp     $+2
        in      a1,dx
        mov     ch,al
        jmp     $+2
tx_address_ok2:
        cmp     bx,cx
        jne     wait_end_loop
abort_pb:
; disable DMA channel 1 TX DMA
        call    tx_dma_off
;       call    speaker_off
        mov     bx,handle              ; close the file
        mov     ah,03eh
        int     21h
        clc
        ret
PLAYBACK_MSG ENDP
;
;%%%%%%%%%%%%%%%%%%%%%%%%%%%%%%%%%%%%%%%%%%%%%%
;
COMM_MODE PROC NEAR
comm_loop:
    IFE board
;       mov     cx,20000
```

```
;here:
;         loop      here
;         call      tx1224
          call      demod
    ENDIF
          mov       ah,1                    ; any keys hit?
          int       16h
          jz        check_receive
          jmp       got_key
check_receive:
          test      main_flags,b3           ; ignore loop current?
          jnz       chk_dbox_mode
          test      main_flags,b4
          jz        chk_dbox mode
          jmp       dbox check
chk_dbox_mode:
    IFE board
          test      main_flags,b0
          jnz       data ok
          cmp       baud_count,300          ; 1.5 seconds
          jle       comm_loop               ; blow off data for 1.5 seconds
          or        main_flags,b0
          mov       rx_char_in,offset rx_char_buf_start
          mov       rx_char_out,offset rx_char_buf_start
data_ok:
    ENDIF
          test      recv_flags,b3           ; are we in display box mode?
          jz        comm_loop
          mov       si,rx_char_out          ; check for receive chars
          cmp       si,rx_char_in
          je        comm_loop
          lodsb
          cmp       si,offset rx_char_buf_end
          jne       save_char_out
          mov       si,offset rx_char_buf_start
save_char_out:
          mov       rx_char_out,si
          mov       bx,5b20h ; ' '
; do parity checking
          test      main_flags,b10
          jz        no_parity
          test      main_flags,b9
          jz        check_even_odd
          test      main_flags,b8
          jnz       check_mark
          test      al,80h
          jz        good_receive
          mov       bx,3545h
          jmp       short good_receive
check_mark:
          test      al,80h
          jnz       good_receive
          mov       bx,3545h
          jmp       short good_receive
check_even_odd:
; even or odd
          test      main_flags,b8
          jz        check_even
          cmp       al,0
          jpo       good_receive
          mov       bx,3545h
          jmp       short good_receive
check_even:
          cmp       al,0
          jpe       good_receive
          mov       bx,3545h
good_receive:                               ; if parity is wrong turn . . . flash parity
          mov       es,display_segment
          mov       di,70
          mov       [es:di],bx
          and       al,7fh
no_parity:
          call      screen_out
          jmp       comm_loop
got_key:
          mov       ah,0
          int       16h
          cmp       ax,F1
          jne       check_f2
```

-continued

```
            test        recv_flags,b3       ; check if we are in display box mode
            jnz         comm_loop_jmp
            or          recv_flags,08h      ; turn off the dbox while changing vid modes
            call        dbox_address
            and         recv_flags,0fff7h
            jmp         comm_loop
check_f2:
            cmp         ax,F2
            jne         check_parity
            test        recv_flags,b3
            jnz         go_dbox
            or          recv_flags,08h
            mov         al,vid_mode         ; restore the initial video mode
            mov         ah,0
            int         10h
            call        restore_screen
comm_loop_jmp:
            jmp         comm_loop
go_dbox:
            cmp         dbox_ok,0
            je          comm_loop_jmp       ; display does not support graphics
            call        save_screen
            call        init_dbox
            and         recv_flags,0fff7h
            jmp         comm_loop
check_parity:
            cmp         ax,ALT_P
            jne         check_ascii
            call        new_parity
            jmp         comm_loop
check_ascii:
            cmp         al,0                ; ASCII ?
            je          check_exit
; set up the correct parity
            test        main_flags,b10
            jz          send_it
            test        main_flags,b9
            jnz         force_it
            test        main_flags,b8
            jnz         odd_parity
            cmp         al,0                ; set parity bits
            jpe         send_it
            or          al,80h
            jmp         short send_it
odd_parity:
            cmp         al,0                ; set parity bits
            jpo         send_it
            or          al,80h
            jmp         short send_it
force_it:                                   ; mark or space parity
            and         al,7fh
            test        main_flags,b8
            jz          send_it
            or          al,80h
send_it:
; put the key into the transmit buffer
            mov         es,ds_segment
            cli
            mov         di,tx_char_in
            stosb
            cmp         di,offset tx_char_buf_end
            jne         save_di
            lea         di,tx_char_buf_start
save_di:
            cmp         di,tx_char_out      ; is the buffer full?
            je          loop_end            ; yes so don't update the pointer
            mov         tx_char_in,di
            sti
check_exit:
            cmp         ax,F10
            je          dbox_check          ; F10
loop_end:
            sti
            jmp         comm_loop
dbox_check:
            test        recv_flags,b3       ; are we data mode ?
            jnz         exit
            or          recv_flags,08h
            mov         al,vid_mode         ; restore the initial video mode
```

-continued

```
            mov     ah,0
            int     10h
exit:
            call    tx_dma_off
            call    rx_dma_off
            cli
            mov     tx_vector,offset nul_routine
            mov     recv_vector,offset nul_routine
            sti
            ret
COMM_MODE ENDP
;
;%%%%%%%%%%%%%%%%%%%%%%%%%%%%%%%%%%%%%%%%%
;
SET_AIC_BANDS PROC NEAR
; set up the AIC
            lea     si,init_aic_tx96_rx96
            test    tx_flags,b0
            jnz     tx96
            lea     si,init_aic_tx48_rx48
            test    recv_flags,b0
            jz      init_interface
            lea     si,init_aic_tx48_rx96
            jmp     short init_interface
tx96:
            test    recv_flags,b0
            jnz     init_interface
            lea     si,init_aic_tx96_rx48
init_interface:
            call    init_aic
            ret
SET_AIC_BANDS ENDP
;
;%%%%%%%%%%%%%%%%%%%%%%%%%%%%%%%%%%%%%%%%%
;
TX_DMA_OFF PROC NEAR
    IF board
; disable DMA channels 1
            mov     dx,wr_single_mask
            mov     a1,00000101b      ; mask channel 1
            out     dx,al
            and     main_flags,NOT b2
    ENDIF
            ret
TX_DMA_OFF ENDP
;
;%%%%%%%%%%%%%%%%%%%%%%%%%%%%%%%%%%%%%%%%%
;
RX_DMA_OFF PROC NEAR
    IF board
    ; disable DMA channels 2
            mov     dx,wr_single_mask
            mov     a1,00000110b      : mask channel 2
            out     dx,al
    ENDIF
            ret
RX_DMA_OFF ENDP
;
;%%%%%%%%%%%%%%%%%%%%%%%%%%%%%%%%%%%%%%%%%
;
TX_DMA_ON PROC NEAR
    IF board
            test    main_flags,b2
            jnz     already_on
; enable DMA channels 1
            mov     dx,wr_single_mask
            mov     a1,0000000lb      ; unmask channel 1
            out     dx,al
            or      main_flags,b2
already_on:
    ENDIF
            ret
TX_DMA_ON ENDP
;
;%%%%%%%%%%%%%%%%%%%%%%%%%%%%%%%%%%%%%%%%%
;
RX_DMA_ON PROC NEAR
    IF board
; enable DMA channels 2
```

-continued

```
            mov     dx,wr_single_mask
            mov     al,00000010b          ; unmask channel 2
            out     dx,al
        ENDIF
            ret
RX_DMA_ON ENDP
;
;%%%%%%%%%%%%%%%%%%%%%%%%%%%%%%%%%%%%%%%%%%%%%%%
;
ANSWERING_MACHINE PROC NEAR
.data
        record_file  db       'msgl.dat',0
        announce_file  db     'announce.dat',0
.code
            test    main_flags,b5
            jz      yes_answer
            call    speaker_on
            lea     dx,announce_file
            call    playback_msg
            call    speaker_off
            ret
yes_answer:
            call    off_hook
            call    speaker_off
            mov     ax,50
            call    init_timer
wait_for_timer:
            test    recv_flags,b5
            jz      wait_for_timer
            lea     si,outgoing_msg
            call    window_flip
            lea     dx,out_msg
            call    playback_msg
            mov     freq,tone_1500
            mov     ax,100                ; 1/2 second
            call    send_tones
            lea     si,outgoing_msg
            call    window_flip
            call    setup_loop_current
            lea     si,recording_msg
            call    window_flip
            lea     dx,record_file
            call    record_msg
            lea     si,recording_msg
            call    window_flip
            call    on_hook
            lea     bx,record_file
            inc     byte ptr [bx+3]
            ret
ANSWERING_MACHINE ENDP
;
;%%%%%%%%%%%%%%%%%%%%%%%%%%%%%%%%%%%%%%%%%%%%%%%
;
ORIGINATE_MODE_INIT PROC NEAR
        IF board
            and     tx_flags,0fffeh       ; tx low
            or      recv_flags,1h         ; recv_high
        ELSE
;           or      tx_flags,1            ; tx high
;           or      recv_flags,1          ; rx high
            and     tx_flags,0fffeh
            and     recv_flags,0fffeh
        ENDIF
            call    init_comm_screen
            and     main_flags,NOT b0
            call    init_tx
            call    init_recv
            or      recv_flags,08h        ; data mode
            cmp     dbox_ok,0
            je      no_dbox
            and     recv_flags,0fff7h
            call    init_dbox
no_dbox:
        IF board
            call    off_hook
            call    speaker_on
            call    set_aic_bands
            call    init_dma
            call    setup_loop_current
```

```
                cli
                mov     ax,150
                call    init_timer
                mov     tx_vector,offset tx1224
                mov     recv_vector,offset demod
; enable DMA channel 2 RECV DMA
                call    rx_dma_on
                sti
wait_timer:
                test    recv_flags,b5
                jz      wait_timer
                call    speaker_off
                mov     rx_char_in,offset rx_char_buf_start
                mov     rx_char_out,offset rx_char_buf_start
        ENDIF
                ret
ORIGINATE_MODE_INIT ENDP
;
;%%%%%%%%%%%%%%%%%%%%%%%%%%%%%%%%%%%%%%%%%%%
;
SETUP_LOOP_CURRENT PROC NEAR
                and     main_flags,NOT( b3 OR b4 )  ; set up loop loss
                mov     dx modem_board
                in      al,dx
                test    al,b0
                jz      got_loop_current
                or      main_flags,b3               ; ignore loop loss
got_loop_current:
                ret
SETUP_LOOP_CURRENT ENDP
;
;%%%%%%%%%%%%%%%%%%%%%%%%%%%%%%%%%%%%%%%%%%%
;
NEW_PARITY PROC NEAR
                mov     ax,main_flags
                and     ax,0700h
                inc     ah
                and     ah,07h
                cmp     ah,1
                jne     update_parity
                mov     ah,4                        ; make sure parity bit is set
update_parity:
                and     main_flags,0f8ffh
                or      main_flags,ax
                call    print_parity
                ret
NEW_PARITY ENDP
;
;%%%%%%%%%%%%%%%%%%%%%%%%%%%%%%%%%%%%%%%%%%%
;
MESSAGING_SYSTEM PROC NEAR
.data
                done            db      0
                phone_number1   db      9,8,2,5,2,4,0,0ffh
;               phone_number1   db      9,2,9,9,8,4,4,0ffh
                file_1          db      'file1.dat',0
                file_2          db      'file2.dat',0
                end_file        db      'file3.dat',0
                file_3          db      'casey.dat',0
                response_msg    db      'msg1.dat',0
                                dw      0ffffh
.code
; first dial the number
                lea     si,phone_number1
                push    si
call_loop:
    IF board
                call    off_hook
                call    speaker_on
                mov     ax,2 * 100      ; 2 sec.
                call    init_timer
off_hook_wait:
                test    recv_flags,b5
                jz      off_hook_wait
                pop     si
dial_loop:
                lodsb
                cmp     a1,0ffh
                je      dial_done
```

-continued

```
                xor     ah,ah
                mov     bx,ax
                mov     ax,7
                push    si
                call    dtmf
                pop     si
                jc      dial_done
                mov     ax,7            ; 70 ms
                call    init_timer
inter_digit_wait:
                test    recv_flags,b5
                jz      inter_digit_wait
                jmp     short dial_loop
dial_done:
                comment !
                call    init_callp
                mov     cx,28
get_ring:
                mov     ah,1
                int     16h
                jnz     key_hit
                push    cx
                call    get_callp
                test    a1,1
                jz      wait_ring
                pop     cx
                dec     cx
                jcxz    got_ring
                jmp     short get_ring
wait_ring:
                pop     cx
                mov     cx,28
                jmp     short get_ring
got_ring:
; wait for 4 seconds of silence
                mov     cx,112
get_silence:
                mov     ah_1
                int     16h
                jnz     key_hit
                push    cx
                call    get_callp
                test    a1,1
                jnz     no_silence
                pop     cx
                dec     cx
                jcxz    got_silence
                jmp     short get_silence
no silence:
                pop     cx
                mov     cx,112
                jmp     short get_silence
got_silence:
                !
                mov     ah,0
                int     16h
                lea     dx,file_1
                call    playback_msg
                call    get_touch_tone
                lea     dx,file_2
                call    playback_msg
                lea     dx,file_3
                call    playback_msg
                lea     dx,end_file
                call    playback_msg
                mov     freq,tone_1500
                mov     ax,100          ; 1/2 second
                call    send_tones
                call    setup_loop_current
                lea     dx,response_msg
                call    record_msg
                call    on_hook
        ELSE
key_hit:
        ENDIF
                mov     ah,0
                int     16h
                ret
MESSAGING_SYSTEM ENDP
```

-continued

```
            END
.model small
.286
;%%%%%%%%%%%%%%%%%%%%%%%%%%%%%%%%%%%%%%%%%%%%
;
;       INTS is the interrupt routines
;
;       This routine contains the basic interrupt driver for the SOFTMODEM.
;       Tx_vector and rx_vector point to the routines to be performed during
;       the interrupt. This module also contains the ring detect code.
;
;%%%%%%%%%%%%%%%%%%%%%%%%%%%%%%%%%%%%%%%%%%%%
            include    equates
            public     softmodem, init_timer,timer_10ms
            public     processed,nul_routine
            public     recv_vector,tx_vector,int_flags
            public     wedge_int,disable_int,ring_detect
            public     ring_state,no_ring_state,timer_reload
            public     timer_tic
            extrn tx_dma_off:near,rx_dma_off:near
            extrn recv_flags:word,main_flags:word
.data
            int_flags           db    ?
;           int_flags.0 = 1 ring detected
            ring_state          dw    ?    ; ring detect state variable
            state_count         db    ?
            cycle_count         db    ?
            old_comint          dd    ?
            recv_vector         dw    ?
            tx_vector           dw    ?
            timer_10ms          dw    ?    ; ten MS timer
            timer_tic           db    ?    ; interrrupt counter
            timer_reload        db    ?
            processed           db    ?    ; data has been sent or received
            in_int              db    0
.code
;
;%%%%%%%%%%%%%%%%%%%%%%%%%%%%%%%%%%%%%%%%%%%%
;
SOFTMODEM PROC NEAR
            pusha                          ; save context
            push       es
            push       ds
            sti
            mov        a1,20h
            out        20h,a1
            mov        dx,@data
            mov        ds,dx
            cmp        in_int,0
            jne        exit_int
            mov        in_int,0ffh
modem_loop:
            mov        processed,0
            mov        ax,recv_vector
            call       ax
            mov        ax,tx_vector
            call       ax
            cmp        processed,0
            jne        modem_loop
            mov        dx,modem board
            in         a1,dx
            sa1        a1,4
            and        ax,b4
            or         main_flags,ax       ; if one then will latch it
; ten MS timer routine
            dec        timer_tic
            jnz        timer_done
            mov        a1,timer_reload
            mov        timer_tic,al
            dec        timer_10ms
            jnz        timer_done
            or         recv_flags,20h
timer_done:
            mov        in_int,0
exit_int:
            pop        ds                  ; restore context
            pop        es
            popa
; interrupt exit
```

```
            iret
SOFTMODEM ENDP
;
;%%%%%%%%%%%%%%%%%%%%%%%%%%%%%%%%%%%%%%%%%%%%%
;
INIT_TIMER PROC NEAR
        cli
        mov     timer_10ms,ax
        and     recv_flags,0ffdfh
        mov     al,6
        test    recv_flags,b0
        jnz     high_band
        shr     al,1
high_band:
        mov     timer_tic,al
        mov     timer_reload,al
nul_routine:
        sti
        ret
INIT_TIMER ENDP
;
;%%%%%%%%%%%%%%%%%%%%%%%%%%%%%%%%%%%%%%%%%%%%%
;
WEDGE_INT PROC NEAR
    IF board
; wedge int 0bh - - - COM 2 INT
        in      al,21h                  ; set interrupt controller chip
        or      al,00001000b            ; disable com 2 int
        out     21h,al
        mov     al,0bh                  ; COM 2 interrrupt
        mov     ah,35h                  ; get current vector
        int     21h
        mov     word ptr old_comint,bx
        mov     word ptr old_comint[2],es
        mov     al,0bh
        mov     ah,25h                  ; set new vector
        lea     dx,softmodem
        push    ds
        push    cs
        pop     ds
        int     21h
        pop     ds
        in      al,21h                  ; set interrupt controller chip
        and     al,11110111B            ; enable com 2 int
        out     21h,al
    ENDIF
        ret
WEDGE_INT ENDP
;
;%%%%%%%%%%%%%%%%%%%%%%%%%%%%%%%%%%%%%%%%%%%%%
;
DISABLE_INT PROC NEAR
    IF board
        in      al,21h                  ; set interrupt controller chip
        or      al,00001000b            ; disable com 2 int
        out     21h,al
        mov     tx_vector,offset nul_routine
        mov     recv_vector,offset nul_routine
        mov     dx,word ptr old_comint
        mov     ax,word ptr old_comint[2]
        push    ds
        mov     ds,ax
        mov     al,0bh
        mov     ah,25h                  ; set new vector
        int     21h
        pop     ds
        call    rx_dma_off
        call    tx_dma_off
    ENDIF
        ret
DISABLE_INT ENDP
;
;%%%%%%%%%%%%%%%%%%%%%%%%%%%%%%%%%%%%%%%%%%%%%
;
RING_DETECT PROC NEAR
        mov     dx,modem_board
        in      al,dx
        mov     bx,ring_state
        call    bx
```

```
                ret
no_ring_state:
        mov     cycle_count,5
        test    a1,b1
        jnz     no_ring
        mov     ring_state,offset ring1
no_ring:
        ret
ring1:
        test    a1,b1
        jnz     abort_ring              ; got a spike
        mov     state_count,21          ; 35 ms
        mov     ring_state,offset wait_low  ; low long enough
                                        ; 1.667ms to 3.3ms
        ret
abort_ring:
        mov     ring_state,offset no_ring_state
        ret
wait_low:
; no manual ring check so can be low for 35ms without a problem
; if it stays low for that long then abort the ring and start over
        test    a1,b1
        jnz     went_high
        dec     state_count
        jz      abort_ring              ; low for greater than expected
        ret
went_high:
        mov     ring_state,offset wait_high
        mov     state count,20          ; can't be high more than 33.3ms
        ret
wait_high:
        test    a1,b1
        jz      count_cycle
        dec     state_count             ; went high before 5 cycles
        jz      abort_ring
        ret
count_cycle:
        dec     cycle_count
        jz      got_ring
        mov     ring_state,offset ring1
        ret
got_ring:
        mov     state_count,105         ; 175ms of no activity for ring to be
                                        ; complete
        mov     ring_state,offset wait_end
        ret
wait_end:
        test    a1,b1
        jnz     count_it
        mov     state_count,105
        ret
count_it:
        dec     state count
        jz      ring_done
        ret
ring_done:
        or      int_flags,1             ; set got ring flag
        mov     ring_state,offset no_ring_state
        ret
RING_DETECT ENDP
        END
.model small
.286
;%%%%%%%%%%%%%%%%%%%%%%%%%%%%%%%%%%%%%%%%%%%%%%%%%%%
;
;       Receive filter
;
;       This module uses a special filter algorithm for
;       band and phase splitting of the receive samples.
;
;       Receive samples are accumulated at a rate of 9600 per second
;       for high band and 4800 per second for the low band.
;
;       The receive buffer is 8192 words long as is the transmit buffer.
;
;%%%%%%%%%%%%%%%%%%%%%%%%%%%%%%%%%%%%%%%%%%%%%%%%%%%
        include equates
        public  filter_pq,rx_out,delay_ptr
        public  rx_in,baudlp_vector,save_s1
```

```
        public   r_a2_delay,i_a2_delay
        public   buffer_in,buffer_out,interp_a0,interp_a1,quad_count
        public   real_buffer,imag_buffer
        extrn    agc_average:word
        extrn    eqr_delay:word
        extrn    eqi_delay:word
        extrn    rx_sample_segment
        extrn    recv_flags:word,baud_x:word
        extrn    agc_speed:word
        extrn    agc_mant:word
        extrn    temp_x: word,temp_y:word
        extrn    agc_xsube:byte
        delay_length           equ      256
.data
        rx_out                 dw       ?
        rx_in                  dw       ?
; the following are the baud loop interpolator variables
        baud1p_vector          dw   ?       ; jump for baud loop interpolator
        quad_count             dw   ?       ; update coeff count
        buffer_in              dw   ?
        buffer_out             dw   ?
        real_buffer            dw   4 dup(?)  ; real equalizer input buffer
        imag_buffer            dw   4 dup(?)  ; imaginary buffer
        real_s1                dw   ?         ; interpolator delay lines
        imag_s1                dw   ?
        interp_a0              dw   ?         ; interpolator coefficients
        interp_a1              dw   ?
        old_x dw               ?
;       EVENDATA
;       rx_samples_start   label   word
;       rx_sample_buf      dw      8192 dup(?)
;       rx_samples_end             label word
; REAL DELAY LINES
        delay_ptr              dw   ?
        r_bl_z1                dw   ?
        r_bl_z2                dw   ?
        r_a2_delay_z1          dw   ?
        r_a2_delay dw          delay_length-1 dup(?)
        r_a2_delay_end0        dw   ?
        r_a2_delay_end1        dw   ?
        r_b2_delay_z1          dw   ?
        r_b2_delay dw          delay_length-1 dup(?)
        r_b2_delay_end0        dw   ?
        r_b2_delay_end1        dw   ?
        r_a3_delay_z1          dw   ?
        r_a3_delay dw          delay_length-1 dup(?)
        r_a3_delay_end0        dw   ?
        r_a3_delay_end1        dw   ?
; IMAGINARY DELAY LINES
        i_a1_z1                dw   ?
        i_bl_z1                dw   ?
        i_bl_z2                dw   ?
        i_a2_delay_z1          dw   ?
        i_a2_delay dw          delay_length-1 dup(?)
        i_a2_delay_end0        dw   ?
        i_a2_delay_end1        dw   ?
        i_b2_delay_z1          dw   ?
        i_b2_delay dw          delay_length-1 dup(?)
        i_b2_delay_end0        dw   ?
        i_b2_delay_end1        dw   ?
        i_a3_delay_z1          dw   ?
        i_a3_delay dw          delay_length-1 dup(?)
        i_a3_delay_end0        dw   ?
        i_a3_delay_end1        dw   ?
.code
FILTER_PQ PROC NEAR
; filter and phase split 8 or 16 samples
        mov     ch,4                  ; four times through the loop
        mov     es,rx_sample_segment
        mov     si,rx_out             ; filter sample pointer
;       mov     di,equalizer_in       ; equalizer delay line pointer
; filter 4 or 2 samples until we have a sample ready for the second
; stage. Execute the second stage and then do the same for the
; imaginary
filter_loop:
```

```
;************************************************************
;
; THE FIRST STAGE OF THE RECV FILTER IS:
;
;   IN ──[ X ]──────────┬─────[ + ]──────── OUT
;                       │        │
;         COS or        │        │
;         -SIN          │        │
;                      [ Z ]    [ Z ]
;                       │        │
;                       │        │
;                       │        │
;                       │       [ Z ]
;                       │        │
;                       └──────[ X ]
;                               -1/4
;
;   COS = 1/4, 0, -1/4, 0, ...      -SIN = 0, -1/4, 0, 1/4, ...
;
;************************************************************ mov     ax,es:[si]
        add     si,4            ; skip the next sample because cos = 0
        sar     ax,2
        test    recv_flags,b0
        jnz     hi_stage1
low_stage1:
        test    ch,1
        jz      no_neg
        neg     ax
no_neg:
        mov     dx,r_b1_z1      ; out1 = 1/4X0 + Z1 - 1/4*Z2
        add     dx,ax
        sar     r_b1_z2,2
        sub     dx,r_b1_z2      ; out1
        mov     r_b1_z2,dx
        add     ax,dx           ; out2 = 1/4X0 + out1 - 1/4*Z1
        sar     r_b1_z1,2
        sub     ax,r_b1_z1
        mov     r_b1_z1,ax      ; first stage pass two done
        jmp     short stage2
hi_stage1:
        mov     bx,ax           ; 1/4 X0 --> BX
        add     ax,r_b1_z1      ; 1/4 X0 + z1
        sar     r_b1_z2,2
        sub     ax,r_b1_z2      ; out1 = 1/4 X0 + Z1 + (-1/4*Z2)
        mov     dx,ax           ; dx = out1
        add     ax,bx           ; + 1/4 X0
        sar     r_b1_z1,2
        sub     ax,r_b1_z1      ; out2 = 1/4 X0 + out1 + (-1/4*Z1)
        mov     bx,ax           ; bx = out2
        mov     ax,es:[si]      ; get X2 * -1/4
        add     si,4
        sar     ax,2
        neg     ax
        sar     dx,2            ; -1/4 * out1
        neg     dx
        xchg    ax,dx           ; dx = 1/4 * X2
        add     ax,bx           ; -1/4 X2 + B2/2 - B3
        add     ax,dx           ; out3
        mov     r_b1_z2,ax      ; save in Z2
        add     ax,dx           ; out4 = -1/4X2 + out3 - 1/4out2
        mov     dx,bx
        sar     dx,2
        sub     ax,dx
        mov     r_b1_z1,ax
        add     ax,bx           ; input to second stage = out4 + out2
        sar     ax,1            ; 1/2
stage2:
        sar     ax,3            ; second stage scalar 1/8
        mov     bx,delay_ptr
        mov     r_a2_delay[bx+2],ax  ; store input into the delay line
```

-continued

```
        mov     dx,r_a2_delay[bx]      ; scalar * OUT + ( 2 * r_a2_z1)
        sal     dx,1
        add     ax,dx
        add     ax,r_a2_delay[bx-2]    ; + r_a2_z2
; calculate OUT1
        add     ax,r_b2_delay[bx]      ; add Z1
        mov     dx,r_b2_delay[bx-2]
        sar     dx,1                   ; + ( -.5 * B2 )
        sub     ax,dx
        mov     r_b2_delay[bx+2],ax    ; store result into the delay line
        sar     ax,2                   ; 1/4
        mov     dx,r_b2_delay[bx]      ; + ( 1/2 * Z1 )
        sar     dx,1
        add     ax,dx
        mov     dx,r_b2_delay[bx-2]    ; + Z2/4
        sar     dx,2
        add     ax,dx
        sar     ax,1
        mov     r_a3_delay[bx+2],ax
        add     ax,r_a3_delay[bx-2]    ; + Z3
        mov     temp_x,ax
real_done:
; AX holds the filter and phase split real output
        push    ax
        test    agc_speed,b4
        jz      not_narrow
        sar     ax,3                   ; /128 total
not_narrow:
        sar     ax,4                   ; /16
; get the absolute value
        jns     r_positive
        neg     ax
r_positive:
        add     agc_average,ax
        pop     ax
; AGC Ax here
        imul    agc_mant
        mov     cl,agc_xsube
        sal     dx,cl
        comment !
        test    ch,b0
        jnz     no_save
        mov     eqr_delay[di],dx
        jmp     short do_imaginary
no_save:
; do baud loop integrator calculations
        or      dx,dx                  ; set the sign bit
        jns     pos_real
        neg     dx
pos_real:
        sar     dx,5                   ; /32
        test    ch,b1                  ; are we at RX1 or RX0
        jz      add_it
        neg     dx                     ; -RX1
add_it:
        add     baud_sum_dx
        !
        mov     di,dx                  ; save in DI
do_imaginary:
; have completed 4 ( or 2 ) input samples for the real delay line.
; Now do the same for the imaginary.
        mov     si,rx_out              ; filter sample pointer
        add     si,2                   ; skip the fist sample because sin = 0
        mov     ax,es:[si]
        add     si,2
        sar     ax,2
        test    recv_flags,b0
        jnz     hi_stage1_i
        test    ch,b0
        jnz     no_neg2
        neg     ax
no_neg2:
        mov     dx,i_a1_z1             ; A1
        mov     i_a1_z1,ax             ; save for the next loop
        add     dx,i_bl_z1
        sar     i_bl_z2,2
        sub     dx,i_bl_z2
        mov     i_bl_z2,dx
        add     ax,dx                  ; + XO * 1/4 = OUT
```

```
                sar     i_b1_z1,2
                sub     ax,i_b1_z1
                mov     i_b1_z1,ax
; first stage pass two done
                jmp     short stage2_i
hi_stage1_i:
                neg     ax                      ; the first sample is a 0
                mov     dx,ax                   ; save for the next loop
                mov     ax,i_a1_z1
                add     ax,i_b1_z1              ; out1 = in_z1 + out_z1 + (-1/4*out_z2)
                sar     i_b1_z2,2
                sub     ax,i_b1_z2
                mov     bx,ax                   ; out1
                add     ax,dx                   ; out2 = in + out1 + (-1/4*out_z1)
                sar     i_b_z1,2
                sub     ax,i_b1_z2              ; out2
                add     dx,ax                   ; out3 = in + out2 + (-1/4*out1)
                sar     bx,2
                sub     dx,bx                   ; out3
                mov     i_b1_z2,dx              ; save out3 in out_z2
                mov     dx,ax                   ; dx = out2
                mov     bx,ax
                add     si,2                    ; skip sample 2
                mov     ax,es:[si]              ; get sample 3
                add     si,2
                sar     ax,2                    ; in3
                mov     i_a1_z1,ax              ; save for next loop
                add     ax,i_b1_z2              ; out3
                sar     bx,2
                sub     ax,bx                   ; out4
                mov     i_b1_z1,ax
                add     ax,dx                   ; input to second stage = out4 + out2
                sar     ax,1
stage2_i:
                sar     ax,3                    ; scaler for second stage
                mov     bx,delay_ptr
                mov     i_a2_delay[bx+2],ax     ; store input into the delay line
                mov     dx,i_a2_delay[bx]       ; scalar * OUT + ( 2 * i_a2_z1)
                sal     dx,1
                add     ax,dx
                add     ax,i_a2_delay[bx-2]     ; + i_a2_z2
; calculate OUT1
                add     ax,i_b2_delay[bx]       ; add Z1
                mov     dx,i_b2_delay[bx-2]
                sar     dx,1                    ; + ( -.5 * B2 )
                sub     ax,dx
                mov     i_b2_delay[bx+2],ax     ; store result into the delay line
                sar     ax,2                    ; 1/4
                mov     dx,i_b2_delay[bx]       ; + ( 1/2 * Z1 )
                sar     dx,1
                add     ax,dx
                mov     dx,i_b2_delay[bx-2]     ; + Z2
                sar     dx,2
                add     ax,dx
                sar     ax,1
                mov     i_a3_delay[bx+2],ax
                add     ax,i_a3_delay[bx-2]     ; + Z3
                mov     temp_y,ax
imag_done:
; AX holds the filter and phase split imaginary output
                push    ax
                test    agc_speed,b4
                jz      wideband_agc
                sar     ax,3                    ; /128 total
wideband_agc:
                sar     ax,4                    ; /16
; get the absolute value
                jns     i_positive
                neg     ax
i_positive:
                add     agc_average,ax
                pop     ax
; AGC AX here
                imul    agc_mant
                mov     cl,agc_xsube
                sal     dx,cl
                comment !
                test    ch,b0
                jnz     no_save_i
```

```
                mov     eqi_delay[di],dx
                add     di,2
                jmp     short update_ptr
no_save_i:
; do the baud loop integrator calculations
                or      dx,dx
                jns     pos_imaginary
                neg     dx
pos_imaginary:
                sar     dx,5                    ; /32
                test    ch,b1
                jz      add_imaginary           ; RX0 or RX1?
                neg     dx                      ; RX1
add_imaginary:
                add     baud_sum,dx
                !
                mov     ax,baudlp_vector
                call    ax
update_ptr:
                add     delay_ptr,2
                mov     rx_out,si
                dec     ch
                jz      baud_time_done
                jmp     filter_loop
baud_time_done:
;               add     equalizer_in,4          ; set for the next baud time
                cmp     si,rx_samples_length
                jne     chk_end_delay
                mov     rx_out,0
chk_end_delay:
                cmp     delay_ptr,(delay_length * 2 )
                jne     no_delay_shift
                mov     delay_ptr,0
; shift the delay lines from the end to the beginning
                mov     ax,r_a2_delay_end0
                mov     r_a2_delay_z1,ax
                mov     ax,r_a2_delay_end1
                mov     r_a2_delay,ax
                mov     ax,r_b2_delay_end0
                mov     r_b2_delay_z1,ax
                mov     ax,r_b2_delay_end1
                mov     r_b2_delay,ax
                mov     ax,r_a3_delay_end0
                mov     r_a3_delay_z1,ax
                mov     ax,r_a3_delay_end1
                mov     r_a3_delay,ax
; IMAGINARY DELAY LINES
                mov     ax,i_a2_delay_end0
                mov     i_a2_delay_z1,ax
                mov     ax,i_a2_delay_end1
                mov     i_a2_delay,ax
                mov     ax,i_b2_delay_end0
                mov     i_b2_delay_z1,ax
                mov     ax,i_b2_delay_end1
                mov     i_b2_delay,ax
                mov     ax,i_a3_delay_end0
                mov     i_a3_delay_z1,ax
                mov     ax,i_a3_delay_end1
                mov     i_a3_delay,ax
no_delay_shift:
                ret
FILTER_PQ ENDP
;
;%%%%%%%%%%%%%%%%%%%%%%%%%%%%%%%%%%%%%%%%%%%%%%
;
INTERPOLATOR_ROUTINES PROC NEAR
save_s1:
                mov     imag_s1,dx
                mov     real_sl,di
                mov     baud1p_vector,offset save_s0
                ret
save_s0:
; imaginary sample is in DX
; real sample is in DI
                mov     baud1p_vector,offset save_sl
                dec     quad_count
                jz      new_coeff
compute_equalizer:
                mov     bx,buffer_in
```

-continued

```
; compute imaginary first
        push    cx
        mov     ax,dx
        imul    interp_a0        ; A0 * S0
        mov     cx,dx
        mov     ax,imag_s1
        imul    interp_a1        ; A1 * S1
        add     cx,dx
        sal     cx,1
        mov     imag_buffer[bx],cx
; compute the real
        mov     ax,di
        imul    interp_a0        ; A0 * S0
        mov     cx,dx
        mov     ax,real_s1       ; A1 * S1
        imul    interp_a1
        add     cx,dx
        sal     cx,1
        mov     real_buffer[bx],cx   ; store in the real buffer
        add     buffer_in,2
        and     buffer_in,07h
        pop     cx
        ret
new_coeff:
        mov     quad_count,32
        mov     ax,old_x
        xor     ax,baud_x
        jns     same_sign        ; if old and new have the same
                                 ; sign then no rollover
; could have rolled over - - - or passed through zero so find out
        mov     ax baud_x        ; if baud_x < .7 then no rollover
        cmp     ax,0
        jge     pos_int
        neg     ax
        jns     pos_int          ; special case when baud_x = 8000h
        dec     ax
pos_int:
        cmp     ax,5998h         ; .7
        jl      same_sign
        cmp     baud_x,0
        jge     zero_to_one
; compute an extra P
        mov     bx,buffer_in
; compute imaginary first
        push    cx
        push    dx
        mov     ax,dx
        imul    interp_a0        ; A0 * S0
        mov     cx,dx
        mov     ax,imag_s1
        imul    interp_a1        ; A1 * S1
        add     cx,dx
        sal     cx,1
        mov     imag_buffer[bx],cx
; compute the real
        mov     ax,di
        imul    interp_a0            ; A0 * S0
        mov     cx,dx
        mov     ax,real_s1           ; A1 * S1
        imul    interp_a1
        add     cx,dx
        sal     cx,1
        mov     real_buffer[bx],cx            ; store in the real buffer
        add     buffer_in,2
        and     buffer_in,07h
        pop     dx
        pop     cx
zero_to_one:
        mov     imag_s1,dx
        mov     real_s1,di
        mov     baudlp_vector,offset save_s0
; compute A0 and A1
        mov     ax,baud_x
        mov     old_x,ax
        sar     ax,1
        add     ax,4000h         ; 1/2
        mov     interp_a1,ax
        neg     ax
        add     ax,7ffffh
```

-continued

```
        mov     interp_a0,ax
        ret
same_sign:
; compute A0 and A1
        mov     ax,baud_x
        mov     old_x,ax
        sar     ax,1
        add     ax,4000h            ; 1/2
        mov     interp_a1,ax
        neg     ax
        add     ax,7fffh
        mov     interp_a0,ax
        jmp     compute_equalizer
INTERPOLATOR_ROUTINES   ENDP
        END
.model small
.286
;%%%%%%%%%%%%%%%%%%%%%%%%%%%%%%%%%%%%%%%%%%%%%%
;
;       Main demodulator
;
;       This program is the main demodulator algorithm for 1200
;       and 2400 baud operation.
;
;       The receive samples are stored in RX_SAMPLE_BUF and are filtered,
;       AGCed, and split into equalizer samples by the file RECVFIL.asm
;
;%%%%%%%%%%%%%%%%%%%%%%%%%%%%%%%%%%%%%%%%%%%%%%
bleed_tap    macro
        lodsw                       ; 5
        cwd                         ; 2
        and     dl,bl               ; 2
        or      dl,bh               ; 2
        sub     ax,dx               ; 2
        stosw                       ; 3
        endm
absolute     macro
        cwd
        xor     ax,dx
        sub     ax,dx
        sar     ax,5
        endm
        include equates
        public          equalizer_in,recv_flags,demod
        public          agc_average ,agc_speed, recv_sample_count
        public          eqr_delay,eqi_delay
        public          init_recv,rx_char_out,rx_char_in
        public          rx_char_buf_start,rx_char_buf_end
        public          dbox_address,baud_count
        public          agc_xsube,agc_mant
        public          temp_x,temp_y,loop2_int,baud_x
        extrn   filter_pq:near,save_s1:near
        extrn   init_dbox:near,plot_point:near, get_tx_data:near
        extrn   buffer_in:word,buffer_out:word
        extrn   delay_ptr:word,baudlp_vector
        extrn   cosine_table:word,sine_table:word
        extrn   rx_out:word,rx_in:word
        extrn   i_a2_delay:word,r_a2_delay:word
        extrn   ds_segment:word, rx_dma_alal6:word
        extrn   tx_flags:word
        extrn   buffer_in:word,buffer_out:word
        extrn   interp_a0:word,interp_a1:word,quad_count:word
        extrn   real_buffer:word,imag buffer:word
        extrn   vid_mode:byte,x:byte,y:byte
        extrn   reverse_table:byte
        extrn   processed:byte
        rx_buf_len              equ     8192
        equalizer_length        equ     2048
        Cbeta1                  equ     -3072
        Cbeta2                  equ     1096
        Calpha                  equ     -3072
        receive_low_thresh      equ     0000h
        receive_high_thresh     equ     0000h
.data
        tap_offset              dw      ?
        temp_x                  dw      ?
        temp_y                  dw      ?
        recv_sample_count       dw      ?       ; number of samples per baud time
        processed_cnt           dw      ?
```

-continued

```
    eqr_delay       dw      equalizer_length dup(?)         ; real equalizer delay
    eqr_end         label   word
    eqi_delay       dw      equalizer_length dup(?)         ; imaginary equalizer
    eqi_end         label   word
    real_taps       dw      14 dup(?)
    imaginary_taps  dw      14 dup(?)
    equalizer_in    dw      ?               ; equalizer delay line input pointer
    baud_count      dw      ?               ; increment every baud time
    rzn             dw      ?               ; equalizer real output
    izn             dw      ?               ; eqiulizer imaginary output
    rym             dw      ?               ; rotated equalizer output
    iym             dw      ?
    r_error         dw      ?               ; real error vector
    i_error         dw      ?               ; imaginary error vector
    dec_r           dw      ?               ; closest V22 point - real
    dec_i           dw      ?               ; V22 point - imaginary
    alpha           dw      ?               ; tap update speed
    aren            dw      ?               ; alpha * ren
    aien            dw      ?               ; alpha * ien
    ierr            dw      ?               ; counter rotated error vector imag.
    recv_flags      dw      ?
;   bit 0           1 - recv high band
;   bit 1           1 = recv 2400 baud
;   bit 2           1 = got 1200 recv data
;   bit 3           1 = receive data on
;   bit 4           1 = detected 1100 ( S1 )
;   bit 5           1 = 10Ms timer expired
;   bit 6           1 = got energy
;   bit 7           1 = call progress timed out
;   bit 8           1 = looking for the end of the answer tone
    phi             dw      ?               ; carrier loop angle
    phase_corr      dw      ?               ; phase corrector integrator
    cosine                  dw      ?       ; cosine(phi)
    sine            dw      ?               ; sine(phi)
    recv_data       db      ?               demodulated data
    dbox_routine    dw      ?
    s1_counter      db      ?
    decision_table          db      0bh
                            db      0ah
                            db      0dh
                            db      0fh
                            db      09h
                            db      08h
                            db      0ch
                            db      0eh
                            db      06h
                            db      04h
                            db      00h
                            db      01h
                            db      07h
                            db      05h
                            db      02h
                            db      03h
    prev_y3y2       db      ?
    descram_0       db      ?
    descram_1_17            dw      ?
    data_1200       db      ?
    eye_menu        db      '1. equalizer output',cr,lf
                    db      '2. equalizer 0 input',cr,lf
                    db      '3. equalizer 1 input',cr,lf
                    db      '4. tap 5',cr,lf
                    db      '5. S1 detector',cr,lf
                    db      '6. Interpolator A1',cr,lf
                    db      '7. PHI',cr,lf
                    db      '8. 1st order baud loop integrator',cr,lf
                    db      '9. 2nd order baud loop integrator',cr,lf,'$'
    tap_question    db      cr,lf,'Enter tap number ( 0–9, A–D ):','$'
    rx_char_in      dw      ?
    rx_char_out     dw      ?
    rx_char_buf_start       label byte
    rx_char_buf db          2000 dup(?)
    rx_char_buf_end         label byte
    r_parse_jmp     dw      ?
    r_parse_data    dw      ?
    agc_coeff0      dw      1460h
    agc_coeff1      dw      50b7h
    agc_coeff2      dw      4f50h
    agc_coeff3      dw      27e1h
    agc_coeff4      dw      887h
```

-continued

```
        energy_threshold       dw      ?
        agc_average    dw      ?       ; agc sum
        old_agc        dw      ?
        agc_speed      dw      ?       : agc countdown
        agc_mant       dw      ?
        agc_xsube      db      ?
        baud_sum       dw      ?
        loop2_int      dw      ?
        loop2_cnt      db      ?
        baud_x         dw      ?
        baud_loop2_table       db      60
                       db      60
                       db      30
                       db      20
                       db      15
                       db      12
                       db      10
                       db      9
                       db      8
                       db      7
                       db      6
                       db      5
                       db      4
                       db      3
                       db      2
.code
DEMOD   PROC    NEAR
    IF board
        mov     dx,wr_clr_byte_ptr          ; init flag to low byte
        out     dx,al
        jmp     $+2
; how many words are there in the receive buffer?
        mov     dx,dma_6_address            ; get RX in
        in      al,dx
        mov     cl,al
        jmp     $+2
        in      al,dx
        mov     ch,al
        jmp     $+2
        mov     dx,wr_clr_byte_ptr          ; init flag to low byte
        out     dx,al
        jmp     $+2
        mov     dx,dma 6 address
        in      al,dx
        cmp     cl,al
        je      read_ok
        mov     cl,al
        in      al,dx
        mov     ch,al
read_ok:
        mov     ax,rx_out
        shr     ax,1
        add     ax,rx_dma_alal6
        sub     cx,ax
        jns     pos_diff
        add     cx,rx_buf_len
pos_diff:
;       shr     ax,1                        ; word count
        cmp     cx,recv_sample_count
        jge     demodulate_it
        ret
    ELSE
        call    get_tx_data
        jnc     demodulate_it               ; data available
        ret
    ENDIF
;***************************************************************************
;*
;
;       DEMODULATION CODE
;
;***************************************************************************
;*
demodulate_it:
        cmp     cx,processed_cnt            ; more than 1 1/2 baud times samples?
        jle     not_enough_samples          ; this will prevent further calls to
        or      processed,01h               ; demod by the interrupt
not_enough_samples:
        inc     baud_count
```

```
                call    filter_pq                       ; filter the next baud times samples
                                                        ; insert into the equalizer delay lines
equalizer_buf_check:                                    ; are there two samples in the
                mov     ax,buffer_in                    ; equilizer buffer ?
                sub     ax,buffer_out
                jns     no_adj
                add     ax,08h
no_adj:
                cmp     ax,4
                jge     get_equ
                ret
get_equ:
                mov     di,equalizer_in
                Inov    bx,buffer_out
                mov     ax,real_buffer[bx]              ; RX1
                mov     eqr_delay[di],ax
                absolute                                ; take care of the baud loop integrator
                sub     baud_sum,ax
                mov     ax,imag_buffer[bx]              ; IX1
                mov     eqi_delay[di],ax
                absolute
                sub     baud_sum,ax
                add     bx,2
                and     bx,07h
                mov     ax,real_buffer[bx]              ; RX0
                mov     eqr_delay[di+2],ax
                absolute
                add     baud_sum,ax
                mov     ax,imag_buffer[bx]              ; IX0
                mov     eqi_delay[di+2],ax
                absolute
                add     baud_sum,ax
                add     equalizer_in,4
                add     bx,2
                and     bx,07h
                uov     buffer_out,bx
                test    recv_flags,b6
                jnz     got_energy
                mov     ax,baud_count
                and     ax,agc_speed
                jz      energy_check
no_energy:
                jmp     equalizer_full_check
                energy_check:
                mov     ax,agc_average
                sub     ax,energy_threshold
                js      no_energy
                or      recv_flags,b6
                mov     baud_count,1
                jmp     short new_level
got_energy:
                mov     ax,baud_count
                and     ax,agc_speed                    ; every 4 or 32 baud times
                jz      check_alpha
                jmp     display_box
;***********************************************************************
*
;       AGC code
;***********************************************************************
*
check_alpha:
                cmp     baud_count,100h
                jne     agc_tests
                mov     alpha,800h                      ; slow down to 1/16 after 2 sec
agc_tests:
                test    agc_speed,b4
                jz      wideband_agc
; AGC test 1
                mov     ax,old_agc
                sar     ax,1                            ; .5
                sub     ax,agc_average                  ; new <.5 old then compute all new AGC
                jns     new_level
; AGC test 2
                mov     ax,old_agc
                sar     ax,1
                add     ax,old_agc                      ; 1.5 old
                sub     ax,agc_average
                jns     wideband_agc                    ; if new > 1/5 old then compute new AGC
new_level:
```

```
              mov       ax,agc_average
              mov       old_agc,ax
              jmp       short compute_agc
wideband_agc:
; get ( ALPHA * NEW ) + (( 1 - ALPHA ) * OLD )
; ALPHA = 1/8
              mov       ax,old_agc
              mov       bx,ax
              sar       bx,3                   ; 1/8
              sub       ax,bx                  ; 7/8 old
              mov       bx,agc_average
              sar       bx,3                   ; + 1/8 new
              add       ax,bx
              mov       old_agc,ax
compute_agc:
              mov       agc_average,0
              mov       cl,1
; AX is > 0
; subtract one from cl because the reference is /4 but during the actual
; AGCing of the sample we need a * 2
normalize:
              inc       cl
              test      ax,b14
              jnz       normalize_done
              sal       ax,1
              jmp       short normalize
normalize_done:
              mov       agc_xsube,cl
              push      ax                     ; M
              mov       bx,ax
              imul      bx
              sal       dx,1
              push      dx                     ; M^2
              mov       ax,bx
              imul      dx
              sal       dx,1
              push      dx                     ; M^3
              mov       ax,bx
              imul      dx
              sal       dx,1                   ; M^4
              mov       bx,agc_coeff0
              uov       ax,agc_coeff4
              imul      dx                     ; A(4) * M^4
              add       bx,dx
              pop       ax
              imul      agc_coeff3             ; A(3) * M^3
              sub       bx,dx
              pop       ax
              imul      agc_coeff2             ; A(2) * M^2
              add       bx,dx
              pop       ax
              imul      agc_coeff1             ; A(1) * M
              sub       bx,dx
              sal       bx,3                   ; * 8 because of equation plus a * 2 because
                                               ; of the multiplies and a /2 for reference
              mov       agc_mant,bx
              cmp       baud_count,32          ; slow the AGC down after 32 baud times
              jne       display_box
              mox       agc_speed,1fh
display_box:
              test      recv_flags,b3
              jnz       baud_loop
              mov       ax,dbox_routine
              call      ax
              mov       x,ah
              mov       y,bh
              call      plot_point
;*************************************************************************
;*
;*************************************************************************
;*
; equation is | RX0 | + | IX0 | - | RX1 | - IX1 | + |RX2 |+ . . .
; over eight baud times
baud_loop:
; do first order baud loop every 8 baud times
              mov       ax,baud_count
              and       ax,7h
              jnz       baud_loop2
              cmp       baud_sum,0
```

```
                mov     ax,160
                jns     shorten
                neg     ax
shorten:
                add     baud_x,ax
                mov     ax,baud_sum
                mov     baud_sum_0
                sar     ax,7                        ; /128
                add     loop2_int,ax
                jns     check_upper
                cmp     loop2_int,0f200h
                jge     baud_loop2
                mov     loop2_int,0f200h
                jmp     short baud_loop2
check_upper:
                cmp     loop2_int,0f00h
                jl      baud_loop2
                mov     loop2_int, 0effh
baud_loop2:
                dec     loop2_cnt
                jnz     equalizer_output
                mov     ax,loop2_int
                or      ax,ax                       ; set sign bit
                js      add_time
                cmp     ax,0ffh
                jle     get_new_count
                add     baud_x,160
                jmp     short get_new_count
add_time:
                sub     baud_x,160
                neg     ax
get_new_count:
                xor     bh,bh
                mov     bl,ah
                mov     al,baud_loop2_table[bx]
                mov     loop2_cnt,al
equalizer_output:
;****************************************************
;*
;*      equalizer update ( calculate rzn + j izn )
;*
;*      rzn = ( rx * rw ) - ( ix * iw ) summed over all taps
;*      izn = ( rx * iw ) + ( ix * rw )
;*
;****************************************************
                mov     bx,equalizer_in
                lea     si,real_taps
; CALCULATE ( REAL EQUALIZER DELAY 0-13 ) * ( REAL TAP 0-13 )
                lodsw                               ; rtap0
                imul    word ptr eqr_delay[bx-2]
                mov     cx,dx
                lodsw                               ; rtap1
                imul    word ptr eqr_delay[bx-4]
                add     cx,dx
                lodsw                               ; rtap2
                imul    word ptr eqr_delay[bx-6]
                add     cx,dx
                lodsw                               ; rtap3
                imul    word ptr eqr_delay[bx-8]
                add     cx,dx
                lodsw                               ; rtap4
                imul    word ptr eqr_delay[bx-10]
                add     cx,dx
                lodsw                               ; rtap5
                imul    word ptr eqr_delay[bx-12]
                add     cx,dx
                lodsw                               ; rtap6
                imul    word ptr eqr_delay[bx-14]
                add     cx,dx
                lodsw                               ; rtap7
                imul    word ptr eqr_delay[bx-16]
                add     cx,dx
                lodsw                               ; rtap8
                imul    word ptr eqr_delay[bx-18]
                add     cx,dx
                lodsw                               ; rtap9
                imul    word ptr eqr_delay[bx-20]
                add     cx,dx
                lodsw                               ; rtap10
```

```
        imul    word ptr eqr_delay[bx-22]
        add     cx,dx
        lodsw                           ; rtap11
        imul    word ptr eqr_delay[bx-24]
        add     cx,dx
        lodsw                           ; rtap12
        imul    word ptr eqr_delay[bx-26]
        add     cx,dx
        lodsw                           ; rtap13
        imul    word ptr eqr_delay[bx-28]
        add     cx,dx
; CALCULATE ( IMAGINARY EQUALIZER DELAY 0–13 ) * ( IMAGINARY TAP 0–13 )
; si already pointing to the imaginary taps
        lodsw                           ; itap0
        imul    word ptr eqi_delay[bx-2]
        sub     cx,dx
        lodsw                           ; itap1
        imul    word ptr eqi_delay[bx-4]
        sub     cx,dx
        lodsw                           ; itap2
        imul    word ptr eqi_delay[bx-6]
        sub     cx,dx
        lodsw                           ; itap3
        imul    word ptr eqi_delay[bx-8]
        sub     cx,dx
        lodsw                           ; itap4
        imul    word ptr eqi_delay[bx-10]
        sub     cx,dx
        lodsw                           ; itap5
        imul    word ptr eqi_delay[bx-12]
        sub     cx,dx
        lodsw                           ; itap6
        imul    word ptr eqi_delay[bx-14]
        sub     cx,dx
        lodsw                           ; itap7
        imul    word ptr eqi_delay[bx-16]
        sub     cx,dx
        lodsw                           ; itap8
        imul    word ptr eqi_delay[bx-18]
        sub     cx,dx
        lodsw                           ; itap9
        imul    word ptr eqi_delay[bx-20]
        sub     cx,dx
        lodsw                           ; itap10
        imul    word ptr eqi_delay[bx-22]
        sub     cx,dx
        lodsw                           ; itap11
        imul    word ptr eqi_delay[bx-24]
        sub     cx,dx
        lodsw                           ; itap12
        imul    word ptr eqi_delay[bx-26]
        sub     cx,dx
        lodsw                           ; itap13
        imul    word ptr eqi_delay[bx-28]
        sub     cx,dx
        sal     cx,2                    ; adjust for the multiply plus 1/2 tap
        mov     rzn,cx
        lea     si,real_taps
; CALCULATE ( IMAGINARY equalIZER DELAY 0–13 ) * ( REAL TAP 0–13 )
        lodsw                           ; rtap0
        imul    word ptr eqi_delay[bx-2]
        mov     cx,dx
        lodsw                           ; rtap1
        imul    word ptr eqi_delay[bx-4]
        add     cx,dx
        lodsw                           ; rtap2
        imul    word ptr eqi_delay[bx-6]
        add     cx,dx
        lodsw                           ; rtap3
        imul    word ptr eqi_delay[bx-8]
        add     cx,dx
        lodsw                           ; rtap4
        imul    word ptr eqi_delay[bx-10]
        add     cx,dx
        lodsw                           ; rtap5
        imul    word ptr eqi_delay[bx-12]
        add     cx,dx
        lodsw                           ; rtap6
        imul    word ptr eqi_delay[bx-14]
```

```
            add     cx,dx
            lodsw                           ; rtap7
            imul    word ptr eqi_delay[bx-16]
            add     cx,dx
            lodsw                           ; rtap8
            imul    word ptr eqi_delay[bx-18]
            add     cx,dx
            lodsw                           ; rtap9
            imul    word ptr eqi_delay[bx-20]
            add     cx,dx
            lodsw                           ; rtap10
            imul    word ptr eqi_delay[bx-22]
            add     cx,dx
            lodsw                           ; rtap11
            imul    word ptr eqi_delay[bx-24]
            add     cx,dx
            lodsw                           ; rtap12
            imul    word ptr eqi_delay[bx-26]
            add     cx,dx
            lodsw                           ; rtap13
            imul    word ptr eqi_delay[bx-28]
            add     cx,dx
; CALCULATE ( REAL EQUALIZER DELAY 0-13 ) * ( IMAGINARY TAP 0-13 )
; si already pointing to the imaginary taps
            lodsw                           ; itap0
            imul    word ptr eqr_delay[bx-2]
            add     cx,dx
            lodsw                           ; itap1
            imul    word ptr eqr_delay[bx-4]
            add     cx,dx
            lodsw                           ; itap2
            imul    word ptr eqr_delay[bx-6]
            add     cx,dx
            lodsw                           ; itap3
            imul    word ptr eqr_delay[bx-8]
            add     cx,dx
            lodsw                           ; itap4
            imul    word ptr eqr_delay[bx-10]
            add     cx,dx
            lodsw                           ; itap5
            imul    word ptr eqr_delay[bx-12]
            add     cx,dx
            lodsw                           ; itap6
            imul    word ptr eqr_delay[bx-14]
            add     cx,dx
            lodsw                           ; itap7
            imul    word ptreqr_delay[bx-16]
            add     cx,dx
            lodsw                           ; itap8
            imul    word ptr eqr_delay[bx-18]
            add     cx,dx
            lodsw                           ; itap9
            imul    word ptr eqr_delay[bx-20]
            add     cx,dx
            lodsw                           ; itap10
            imul    word ptr eqr_delay[bx-22]
            add     cx,dx
            lodsw                           ; itap11
            imul    word ptr eqr_delay[bx-24]
            add     cx,dx
            lodsw                           ; itap12
            imul    word ptr eqr_delay[bx-26]
            add     cx,dx
            lodsw                           ; itap13
            imul    word ptr eqr_delay[bx-28]
            add     cx,dx
            sal     cx,2                    ; adjust for the multiply
            mov     izn,cx
phase_rotation:
;************************************************
;*
;*      phase rotation
;*
;*      rym = ( rzn * cosphi ) - ( izn * sinphi )
;*      iym = ( rzn * sinphi ) + ( izn * cosphi )
;*
;************************************************
            mov     ax,rzn
            imul    cosine
```

-continued

```
        mov     bx,dx
        mov     ax,izn
        imul    sine
        sub     bx,dx
        sal     bx,2            ; sine and cosine are 1/2 scale
        mov     rym,bx
        mov     ax,rzn
        imul    sine
        mov     bx,dx
        mov     ax,izn
        imul    cosine
        add     bx,dx
        sal     bx,2            ; sine and cosine are 1/2 scale
        mov     iym,bx
;**************************************************
;*
;*      derive the error vector and the v22 point
;*
;*      error vector      --- r_error + j i_error
;*      v22 point         --- dec_r + j dec_i
;*
;**************************************************
        xor     bx,bx
        mov     ax,rym
        test    recv_flags,bl
        jnz     decision_2400
        jmp     decision_1200
decision_2400:
        or      ax,ax
        js      r_negative_24
        mov     bl,2
        cmp     ax,( 44 * 256 )
        jge     big_positive 24
; real is less than 44
        sub     ax,( 22 * 256 )
        mov     r_error,ax
        mov     dec_r,( 22 * 256 )
        jmp     short i_decision
big_positive_24:
; real is above 44
        sub     ax,( 66 * 256 )
        mov     r_error,ax
        mov     dec_r,( 66 * 256 )
        inc     bx
        jmp     short i_decision
r_negative_24:
        xor     bl,bl
        cmp     ax,( -44 * 256 )
        jle     big_negative_24
        add     ax,( 22 * 256 )
        mov     r_error,ax
        mov     dec_r,( -22 * 256 )
        inc     bx
        jmp     short i_decision
big_negative_24:
        add     ax,( 66 * 256 )
        mov     r_error,ax
        mov     dec_r,( -66 * 256 )
i_decision:
        mov     ax,iym
        or      ax,ax
        js      i_negative_24
        cmp     ax,( 44 * 256 )
        jge     imag_big
; imaginary is less than 44
        sub     ax,( 22 * 256 )
        mov     i_error,ax
        mov     dec_i,( 22 * 256 )
        or      bl,8
        jmp     short read_decision
imag_big:
; real is above 44
        sub     ax,( 66 * 256 )
        mov     i_error,ax
        mov     dec_i,( 66 * 256 )
        or      bl,0ch
        jmp     short read_decision
i_negative_24:
        cmp     ax,( -44 * 256 )
```

-continued

```
            jle     imag_lil
            add     ax,( 22 * 256 )
            mov     i_error,ax
            mov     dec_i,( -22 * 256 )
            or      bl,4
            jmp     short read_decision
imag_lil:
            add     ax,( 66 * 256 )
            mov     i_error,ax
            mov     dec_i,( -66 * 256 )
            jmp     short read_decision
decision_1200:
            or      ax,ax
            js      r_neg_1200
            sub     ax,( 49 * 256 )
            mov     r_error,ax
            mov     dec_r,( 49 * 256 )
            mov     bl,3
            jmp     short i_1200
r_neg_1200:
            add     ax( 49 * 256 )
            mov     r_error,ax
            mov     dec_r,( -49 * 256 )
            xor     bl,bl
i_1200:
            mov     ax,iyn
            or      ax,ax
            js      i_neg_1200
            sub     ax,( 49 * 256 )
            mov     i_error,ax
            mov     dec_i,( 49 * 256 )
            or      bl,0ch
            jmp     short read_decision
i_neg_1200:
            add     ax( 49 * 256 )
            mov     i_error,ax
            mov     dec_i,( -49 * 256 )
read_decision:
            mov     al,decision_table[bx]
            mov     recv_data,al
;**************************************************
;*
;*      counter rotate the error vector and multiply
;*      by alpha
;*
;*      equation = alpha * (( r_error + j i_error ) * ( cosphi - j sinphi))
;*
;*      aren = alpha * (( r_error * cosphi ) + ( i_error * sinphi ))
;*      aien = ( i_error * cosphi ) - ( r_error * sinphi ))
;*
;**************************************************
            mov     cx,alpha                ; CX = alpha
            mov     ax,r_error
            imul    cosine
            mov     bx,dx
            mov     ax,i_error
            imul    sine
            add     bx,dx
            sal     bx,1
            mov     ax,bx
            imul    cx
            sal     dx,1
            mov     aren,dx
            mov     ax,i_error
            imul    cosine
            mov     bx,dx
            mov     ax,r_error
            imul    sine
            sub     bx,dx
            sal     bx,1
            mov     ax,bx
            imul    cx
            sal     dx,1
            mov     aien,dx
;**************************************************
;*
;*      tap update loop
;*
;*      equation =      rw - (( rx * aren ) + ( ix * aien ))
```

-continued

```
;*                      iw - (( rx * aien ) - ( ix * aren ))
;*
;****************************************************
;
; SI = Real delay line
; DI = Imaginary delay line
; BX = aren
; CX = aien
        mov     ax,baud_count
        and     ax, 0fh
        jz      bleed
        jmp     do_tap_update
bleed:
        push    ds
        pop     es
        lea     si,real_taps
        mov     di,si
        mov     bl,0f8h
        mov     bh,04h
    REPT 28
        bleed_tap
    ENDM
        jmp     rotate
do_tap_update:
        mov     cx,aien
        mov     bx,aren
        mov     si,equalizer_in
        mov     di,si
        add     si,offset eqr_delay
        add     di,offset eqi_delay
; real tap 0
        mov     ax,ds:[si-2]                    ; eqr
        imul    bx                              ; * aren
        mov     bp,dx
        mov     ax,ds:[di-2]                    ; eqi
        imul    cx                              ; * aien
        add     dx,bp
        sal     dx,1
        sub     real_taps[0],dx
; real tap 1
        mov     ax,ds:[si-4]                    ; eqr
        imul    bx                              ; * aren
        mov     bp,dx
        mov     ax,ds:[di-4]                    ; eqi
        imul    cx                              ; * aien
        add     dx,bp
        sal     dx,1
        sub     real_taps[2],dx
; real tap 2
        mov     ax,ds:[si-6]                    ; eqr
        imul    bx                              ; * aren
        mov     bp,dx
        mov     ax,ds:[di-6]                    ; eqi
        imul    cx                              ; * aien
        add     dx,bp
        sal     dx,1
        sub     real_taps[4],dx
; real tap 3
        mov     ax,ds:[si-8]                    ; eqr
        imul    bx                              ; * aren
        mov     bp,dx
        mov     ax,ds:[di-8]                    ; eqi
        imul    cx                              ; * aien
        add     dx,bp
        sal     dx,1
        sub     real_taps[6],dx
; real tap 4
        mov     ax,ds: [si-10]                  ; eqr
        imul    bx                              ; * aren
        mov     bp,dx
        mov     ax,ds:[di-10]                   ; eqi
        imul    cx                              ; * aien
        add     dx,bp
        sal     dx,1
        sub     real_taps[8],dx
; real tap 5
        mov     ax,ds:[si-12]                   ; eqr
        imul    bx                              ; * aren
        mov     bp,dx
        mov     ax,ds:[di-12]                   ; eqi
```

```
            imul     cx                    ; * aien
            add      dx,bp
            sal      dx,1
            sub      real_taps[10],dx
; real tap 6
            mov      ax,ds:[si-14]         ; eqr
            imul     bx                    ; * aren
            mov      bp,dx
            mov      ax,ds:[di-14]         ; eqi
            imul     cx                    ; * aien
            add      dx,bp
            sal      dx,1
            sub      real_taps[12],dx
; real tap 7
            mov      ax,ds:[si-16]         ; eqr
            imul     bx                    ; * aren
            mov      bp,dx
            mov      ax,ds:[di-16]         ; eqi
            imul     cx                    ; * aien
            add      dx,bp
            sal      dx,1
            sub      real_taps[14],dx
; real tap 8
            mov      ax,ds:[si-18]         ; eqr
            imul     bx                    ; * aren
            mov      bp,dx
            mov      ax,ds:[di-18]         ; eqi
            imul     cx                    ; * aien
            add      dx,bp
            sal      dx,1
            sub      real_taps[16],dx
; real tap 9
            mov      ax,ds:[si-20]         ; eqr
            imul     bx                    ; * aren
            mov      bp,dx
            mov      ax,ds:[di-20]         ; eqi
            imul     cx                    ; * aien
            add      dx,bp
            sal      dx,1
            sub      real_taps[18],dx
; real tap 10
            mov      ax,ds:[si-22]         ; eqr
            imul     bx                    ; * aren
            mov      bp,dx
            mov      ax,ds:[di-22]         ; eqi
            imul     cx                    ; * aien
            add      dx,bp
            sal      dx,1
            sub      real_taps[20],dx
            comment  !
; real tap 11
            mov      ax,ds:[si-24]         ; eqr
            imul     bx                    ; * aren
            mov      bp,dx
            mov      ax,ds:[di-24]         : eqi
            imul     cx                    ; * aien
            add      dx,bp
            sal      dx,1
            sub      real_taps[22],dx
; real tap 12
            mov      ax,ds:[si-26]         ; eqr
            imul     bx                    ; * aren
            mov      bp,dx
            mov      ax,ds:[di-26]         : eqi
            imul     cx                    * aien
            add      dx,bp
            sal      dx,1
            sub      real_taps[24],dx
; real tap 13
            mov      ax,ds:[si-28]         ; eqr
            imul     bx                    ; * aren
            mov      bp,dx
            mov      ax,ds:[di-28]         ; eqi
            imul     cx                    ; * aien
            add      dx,bp
            sal      dx,1
            sub      real_taps[26],dx
            !
; Process the imaginary taps
```

```
;                       iw - (( rx * aien ) - ( ix * aren ))
; imaginary     tap 0
        mov     ax,ds:[di-2]                    ; eqi
        imul    bx                              ; * aren
        mov     bp,dx
        mov     ax,ds:[si-2]                    ; eqr
        imul    cx                              ; * aien
        sub     dx,bp
        sal     dx,1
        sub     imaginary_taps[0],dx
; imaginary tap 1
        mov     ax,ds:[di-4]                    ; eqi
        imul    bx                              ; * aren
        mov     bp,dx
        mov     ax,ds:[si-4]                    ; eqr
        imul    cx                              ; * aien
        sub     dx,bp
        sal     dx,1
        sub     imaginary_taps[2],dx
; imaginary tap 2
        mov     ax,ds:[di-6]                    ; eqi
        imul    bx                              ; * aren
        mov     bp,dx
        mov     ax,ds:[si-6]                    ; eqr
        imul    cx                              ; * aien
        sub     dx,bp
        sal     dx,1
        sub     imaginary_taps[4],dx
; imaginary tap 3
        mov     ax,ds:[di-8]                    ; eqi
        imul    bx                              ; * aren
        mov     bp,dx
        mov     ax,ds:[si-8]                    ; eqr
        imul    cx                              ; * aien
        sub     dx,bp
        sal     dx,1
        sub     imaginary_taps[6],dx
; imaginary tap 4
        mov     ax,ds:[di-10]                   ; eqi
        imul    bx                              ; * aren
        mov     bp,dx
        mov     ax,ds:[si-10]                   ; eqr
        imul    cx                              ; *5 aien
        sub     dx,bp
        sal     dx,1
        sub     imaginary_taps[8], dx
; imaginary tap 5
        mov     ax,ds:[di-12]                   ; eqi
        imul    bx                              ; * aren
        mov     bp,dx
        mov     ax,ds:[si-12]                   ; eqr
        imul    cx                              ; * aien
        sub     dx,bp
        sal     dx,1
        sub     imaginary_taps[10],dx
; imaginary tap 6
        mov     ax,ds:[di-14]                   ; eqi
        imul    bx                              ; * aren
        mov     bp,dx
        mov     ax,ds:[si-14]                   ; eqr
        imul    cx                              ; * aien
        sub     dx,bp
        sal     dx,1
        sub     imaginary_taps[12],dx
; imaginary tap 7
        mov     ax,ds:[di-16]                   ; eqi
        imul    bx                              ; * aren
        mov     bp,dx
        mov     ax,ds:[si-16]                   ; eqr
        imul    cx                              ; * aien
        sub     dx,bp
        sal     dx,1
        sub     imaginary_taps[14],dx
; imaginary tap 8
        mov     ax,ds:[di-18]                   ; eqi
        imul    bx                              ; * aren
        mov     bp,dx
        mov     ax,ds:[si-18]                   ; eqr
        imul    cx                              ; * aien
```

-continued

```
                sub     dx,bp
                sal     dx,1
                sub     imaginary_taps[16],dx
; imaginary tap 9
                mov     ax,ds:[di-20]                   ; eqi
                imul    bx                              ; * aren
                mov     bp,dx
                mov     ax,ds:[si-20]                   ; eqr
                imul    cx                              : * aien
                sub     dx,bp
                sal     dx,1
                sub     imaginary_taps[18],dx
; imaginary tap 10
                mov     ax,ds:[di-22]                   ; eqi
                imul    bx                              ; * aren
                mov     bp,dx
                mov     ax,ds:[si-22]                   ; eqr
                imul    cx                              ; * aien
                sub     dx,bp
                sal     dx,1
                sub     imaginary_taps[20],dx
                comment         !
; imaginary tap 11
                mov     ax,ds:[di-24]                   ; eqi
                imul    bx                              ; * aren
                mov     bp,dx
                mov     ax,ds:[si-24]                   ; eqr
                imul    cx                              ; * aien
                sub     dx,bp
                sal     dx,1
                sub     imaginary_taps[22],dx
; imaginary tap 12
                mov     ax,ds:[di-26]                   ; eqi
                imul    bx                              ; * aren
                mov     bp,dx
                mov     ax,ds:[si-26]                   ; eqr
                imul    cx                              ; * aien
                sub     dx,bp
                sal     dx,1
                sub     imaginary_taps[24],dx
; imaginary tap 13
                mov     ax,ds:[di-28]                   ; eqi
                imul    bx                              ; * aren
                mov     bp,dx
                mov     ax,ds:[si-28]                   ; eqr
                imul    cx                              ; * aien
                sub     dx,bp
                sal     dx,1
                sub     imaginary_taps[26],dx
                !
;****************************************************
;*
;*
;*      rotate the imaginary eye to the real plane
;*
;*      equation = ( rym + j iym ) * ( dec_r - j dec_i )
;*      ierr = j (( iym * dec_r ) - ( rym * dec_i )) * 2
;*
;****************************************************
rotate:
; IERR is used in the phase corrector
                mov     ax,iym
                imul    dec_r
                mov     bx,dx
                mov     ax,rym
                imul    dec_i
                sub     bx,dx
                sal     bx,2            ; adjust for the multiply and add a gain of 2
                mov     ierr,bx
;****************************************************************************
;*
;*
;*      new phase corrector (carrier pll update) aln 9/23/88
;*
;*      equations:
;*              phcor = phcor + (ierr * Cbeta1)
;*              phi = phi + (phcor*Cbeta2 + ierr*Calpha)
;*         Cbeta1= input coefficient to loop's 2nd order integrator
;*      Cbeta2= output coefficient of 2nd int for frequency lock limit
;*      Calpha= 1st order loop coeffcient. 2nd order term is not nested
```

-continued

```
;*         inside 1st order term in this configuration.
;*         NOTE: Cbeta1 and Calpha must be negative values for stable loop
;***********************************************************************
*
phase_update:
;* for V.22bis mode only. loop parameters can be determined with PLL2.BAS
;* current choices for variables are:
        mov     ax,Cbeta1
        imul    bx                      ; ierr * Cbeta1
        sal     dx,1
        add     phase_corr,dx           ; phase_corr + ( ierr * Cbeta1 )
        mov     ax,Calpha
        imul    bx                      ; ierr * Calpha
        mov     bx,dx
        mov     ax,Cbeta2
        imul    phase_corr              ; phase corr * Cbeta2
        add     bx,dx
        sal     bx,1
        add     bx,phi
        mov     phi,bx
; sine and cosine routine
        mov     bl,bh
        xor     bh,bh
        sal     bx,1
        mov     ax,cosine_table[bx]
        mov     cx,sine_table[bx]
        sar     ax,1
        mov     cosine,ax
        sar     cx,1
        mov     sine,cx
;***********************************************************************
*
;***********************************************************************
*
s1_detect:
        mov     bx,equalizer_in
        mov     ax,eqr_delay[bx-2]      ; z0
        sub     ax,eqr_delay[bx-10]     ; z4
        jns     band_pass_pos
        neg     ax
band_pass_pos:
        sub     ax,(20 * 256)
        js      add_one
        sub     s1_counter,4
        jns     data_decode
        mov     s1_counter,0
add_one:
        inc     s1_counter
        cmp     s1_counter,20
        jl      data_decode
        mov     s1_counter,20
        or      recv_flags,b4
;***********************************************************************
*
;***********************************************************************
*
data_decode:
; do differential decode
        xor     ax,ax
        mov     al,recv_data
        ror     ax,2
        mov     bl,al                   ; save top two bits
        sub     al,prev_y3y2
        mov     prev_3y2,bl
; gray decode
        test    al,bl
        jnz     no_gray
        xor     al,1
no_gray:
        and     al,3
        test    recv_flags,b2           ; is there 1200 baud data from
        jnz     combine_1200_data       ; the prev.baud time
        rol     ax,2                    ; restore b1,b0
        test    recv_flags,b1
        jnz     descramble_4            ; are we at_2400 baud?
        and     al,0ch
        mov     data_1200,al
        or      recv_flags,4
        jmp     equalizer_full_check
```

-continued

```
combine_1200_data:
        and     recv_flags,0fffbh
        or      al,data_1200
        xor     ah,ah
descramble_4:
        mov     bx,ax
        xor     dx,dx
        mov     al,reverse_table[bx]           ; put oldest bit in ax.0
        mov     dh,al                          ; save for delay line
        mov     bx,descram_1_17
        xor     ax,bx
        shr     bx,3
        xor     ax,bx
        shr     bx,1
        or      bh,descram_0
        and     ax,0fh                         ; descrambled data
        rol     dx,5                           ; dx.0 is the last bit
        and     bx,1ffffh
        or      bh,dh
        mov     descram_1_17,bx
        mov     descram_0,0
        test    dx,b0
        jz      no_bit_0
        mov     descram_0,10h
no_bit_0:
        comment         !
        cmp     al,09h
        jg      hex_nums
        or      al,30h
        jmp     short print_it
hex_nums:
        sub     al,0ah
        add     al,'A'
print_it:
        mov     dl,al
        mov     ah,02h
        int     21h
        !
receive_parser:
        cmp     r_parse_jmp,0
        je      check_for_start
        mov     bx,r_parse_jmp
        jmp     bx
check_for_start:
        cmp     ax,0fh
        jne     got_start_bit
        jmp     equalizer_full_check
got_start_bit:
        mov     r_parse_data,ax
        mov     r_parse_jmp, offset parse_8
        jmp     equalizer_full_check
parse_8:
        shl     ax,4
        or      r_arse_data, ax
        mov     r_parse_jmp,offset parse_12
        jmp     equalizer_full_check
parse_12:
        mov     r_parse_jmp,0                  ; default
        shl     ax,8
        or      ax,r_parse_data                ; last three baud times of data
        mov     cx,3                           ; number of bits left in the high nybble
        shr     ax,1
        jnc     got_start
        dec     cx
        shr     ax,1
        jnc     got_start
        dec     cx
        shr     ax,1
        jnc     got_start
        shr     ax,1
        dec     cx
got_start:                                     ; the parsed character is in al
        mov     di,rx_char_in
        mov     es,ds_segment
        stosb
        cmp     di,offset rx_char_buf_end
        jne     no_rollover
        mov     di,offset rx_char_buf_start
no_rollover:
```

-continued

```
            cmp     di,rx_char_out          ; is the buffer full
            je      no_update
            mov     rx_char_in,di
no_update:
            jcxz    equalizer_full_check
            dec     cx
            jcxz    test_one_bit
            dec     cx
            jcxz    test_two_bits
test_three_bits:
            test    ah,1h
            jz      insert_bit
            test    ah,2h
            jz      insert_bit              ; AH = xxxxxd01
            test    ah,4h
            jnz     equalizer_full_check
insert_bit:
            shl     ah,l                    ; AH - xxxxxdd0
            or      ah,1h
            rnov    al,ah
            xor     ah,ah
            mov     r_parse_data,ax
            mov     r_parse_jmp,offset parse_8
            jmp     equalizer_full_check
test_one_bit:
            test    ah,1h
            jnz     equalizer_full_check
            mov     r_parse_data,07h        ; AH = xxxxxxx0
            mov     r_parse_jmp,offset parse_8
            jmp     short equalizer_full_check
test_two_bits:
            test    ah,lh
            jz      insert_two_bits         ; AH = xxxxxxd0
            test    ah,2h
            jnz     equalizer_full_check
                                            ; AH = xxxxxx01
insert_two_bits:
            shl     ah,2
            or      ax,3h
            mov     al,ah
            xor     ah,ah
            mov     r_parse_data,ax
            mov     r_parse_jmp,offset parse_8
equalizer_full_check:
            cmp     equalizer_in,( equalizer_length * 2 )
            jne     not_full
; shift the last eight samples in the equalizer delay line to the beginning
; and reset the input pointer.
            mov     es,ds_segment
            mov     di,offset eqr_delay
            mov     si,offset ( eqr_end - 16 )
            mov     si,offset ( eqr_end - 24 )
            mov     cx,12
            rep     movsw
            mov     di,offset eqi_delay
            mov     si,offset ( eqi_end - 16 )
            mov     si,offset ( eqi_end - 24 )
            mov     cx.12
            rep     movsw
            mov     equalizer_in,24
not_full:
            jmp     equalizer buf_check
DEMOD ENDP
;
;%%%%%%%%%%%%%%%%%%%%%%%%%%%%%%%%%%%%%%%%%%%%%%
;
INIT_RECV   PROC    NEAR
            mov     agc_average,0
            mov     agc_speed,3h            ; 4 baud times
            mov     equalizer_in,24         ; 12 into the delay line at start
            mov     rx_out,0
            mov     rx_in,0
            mov     delay_ptr,0
            mov     alpha,1000h
            mov     recv_sample_count,16
            mov     processed_cnt,24
            mov     energy_threshold,receive_high_thresh
            test    recv_flags,b0
            jnz     clr_taps
```

-continued

```
        mov     recv_sample_count,8
        mov     processed_cnt,12
        mov     energy_threshold, receive_low_thresh
clr_taps:
; clear the taps
        push    ds
        pop     es
        lea     di,real_taps
        mov     cx,28
        xor     ax,ax
        rep     stosw
        mov     baud_count,ax
; zero the baud loop out
        mov     baud_sum,ax
        mov     loop2_int,ax
        mov     loop2_cnt,10
        mov     buffer_in,ax
        mov     buffer_out,ax
        mov     interp_a1,ax
        mov     interp_a0,7fffh
        mov     quad_count,32
        mov     baudlp_vector,offset save_s1
        mov     dbox_routine,offset send_eye
        mov     tap_offset,10
        mov     dbox_routine,offset _ap_routine
        mov     real_taps+12,0100000000000000b      ; center tap to 1/2
        mov     rx_char_in,offset rx_char_buf
        mov     rx_char_out,offset rx_char_buf
        mov     r_parse_jmp,0
        ret
INIT_RECV       ENDP
;
;%%%%%%%%%%%%%%%%%%%%%%%%%%%%%%%%%%%%%%%%%%%%%%%%%
;
DBOX_ROUTINES   PROC    NEAR
send_eye:
        mov     ax,rym
        mov     bx,iym
        ret
equ_in0:
        mov     bx,equalizer_in
        mov     ax,eqr_delay[bx-2]
        mov     bx,eqi_delay[bx-2]
        ret
equ_in1:
        mov     bx,equalizer_in
        mov     ax,eqr_delay[bx-4]
        mov     bx,eqi_delay[bx-4]
        ret
tap_routine:
        mov     bx,tap_offset
        mov     ax,real_taps[bx]
        mov     bx,imaginary_taps[bx]
        ret
s1_routine:
        mov     bx,aien
        sal     bx,6
        mov     ax,aren
        sal     ax,6
;       mov     ah,al
        ret
p_routine:
        mov     bx,interp_a1
        mov     ax,baud_count
        mov     ah,al
        ret
phi_routine:
        mov     bx,sine
        mov     ax,cosine
        ret
baud_loop1_routine:
        mov     bx,baud_sum
        sal     bx,3
        mov     ax,baud_count
        mov     ah,al
        ret
baud_loop2_routine:
        mov     bx,loop2_int
        sal     bx,2
```

```
                mov     ax,baud_count
                mov     ah,al
                ret
send_temp:
                mov     ax,temp_x
                mov     bx,temp_y
                ret
baud_loop_routine:
                mov     bx,equalizer_in
                mov     bx,eqr_delay[bx-2]
                mov     ax,baud_count
                mov     ah,al
                ret
DBOX_ROUTINES        ENDP
;
;%%%%%%%%%%%%%%%%%%%%%%%%%%%%%%%%%%%%%%%%%%%%%%%%
;
DBOX_ADDRESS         PROC    NEAR
                mov     al,vid_mode ; restore the initial video mode
                mov     ah,0
                int     10h
                mov     dx,offset eye_menu
                mov     ah,09h
                int     21h
get_key_in:
                mov     ah,0            ; get a key
                int     16h
                cmp     al,31h
                jne     chk_2
                mov     dbox_routine,offset send_eye
                jmp     address_done
chk_2:
                cmp     al,32h
                jne     chk_3
                mov     dbox_routine,offset equ_in0
                jmp     short address_done
chk_3:
                cmp     al,33h
                jne     chk_4
                mov     dbox_routine,offset equ_inl
                jmp     short address_done
chk_4:
                cmp     al,34h
                jne     chk_5
get_again:
                mov     ah,09
                mov     dx,offset tap_question
                int     21h
                mov     ah,0
                int     16h
                mov     ah,'0'
                cmp     al,'0'
                jl      get_again
                cmp     al, '9'+1
                jb      got_num
                and     al,0dfh         ; convert to upper case
                cmp     al,'A'
                jb      get_again
                cmp     al, 'D'
                ja      get_again
                mov     ah,'A'-10
got_num:
                sub     al,ah
                sal     al,1
                xor     ah,ah
                mov     tap_offset,ax
                mov     dbox_routine,offset tap_routine
                jmp     short address_done
chk_5:
                cmp     al,35h
                jne     chk_6
                mov     dbox_routine,offset s1_routine
                jmp     short address_done
chk_6:
                cmp     al,36h
                jne     chk_7
                mov     dbox_routine,offset p_routine
                jmp     short address_done
chk_7:
```

-continued

```
              cmp       al,37h
              jne       chk_8
              mov       dbox_routine,offset phi_routine
              jmp       short address_done
chk_8:
              cmp       al,38h
              jne       chk_9
              mov       dbox_routine,offset baud_loop1_routine
              jmp       short address_done
chk_9:
              cmp       al,39h
              je        send_loop2
              jmp       get_key_in
send_loop2:
              mov       dbox_routine,offset baud_loop2_routine
address_done:
              call      init_dbox
              ret
DBOX_ADDRESS            ENDP
              END
.model small
.286
;%%%%%%%%%%%%%%%%%%%%%%%%%%%%%%%%%%%%%%%%%%
;
;       DBOX --- Display box routines
;
;       DBOX initializes the screen to 640 x 350 graphics mode and
;       draws a picture of an oscilloscope display. The routine plot_point
;       is then used to place a point on the oscilloscope.
;
;%%%%%%%%%%%%%%%%%%%%%%%%%%%%%%%%%%%%%%%%%%
              include   equates
BLACK         equ       0
BLUE          equ       1
GREEN         equ       2
CYAN          equ       3
RED           equ       4
MAGENTA                 equ       5
BROWN         equ       6
LIGHTGRAY     equ       7
DARKGRAY      equ       8
LIGHTBLUE     equ       9
LIGHTGREEN    equ       10
LIGHTCYAN     equ       11
LIGHTRED      equ       12
LIGHTMAGENTA            equ       13
YELLOW                  equ       14
WHITE         equ       15
              public    init_dbox,plot_point,x,y
set_color     macro new_color
              push      ax
              push      dx
              mov       dx,3ceh                 ; clear mode 0 using set/reset
              xor       al,a1
              mov       ah,new_color            ; init SET/RESET to color
              out       dx,ax
              pop       dx
              pop       ax
              endm
scope_point   struc
center                  dw        0ffffh
xy            dw        0                       ; the point
bit_position            db        0
center_lg               db        0             ; light gray
up_lg                   db        0
down_lg                 db        0
side_center_lg          db        0
side_up_lg    db        0
side_down_lg            db        0
center_dg               db        0             ; dark gray
up_dg         db        0
down_dg                 db        0
side_center_dg          db        0
side_up_dg    db        0
side_down_dg            db        0
center_b      db        0                       ; blue
up_b          db        0
down_b                  db        0
side_center_b           db        0
```

-continued

```
side_up_b         db      0
side_domn_b       db      0
scope_point ends
.data
         color           db      ?
; defines the display box
         left            dw      ?
         top             dw      ?
         right           dw      ?
         bottom          dw      ?
         vert_top        dw      ?
         vert_dif        dw      ?
; x = horizontal point    y = vertical
         x               db      ?
         y               db      ?
         delta_x         db      ?
         delta_y         db      ?
         point_ptr       dw      ?
         point0                  scope_point <>
         point1                  scope_point <>
         point2                  scope_point <>
         point3                  scope_point <>
         point4                  scope_point <>
         point5                  scope_point <>
         point6                  scope_point <>
         point7                  scope_point <>
         dbox_menu_start         label byte
         dbox_menu       db      ' F1  --- Display Menu_',cr,lf
                         db      ' F2  --- Termnal Mode',cr,lf
                         db      'F10 --- Hangup'
         dbox_menu_end           label byte
         dbox_label_start        label byte
         dbox_label      db      'SOFTMODEM DISPLAY BOX'
         dbox_label_end          label byte
. code
;
;%%%%%%%%%%%%%%%%%%%%%%%%%%%%%%%%%%%%%%%%%%%%%%%
;
INIT_DBOX   PROC    NEAR
         mov     cx,8
         call    zero_points
         mov     point_ptr,0
         call    scope               ; display the oscilloscope
;        mov     dx,3ceh
;        mov     ax,1005h
;        out     dx,ax
         mov     dx,3ceh             ; enable set/reset all planes
         mov     ax,0001h
         cut     dx,ax
         mov     ax,1300h
         mov     bh,0
         mov     bl,(YELLOW XOR LIGHTGRAY OR 80h )
         mov     cx,dbox_menu_end-dbox_menu_start
         mov     dx,0000h
         push    ds
         pop     es
         mov     bp,offset dbox_menu
         int     10h
         mov     cx,dbox_label_end-dbox_label_start
         mov     dx,171dh
         mov     bp,offset dbox_label
         int     10h
         mov     dx,3ceh             ; enable set/reset all planes
         mov     ax,0f01h
         out     dx,ax
         mov     color,YELLOW
         ret
INIT_DBOX   ENDP
;
;%%%%%%%%%%%%%%%%%%%%%%%%%%%%%%%%%%%%%%%%%%%%%%%
;
SQUARE      PROC    NEAR
         push    ax
         push    bx
         push    cx
         push    dx
         push    di
         mov     dx,3ceh             ; clear mode 0 using set/reset
         xor     al,al
```

-continued

```
        mov    ah,color          ; init SET/RESET to color
        out    dx,ax
        mov    bx,top            ; up two from the corner
        sub    bx,2
        mov    ax,80             ; convert top to byte address
        imul   bx
        mov    di,ax
        mov    ax,left
        shr    ax,3              ; /8
        dec    ax                ; left corner begins one byte earlier
        add    di,ax
        mov    vert_top,di       ; save for double line
        mov    dx,03ceh          ; enable right two pixels
        mov    ax,0308h
        out    dx,ax
; put in the tmo pixels that make up the upper left corner of the box
        mov    bl,es:[di]
        stosb
        push   di                ; di is the start of the solid line
        add    di,79             ; go to next line
        mov    bl,es:[di]
; second line
        stosb
        pop    di
        mov    ax,0ff08h         ; enable all pixels   dx = 03ceh
        out    dx,ax
        mov    cx,right          ; get the number of bytes across
        sub    cx,left
        shr    cx,3              ; /8
        mov    vert_dif,cx       ; save for double line
        inc    vert_dif
        push   di
        push   cx
        rep    stosb             ; top line
        pop    cx
        pop    di
        push   cx
        add    di,80
        rep    stosb             ; next line
        pop    cx
        mov    dx,03ceh          ; enable left two pixels
        mov    ax,0c008h
        out    dx,ax
; put in the two pixels that make up the upper right corner of the box
        mov    dl,es:[di]
        stosb
        sub    di,81
        mov    dl,es:[di]
; second line
        stosb
        mov    bx,bottom
        inc    bx                ; one past the bottom of the box
        mov    ax,80             ; get the bottom left point
        imul   bx
        mov    di,ax
        mov    ax,left
        shr    ax,3
        dec    ax                ; one byte left of the box
        add    di,ax
        mov    dx,03ceh          ; enable right two pixels
        mov    ax,0308h
        out    dx,ax
        mov    dl,es:[di]
        stosb
        add    di,79             ; next line
        mov    dl,es:[di]
; second line
        stosb
        mov    dx,03ceh          ; enable all the pixels
        mov    ax,0ff08h
        out    dx,ax
        push   di                ; second bottom line
        push   cx
        rep    stosb
        pop    cx
        pop    di
        sub    di,80             ; second bottom line
        rep    stosb
        mov    dx,03ceh          ; enable left two pixels
```

-continued

```
            mov     ax,0c008h
            out     dx,ax
            uov     dl,es:[di]
            stosb
            add     di,79               ; one line down
            mov     dl,es:[di]
; second line
            stosb
; set up the map mask register to RED and also the set/reset register to reset
; the 0 and 3 planes
            mov     dx,03ceh            ; enable pixels 1 and 0
            mov     ax,0308h
            out     dx,ax
; to change the pixels to a new color must enable them in
; the MAP MASK register. Use SET/RESET reg to clear or set the new color.
; Use the bit mask to enable the correct bits
;           mov     dx,3c4h             ; set map mask to the three planes
;                                       ; that need to change
;           mov     ax,0f02h            color = 4 ... RED
;           out     dx,ax
;           mov     dx,3ceh             ; ENABLE SET/RESET 3 planes that are zero
;           mov     ax,0f01h
;           out     dx,ax
;           mov     ah,color
;           xor     al,al               ; set the SET/RESET register to clear
;           out     dx,ax               ; the enabled planes
            add     vert_top,160        ; point to first line under top/left
            mov     di,vert_top
            mov     bx,vert_top
            mov     ax,bottom           ; line count
            sub     ax,top
            inc     ax
            mov     cx,ax
            add     bx,vert_dif         ; get first line under top/right
            push    cx
vert_loop1:
            mov     dl,es:[di]
            mov     es:[di],al
            add     di,80
            loop    vert_loop1
            mov     dx,03ceh            ; change bit mask to the two left bits
            mov     ax,0c008h
            out     dx,ax
            pop     cx
            mov     al,03h
vert_loop2:
            mov     dh,es:[bx]
            mov     es:[bx],al
            add     bx,80
            loop    vert_loop2
            pop     di
            pop     dx
            pop     cx
            pop     bx
            pop     ax
            ret
SQUARE      ENDP
;
;%%%%%%%%%%%%%%%%%%%%%%%%%%%%%%%%%%%%%%%%%%%%%%%%
;
HORIZ_LINE  PROC    NEAR
            push    ax
            push    bx
            push    cx
            push    dx
            push    di
            mov     dx,03ceh            ; enable all the pixels
            mov     ax,0ff08h
            out     dx,ax
            mov     ah,color            ; enable SET/RESET to the color
            xor     al,al
            out     dx,ax
            mov     ax,0f01h            ; enable SET/RESET all planes
            out     dx,ax
            mov     ax,80               ; convert top to byte address
            imul    top
            mov     di,ax
            mov     ax,left
            shr     ax,3                ; /8
```

```
                add     di,ax
                mov     ax,right        ; get the number of bytes across
                sub     ax,left
                shr     ax,3            ; /8
                mov     cx,ax           ; byte count
                rep     stosb           ; draw the line
                pop     di
                pop     dx
                pop     cx
                pop     bx
                pop     ax
                ret
HORIZ_LINE      ENDP
;
;%%%%%%%%%%%%%%%%%%%%%%%%%%%%%%%%%%%%%%%%%%%%%%
;
VERT_LINE       PROC    NEAR
                push    ax
                push    bx
                push    cx
                push    dx
                push    di
                mov     dx,03ceh        ; enable the left most pixel
                mov     ax,08008h
                out     dx,ax
                mov     ah,color        ; enable SET/RESET to the color
                xor     al,al
                out     dx,ax
                inov    ax,0f01h        ; enable SET/RESET all planes
                out     dx,ax
                mov     ax,80           ; convert top to byte address
                imul    top
                mov     di,ax
                mov     ax,left
                shr     ax,3
                add     di,ax
                mov     cx,bottom       ; get the number of bytes down
                sub     cx,top
                inc     cx
vert_loop3:
                mov     dl,es:[di]
                mov     es:[di],al
                add     di,80
                loop    vert_loop3
                mov     dx,03ceh        ; enable all the pixels
                mov     ax,0ff08h
                out     dx,ax
                pop     di
                pop     dx
                pop     cx
                pop     bx
                pop     ax
                ret
VERT_LINE       ENDP
;
;%%%%%%%%%%%%%%%%%%%%%%%%%%%%%%%%%%%%%%%%%%%%%%
;
SCOPE   PROC    NEAR
                push    ax
                push    bx
                push    cx
                push    dx
                push    di
                push    es
                mov     ax,16           ; 640 x 350 graphics mode
                int     10h
                mov     dx,0a000h       ; segment for diaplay adapter
                mov     es,dx
; This routine changes the color of the screen using SET/RESET REGISTERS
                mov     dx,3ceh                 ; enable set/reset all planes
                mov     ax,0f01h
                out     dx,ax
                xor     al,al           ; clear mode 0 using set/reset
                mov     ah,LIGHTGRAY
                out     dx,ax
                mov     ax,1005h        ; set to mode 0
                out     dx,ax
; CLS
                xor     di,di
```

-continued

```
            xor     ax,ax           ; write to each location
            mov     cx,14000
            rep     stosw
            coment          !
; insert a grid
            mov     dx,03ceh        ; enable all the pixels
            mov     ax,08008h
            out     dx,ax
            mov     ah,RED          ; enable SET/RESET to the color
            xor     al,al
            out     dx,ax
            mov     ax,0f01h        ; enable SET/RESET all planes
            out     dx,ax
            mov     cx,28000
            mov     di,0
vert_loop4:
            mov     dl,es:[di]
            stosb
            loop    vert_loop4
            !
; center the display box on the screen
            mov     left,64
            mov     right,64+512
            mov     top,48
            mov     bottom,48+255
            mov     color,BLUE
            call    square
            mov     bx,bottom
            inc     bx
            sub     bx,top
            shr     bx,3            ; 1/8
            mov     cx,7
            push    top             ; save top for the square
            mov     color,DARKGRAY
line_loop:
            add     top,bx
            cmp     cx,4            ; skip the center line
            je      no_line1
            call    horiz_line      ; line uses top,left,right
no_line1:
            loop    line_loop
            pop     top
            push    left            ; save left
            mov     bx,right
            sub     bx,left
            shr     bx,3            ; 1/8
            mov     cx,7
vline_loop:
            add     left,bx
            cmp     cx,4            ; skip the center line
            je      no_line2
            call    vert_line       ; vline uses top, bottom, and left
no_line2:
            loop    vline_loop
; write the center lines
            pop     left
            mov     color,BLUE
            push    top
            mov     bx,top
            mov     ax,bottom
            sub     ax,top
            sar     ax,1            ; 1/2
            add     ax,bx
            mov     top,ax
            call    horiz_line
            pop     top
            mov     bx,left
            mov     ax,right
            sub     ax,bx
            sar     ax,1            ; 1/2
            add     ax,bx
            push    left
            mov     left,ax
            call    vert_line
            pop     left
            pop     es
            pop     di
            pop     dx
            pop     cx
```

-continued

```
            pop     bx
            pop     ax
            ret
SCOPE   ENDP
;
;%%%%%%%%%%%%%%%%%%%%%%%%%%%%%%%%%%%%%%%%%%%%%%
;
PLOT_POINT  PROC    NEAR
            push    ax
            push    bx
            push    cx
            push    dx
            push    di
            push    es
            mov     dx,0a000h       ; segment for diaplay adapter
            mov     es,dx
            call    restore_old
            mov     ax,127
            sub     al,y
            add     ax,top
            mov     bx,80
            imul    bx
            mov     di,ax           ; row byte count
            mov     ax,128
            add     al,x
            sal     ax,1            ; 512 pixels accross
            add     ax,left
; divide by eight and leave the remainder in dl
            mov     dl,al
            and     dl,7h
            shr     ax,3            ; /8
            add     di,ax           ; offset to correct byte
; upon entry di has the pixel address and dl has the bit position
            call    save_new        ; save the new one
            add     point_ptr,2
            and     point_ptr,0fh
            set_color color
; write the new pixel
; dl has the bit count in the correct byte
            xor     bh,bh
            mov     bl,dl
            mov     ch,dl           ; save ch = 0,2,4,6
            mov     ah,center_0[bx]
            mov     al,8
            mov     dx,03ceh        ; enable the pixel
            out     dx,ax
            mov     cl,es:[di]      ; center line
            mov     es:[di],cl
            mov     ah,center_0[bx+1]
            out     dx,ax
            add     di,80
            cmp     y,-128
            je      skip_bottom
            mov     cl,es:[di]      ; lower line
            mov     es:[di],cl
skip_bottom:
            sub     di,160
            cmp     y,127
            je      skip_top
            mov     cl,es:[di]      ; upper line
            mov     es:[di],cl
skip_top:
; If the center pixel is near the left or right side then we
; must fill in the pixels in the adjoining byte
; Because we only plot on even pixels...ch can equal 0,2,4,6
; pixels 2 and 4 are in the center of the byte so no extra work.
            cmp     x,-128          ; if on the left edge of the display box...skip
            je      not_left_side
            cmp     ch,0
            jne     not_left_side
            mov     ah,00000001b    ; setup right most pixel
            out     dx,ax
            dec     di              ; one left of upper row
            cmp     y,127
            je      skip_top1
            mov     cl,es:[di]      ; upper line
            mov     es:[di],cl
skip_top1:
            add     di,160
```

```
                cmp         y,-128
                je          skip_bottom1
                mov         cl,es:[di]              ; lower line
                mov         es:[di],cl
skip_bottom1:
                sub         di,80
                mov         ah,00000011b
                out         dx,ax
                mov         cl,es:[di]              ; center line
                mov         es:[di],cl
                jmp         short not_right_side
not_left side:
                cmp         x,127                   ; if cn right edge....skip
                je          not_right_side
                cmp         ch,6
                jne         not_right_side
                cmp         y,-128
                je          not_right_side
                mov         ah,10000000b            ; setup left most pixel
                out         dx,ax
                add         di,81                   ; one row down one right
                mov         cl,es:[di]              ; lower line
                mov         es:[di],cl
not_right_side:
                pop         es
                pop         di
                pop         dx
                pop         cx
                pop         bx
                pop         ax
                ret
.data
center_0        db          11100000b               ; first line is center row of the dot
                db          11000000b               ; second is the upper and lower lines
center_2        db          11111000b
                db          01110000b
center_4        db          00111110b
                db          00011100b
center_6        db          00001111b
                db          00000111b
.code
PLOT_POINT      ENDP
;
;%%%%%%%%%%%%%%%%%%%%%%%%%%%%%%%%%%%%%%%%%%%%%
;
RESTORE_OLD     PROC        NEAR
                push        ax
                push        bx
                push        cx
                push        dx
                push        di
                push        si
                lea         si,points
                add         si,point_ptr
                mov         ax,ds:[si]
                mov         si,ax
                lodsw
                mov         di,ax
                lodsw                               ; get the point
                mov         cx,ax                   ; scope point
                lodsb
                xor         bh,bh
                mov         bl,al                   ; bit position
                set_color   LIGHTGRAY
                call        do_color
                set_color   DARKGRAY
                call        do_color
                set_color   BLUE
                call        do_color
no_point:
                pop         si
                pop         di
                pop         dx
                pop         cx
                pop         bx
                pop         ax
                ret
.data
points                      dw          offset point0
```

-continued

```
            dw         offset point1
            dw         offset point2
            dw         offset point3
            dw         offset point4
            dw         offset point5
            dw         offset point6
            dw         offset point7
.code
RESTORE_OLD ENDP
;
;%%%%%%%%%%%%%%%%%%%%%%%%%%%%%%%%%%%%%%%
;
DO_COLOR    PROC NEAR
; upon entry:
;           DI = center byte address
;           SI = center byte color content address
;           CH = x
;           CL = y
;           BL = bit position within byte
            push       di              ; save center location
            push       si
; check all six sides for any dots . . . . if not exit
            push       si
            push       cx
            xor        ah,ah
            mov        cx,6
any_color_loop:
            lodsb
            cmp        al,0
            jne        yes_restore
            loop       any_color_loop
            pop        cx
            pop        si              ; leave si at next address
            jmp        restore_exit
yes_restore:
            pop        cx
            pop        si
            mov        dx,03ceh        ; graphics 1 and 2 address
            lodsb                      ; center pixels
            cmp        al,0
            je         no_center
            mov        ah,al
            mov        al,08h
            out        dx,ax
            mov        al,es:[di]      ; center restore
            mov        es:[di],al
no_center:
            sub        di,80           ; upper line
            lodsb
            cmp        al,0
            je         no_up
            cmp        cl,127          ; upper edge?
            je         no_up
            mov        ah,al
            mov        al,08h
            out        dx,ax           ; enable the LIGHTGRAY pixels
            mov        al,es:[di]      ; upper restore
            mov        es:[di],al
no_up:
            add        di,160
            lodsb
            cmp        al,0
            je         no_down
            cmp        cl,-128
            je         no_down
            mov        ah,al
            mov        al,08h
            out        dx,ax           ; enable the LIGHTGRAY pixels
            mov        al,es:[di]      ; lower restore
            mov        es:[di],al
no_down:
            lodsb                      ; side center byte
            cmp        bl,0            ; left edge
            je         left_3_bytes
            cmp        bl,6
            jne        restore_exit
; since the old dot is at location 6 just restore the right center byte
            sub        di,79           ; one line up, one right
            cmp        al,0
```

```
                je          restore_exit
                cmp         ch,127
                je          restore_exit
                mov         ah,al
                mov         al,08h
                out         dx,ax
                mov         al,es:[di]      ; lower restore
                mov         es:[di],al
                jmp         short restore_exit
; here the dot is on the leftmost side so restore the left three bytes
left_3_bytes:
                cmp         ch,-128
                je          restore_exit
                sub         di,81           ; one row up, one byte left
                cmp         al,0
                je          left_up
                mov         ah,al
                mov         al,08h
                out         dx,ax
                mov         al,es:[di]      ; lower restore
                mov         es:[di],al
left_up:
                sub         di,80
                lodsb
                cmp         cl,127
                je          no_side_up
                cmp         al,0
                je          no_side_up
                mov         ah,al
                mov         al,08h
                out         dx,ax
                mov         al,es:[di]      ; lower restore
                mov         es:[di],al
no_side_up:
                add         di,160
                lodsb
                cmp         cl,-128
                je          restore_exit
                cmp         al,0
                je          restore_exit
                mov         ah,al
                mov         al,08h
                out         dx,ax
                mov         al,es:[di]      ; lower restore
                mov         es:[di],al
restore_exit:
                pop         si
                add         si,6            ; next color block
                pop         di
                ret
DO_COLOR        ENDP
;
;%%%%%%%%%%%%%%%%%%%%%%%%%%%%%%%%%%%%%%%%%
;
SAVE_NEW        PROC NEAR
; upon entry:
;               DI = center byte address
;               DL = bit offset inside the byte
                lea         bx,points
                add         bx,point_ptr
                mov         ax,ds:[bx]
                mov         bx,ax
                mov         ds:[bx],di      ; center address
                mov         ah,x
                mov         al,y
                mov         ds:[bx+2],ax    ; xy
                mov         ds:[bx+4],dl    ; bit offset
                lea         si,center_0     ; SI = the bit pattern
                xor         dh,dh
                add         si,dx
; zero out all the color information
                add         bx,5            ; start of the color information
                mov         cx,18
                xor         al,al
                push        bx
zero_loop:
                mov         ds:[bx],al
                inc         bx
                loop        zero_loop
```

-continued

```
            pop     bx
            push    dx
            mov     dx,3ceh
            mov     ax,1805h
            out     dx,ax
;           mov     al,05
;           out     dx,al
;           inc     dx
;           in      al,dx
;           or      al,08h
;           mov     ah,al
;           mov     al,05h
;           dec     dx
;           out     dx,ax
;           mov     ax,1005h        ; read mode 1 . . . color compare
;           out     dx,ax
            mov     ax,0f07h
            out     dx,ax           ; color don't care register
            mov     ah,LIGHTGRAY    ; set the color compare register
            mov     al,02
            out     dx,ax
            pop     dx
;           jmp     exit
            call    get_color
            push    dx
            mov     dx,03ceh
            mov     ah,DARKGRAY     ; set the color compare register
            mov     al,02
            out     dx,ax
            pop     dx
            call    get_color
            push    dx
            mov     dx,03ceh
            mov     ah,BLUE         ; set the color compare register
            mov     al,02
            out     dx,ax
            pop     dx
            call    get_color
exit:
            ret
SAVE_NEW    ENDP
;
;%%%%%%%%%%%%%%%%%%%%%%%%%%%%%%%%%%%%%%%%%%
;
GET_COLOR   PROC NEAR
            push    bx              ; save the address
            push    di
            mov     al,es:[di]      ; get the pixels whixh are the desired color
            and     al,ds:[si]      ; only save the bits that will change
            mov     ds:[bx],al
            sub     di,80
            cmp     y,127
            je      no_upper
            mov     al,es:[di]
            and     al,ds:[si+1]
            mov     ds:[bx+1],al
no_upper:
            add     di,160
            cmp     y,-128
            je      chk_bit_cnt
            mov     al,es:[di]
            and     al,ds:[si+1]
            mov     ds:[bx+2],al
chk_bit_cnt:
            cmp     dl,0
            je      get_left_3
            cmp     dl,6
            jne     save_exit
            cmp     x,127
            je      save_exit
            sub     di,79           ; up one, right one
            mov     al,es:[di]
            and     al,10000000b
            mov     ds:[bx+3],al
            jmp     short save_exit
get_left_3:
            cmp     x,-128
            je      save_exit
            sub     di,81           ; up one, left one
```

-continued

```
            mov         al,es:[di]
            and         al,00000011b
            mov         ds:[bx+3],al
            sub         di,80
            cmp         y,127
            je          no_left_up
            mov         al,es:[di]
            and         al,00000001b
            mov         ds:[bx+4],al
no_left_up:
            add         di,160
            cmp         y,-128
            je          save_exit
            mov         al,es:[di]
            and         al,00000001b
            mov         ds:[bx+5],al
save_exit:
            pop         di
            pop         bx
            add         bx,6
            ret
GET_COLOR   ENDP
;
;%%%%%%%%%%%%%%%%%%%%%%%%%%%%%%%%%%%%%
;
ZERO_POINTS PROC NEAR
; upon entry CX = number of points to zero
            push        es
            push        ds
            pop         es
            cld
            lea         di,point0
            xor         ax,ax
point_loop:
            push        cx
            mov         cx,23
            rep         stosb
            pop         cx
            loop        point_loop
            pop         es
            ret
ZERO_POINTS ENDP
            END
.MODEL SMALL
.286
;%%%%%%%%%%%%%%%%%%%%%%%%%%%%%%%%%%%%%
;
;       Main transmitter
;       This code checks to see if the baud time is done. If it is
;       then it modulates either marks or user data. It uses a transmit
;       buffer which is 8K long.
;
;%%%%%%%%%%%%%%%%%%%%%%%%%%%%%%%%%%%%%
            include     equates
            public      init_tx,tx1224,tx_flags
            public      get_tx_data,reverse_table
            public      tx_char_in,tx_char_buf_start
            public      tx_char_buf_end,tx_char_out
            public      tx_in_ptr,tx_out_ptr
            public      setup_sample_cnt,sample_count
            extrn tx_dma_on:near
            extrn rx_sample_cnt:word
            extrn rx_in:word,recv_flags:word
            extrn recv_sample_count:word
            extrn tx_sample_segment:word
            extrn rx_sample_segment:word
            extrn tx_dma_ala16:word
            extrn aic_cmd1:word,aic_cmd2:word
            extrn processed:byte
.data
            data_count      db      ?
            data_1200       db      ?
            prev_q1q0       db      ?
            tx_baud_count   dw      ?
            baud_data       dw      ?      ; data to transmit
            tx_flags        dw      ?
;
;           tx_flags.0 = 1          tx high band
;           tx_flags.1 = 1          tx 2400
```

-continued

```
;       tx_flags.2 = 1          scrambler is on
;       tx_flags.3 = 1          1200 baud data available
;       tx_flags.4 = 1          send marks
;       tx_flags.5 = 1          send S1 ( 1100 )
;       tx_flags.8 = 1          send AIC cmds
;       tx_flags.9 = 1          AIC cmds went out
;
        tx_bit_count    db      ?
        scrambler_1_16  dw      ?
        scrambler_0 db  ?
        tx_in_ptr       dw      ?
        tx_out_ptr      dw      ?
        sample_count    dw      ?       ; if number of samples is less
                                        ; than this then compute more
        sample_num dw   ?       ; number of samples to calculate
                                ; per baud time
        an0_ptr         dw      ?       ; an semple pointers
        an1_ptr         dw      ?
        an2_ptr         dw      ?
        bn0_ptr         dw      ?       ; bn sample pointers
        bn1_ptr         dw      ?
        bn2_ptr         dw      ?
        temp_tx_buf0    dw      16 dup(?)
        t_parse_jmp     dw      ?
        tx_char_in      dw      ?
        tx_char_out     dw      ?
        tx_char_buf_start label byte
        tx_char_buf db  2000 dup(?)
        tx_char_buf_end         label byte
        send_data       db      ?
.code
INIT_TX         PROC    NEAR
; don't affect which band to transmit in
        and     tx_flags,1h
        or      tx_flags,4h     ; turn on the scrambler
        mov     tx_char_in,offset tx_char_buf
        mov     tx_char_out,offset tx_char_buf
        xor     ax,ax
        mov     tx_in_ptr,ax
        mov     tx_out_ptr,ax
        mov     t_parse_jmp,ax
        mov     an0_ptr,ax
        mov     an1_ptr,ax
        mov     an2_ptr,ax
        mov     bn0_ptr,ax
        mov     bn1_ptr,ax
        mov     bn2_ptr,ax
        mov     tx_baud_count,ax
        call    setup_sample_cnt
        ret
INIT_TX         ENDP
;
;%%%%%%%%%%%%%%%%%%%%%%%%%%%%%%%%%%%%%%%%
;
SETUP_SAMPLE_CNT   PROC   NEAR
        test    tx_flags,b0
        jnz     high_band
        mov     sample_num,8
;       mov     sample_count,12
;       test    recv_flags,b0
;       jnz     counts_done
;       mov     sample_count,20         ; use larger count for tones and also
                                        ; safety at 12 and 2400 baud
        mov     sample_count,100        ; 20 ms delay for safety
        ret
high_band:
        mov     sample_num,16
;       mov     sample_count,24
;       test    recv_flags,b0
;       jnz     counts_done
;       mov     sample_count,40
        mov     sample_count,200
;counts_done:
        ret
SETUP_SAMPLE_CNT ENDP
;
;%%%%%%%%%%%%%%%%%%%%%%%%%%%%%%%%%%%%%%%%
;
GET_TX_DATA PROC NEAR
```

```
                mov     ax,tx_in_ptr
                sub     ax,tx_out_ptr
                jns     not_neg
                add     ax,buf_len
not_neg:
                shr     ax,1                    ; word count
                cmp     ax,recv_sample_count
                stc
                jle     no_data                 ; doesn't use the Carry flag . . . so OK
                mov     di,rx_in
                mov     si,tx_out_ptr
                mov     cx,recv_sample_count    ; transfer just the samples needed
                mov     ax,rx_sample_segment
                mov     bx,tx_sample_segment
                push    ds
                push    es
                mov     ds,bx
                mov     es,ax
                rep     movsw
                pop     es
                pop     ds
                cmp     si,buf_len
                jne     no_tx_wrap
                xor     si,si
no_tx_wrap:
                cmp     di,buf_len
                jne     no_rx_wrap
                xor     di,di
no_rx_wrap:
                mov     tx_out_ptr,si
                mov     rx_in,di
                clc                             ; flag got data
no_data:
                ret
GET_TX_DATA     ENDP
;
;%%%%%%%%%%%%%%%%%%%%%%%%%%%%%%%%%%%%%%%%%%%%
;
TX1224          PROC NEAR
    IF board
                mov     dx,wr_clr_byte_ptr      ; init flag to low byte
                out     dx,al
                jmp     $+2
                mov     dx,dma_5_address
                in      al,dx
                mov     cl,al
                jmp     $+2
                in      al,dx
                mov     ch,al
                jmp     $+2
; check to see if the low byte rolled over
                mov     dx,wr_clr_byte_ptr      ; init flag to low byte
                out     dx,al
                jmp     $+2
                mov     dx,dma_5_address
                in      al,dx
                cmp     al,cl
                je      no_roll
                mov     cl,al
                jmp     $+2
                in      al,dx
                mov     ch,al
                jmp     $+2
no roll:
                mov     ax,tx_in_ptr            ; calculate the tx buffer address
                shr     ax,1                    ; word address
                add     ax,tx_dma_ala16
                sub     ax,cx
                jns     pos_diff
                add     ax,( buf_len / 2 )
pos_diff:
                cmp     ax,sample_count
                jl      do_tx
                ret
    ELSE
                mov     ax,tx_in_ptr
                sub     ax,tx_out_ptr
                jns     pos_diff
                add     ax,buf_len
```

-continued

```
pos_diff:
        shr     ax,1                    ; word count
        cmp     ax,sample_count
        jl      do_tx
        ret
    ENDIF
do_tx:
        add     ax,sample_num           ; this will prevent further calls to TX
        cmp     ax,sample_count
        jge     no_processed
        or      processed,02h
no_processed:
        and     tx_flags,NOT b9
        test    tx_flags,(b4 OR b5)
        jnz     send_marks
        test    tx_flags,b3
        jnz     get_1200_data
check_tx_data:
; parse next data here
        cmp     t_parse_jmp,0           ; any data left to parse
        je      check_tx_char
        mov     ax,t_parse_jmp
        call    ax
        jmp     short scrambler
check_tx_char:
        mov     ax,tx_char_in
        mov     si,tx_char_out
        cmp     ax,si
        je      send_marks
get_tx_char:
        lodsb                           ; get the character to transmit
        cmp     si,offset tx_char_buf_end
        jne     save_tx_ptr
        lea     si,tx_char_buf_start
save_tx_ptr:
        mov     tx_char_out,si
        shl     ax,1                    ; insert start bit
        mov     bl,al
        and     bx,0fh
        shr     ax,4
        mov     send_data,al
        mov     t_parse_jmp,offset parse_4_2_data
        jmp     short scrambler
get_1200_data:
        and     tx_flags,0fff7h
        mov     al,data_1200
        shl     al,2
        and     al,0ch
        or      al,01h
        jmp     short gray_encode
send_marks:
        mov     bx,0fh
        test    tx_flags,b5             ; send 1100 ?
        jz      scrambler
        mov     bx,0c0h
scrambler:
; data to be scrambled should be in the lower 4 bits of BX
; THERE IS NO SCRAMBLER LOCKUP DETECTOR
        and     bx,0fh
        test    tx_flags,b2
        jz      no_scrambler
        mov     ax,scrambler_1_16
        xor     bx,ax
        shr     ax,3
        xor     bx,ax                   ; scrambled data is in BX.0 to BX.3
        or      ah,scrambler_0
        shr     ax,1
        and     bx,0fh
        mov     cx,bx                   ; save in CX
        shl     bx,13
        or      ax,bx                   ; shift scrambled data into the delay
        mov     scrambler_1_16,ax       ; line
        mov     bx,cx                   ; restore data
        mov     scrambler_0,0
        test    bx,b3
        jz      no_scrambler
        mov     scrambler_0,20h
no_scrambler:
        mov     al,reverse_table[bx]
```

```
check_1200:
        test    tx_flags,b1
        jnz     gray_encode
        mov     data_1200,al
        and     al,0ch
        or      al,01h
        or      tx_flags,08h
gray_encode:
        test    al,b3
        jnz     diff_encode
        xor     al,4
diff_encode:
        and     prev_q1q0,0ch
        add     al,prev_q1q0
        and     ax,0fh                  ; clear AH also
        mov     prev_q1q0,al
filter_routine:
        shl     ax,1                    ; word offset
        mov     bx,ax
        test    tx_flags,b0
        jz      low_band_filter
        jmp     high_band_filter
low_band_filter:
        mov     ax,low_band_bn[bx]
        mov     bn0_ptr,ax
        mov     ax,low_band_an[bx]
        mov     an0_ptr,ax
        mov     si,ax                   ; SI = AN0 pointer
        mov     di,an1_ptr              ; DI = AN1 pointer
        mov     bx,an2_ptr              ; BX = AN2 pointer
; take care of the AIC and the receivers baud loop
        mov     cx,0fffch               ; AIC
        mov     ax,n0_low_p1[si]        ; cosine sample 0
        add     ax,n1_low_p1[di]
        add     ax,n2_low_p1[bx]
        mov     temp_tx_buf0,ax         ; cos = +1
        mov     ax,n0_low_p1[si+2]      ; cosine sample 1
        add     ax,n1_low_p1[di+2]
        add     ax,n2_low_p1[bx+2]
        neg     ax                      ; cos = -1
        mov     temp_tx_buf0+2,ax
        mov     ax,n0_low_p1[si+4]      ; cosine sample 2
        add     ax,n1_low_p1[di+4]
        add     ax,n2_low_p1[bx+4]
        neg     ax                      ; cos = -1
        mov     temp_tx_buf0+4,ax
        mov     ax,n0_low_p1[si+6]      ; cosine sample 3
        add     ax,n1_low_p1[di+6]
        add     ax,n2_low_p1[bx+6]
        mov     temp_tx_buf0+6,ax ; cos = +1
        mov     ax,n0_low_p1[si+8]      ; cosine sample 4
        add     ax,n1_low_p1[di+8]
        add     ax,n2_low_p1[bx+8]
        mov     temp_tx_buf0+8,ax ; cos = +1
        mov     ax,n0_low_p1[si+10]     ; cosine sample 5
        add     ax,n1_low_p1[di+10]
        add     ax,n2_low_p1[bx+10]
        neg     ax                      ; cos = -1
        mov     temp_tx_buf0+10,ax
        mov     ax,n0_low_p1[si+12]     ; cosine sample 6
        add     ax,n1_low_p1[di+12]
        add     ax,n2_low_p1[bx+12]
        neg     ax                      ; cos = -1
        mov     temp_tx_buf0+12,ax
        mov     ax,n0_low_p1[si+14]     ; cosine sample 7
        add     ax,n1_low_p1[di+14]
        add     ax,n2_low_p1[bx+14]
        mov     temp_tx_buf0+14,ax      ; cos = +1
        mov     si,bn0_ptr              ; SI = BN0 pointer
        mov     di,bn1_ptr              ; DI = BN1 pointer
        mov     bx,bn2_ptr              ; BX = BN2 pointer
        mov     ax,n0_low_p1[si]        ; sine sample 0
        add     ax,nl_low_p1[di]
        add     ax,n2_low_p1[bx]
        sub     temp_tx_buf0,ax         ; sine = -1
        and     temp_tx_buf0,cx
        mov     ax,n0_low_p1[si+2]      ; sine sample 1
        add     ax,n1_low_p1[di+2]
        add     ax,n2_low_p1[bx+2]
```

```
              sub       temp_tx_buf0+2,ax  ; sine = −1
              and       temp_tx_buf0+2,cx
              mov       ax,n0_low_p1[si+4]      ; sine sample 2
              add       ax,n1_low_p1[di+4]
              add       ax,n2_low_p1[bx+4]
              add       temp_tx_buf0+4,ax  ; sine = +1
              and       temp_tx_buf0+4,cx
              mov       ax,n0_low_p1[si+6]      ; sine sample 3
              add       ax,n1_low_p1[di+6]
              add       ax,n2_low_p1[bx+6]
              add       temp_tx_buf0+6,ax  ; sine = +1
              and       temp_tx_buf0+6,cx
              mov       ax,n0_low_p1[si+8]      ; sine sample 4
              add       ax,n1_low_p1[di+8]
              add       ax,n2_low_p1[bx+8]
              sub       temp_tx_buf0+8,ax  ; sine = −1
              and       temp_tx_buf0+8,cx
              mov       ax,n0_low_p1[si+10]     ; sine sample 5
              add       ax,n1_low_p1[di+10]
              add       ax,n2_low_p1[bx+10]
              sub       temp_tx_buf0+10,ax     ; sine = −1
              and       temp_tx_buf0+10,cx
              mov       ax,n0_low_p1[si+12]     ; sine sample 6
              add       ax,n1_low_p1[di+12]
              add       ax,n2_low_p1[bx+12]
              add       temp_tx_buf0+12,ax     ; sine = +1
              and       temp_tx_buf0+12,cx
              mov       ax,n0_low_p1[si+14]     ; sine sample 7
              add       ax,n1_low_p1[di+14]
              add       ax,n2_low_p1[bx+14]
              add       temp_tx_buf0+14,ax     ; sine = +1
              and       temp_tx_buf0+14,cx
;
;      All the transmit samples are in the temp buffer.
;      Now shift them over to the transmit buffer.
;
              lea       si,temp_tx_buf0
              mov       es,tx_sample_segment
              mov       di,tx_in_ptr
              cmp       di,(buf_len−16)         ; near the end of the buffer?
              jl        no_wrap
              mov       cx,buf_len
              sub       cx,di
              sar       cx,1                    ; number of samples to fill buffer
              mov       bx,8
              sub       bx,cx                   ; number left
              rep       movsw
              xor       di,di
              mov       cx,bx
              rep       movsw
              jmp       short save_ptr
; This routine is for the switch from 7200 to 9600 recv sample rate during
; call progress
send_aic_cmds:
              cmp       di,(buf_len−22)         ; near the end of the buffer?
              jge       move_data
              or        tx_flags,b9
              and       tx_flags,NOT bB
              lodsw
              or        ax,3
              stosw
              mov       ax,aic_cmd1
              stosw
              lodsw
              or        ax,3
              stosw
              mov       ax,aic_cmd2
              stosw
              mov       cx,6
              rep       movsw
              jmp       short save_ptr
no_wrap:
              test      tx_flags,b8             ; any AIC cmds?
              jnz       send_aic_cmds
move_data:
              mov       cx,8
              rep       movsw
save_ptr:
              mov       tx_in_ptr,di
```

-continued

```
; shift the an,bn delay lines
        mov     ax,an1_ptr
        mov     an2_ptr,ax
        mov     ax,an0_ptr
        mov     an1_ptr,ax
        mov     ax,bn1_ptr
        mov     bn2_ptr,ax
        mov     ax,bn0_ptr
        mov     bn1_ptr,ax
        inc     tx_baud_count
        cmp     tx_baud_count,2
        jl      ok_leave_low
; enable DMA channel 1
        call    tx_dma_on
ok_leave_low:
        ret
;%%%%%%%%%%%%%%%%%%%%%%%%%%%%%%%%%%%%%%%%%%
high_band_filter:
        mov     ax,high_band_bn[bx]
        mov     bn0_ptr,ax
        mov     ax,high_band_an[bx]
        mov     an0_ptr,ax
        mov     si,ax                   ; SI = AN0 pointer
        mov     di,an1_ptr              ; DI = AN1 pointer
        mov     bx,an2_ptr              ; BX = AN2 pointer
; AIC and baud loop variables
        mov     cx,0fffch
        mov     ax,n0_high_p1[si]       ; cosine sample 0
        add     ax,n1_high_p1[di]
        add     ax,n2_high_p1[bx]
        and     ax,cx
        mov     temp_tx_buf0,ax         ; cos = +1
        mov     ax,n0_high_p1[si+4]     ; cosine sample 2
        add     ax,n1_high_p1[di+4]
        add     ax,n2_high_p1[bx+4]
        neg     ax                      ; cos = -1
        and     ax,cx
        mov     temp_tx_buf0+4,ax ; skip sample 1
        mov     ax,n0_high_p1[si+8]     : cosine sample 4
        add     ax,n1_high_p1[di+8]
        add     ax,n2_high_p1[bx+8]
        and     ax,cx
        mov     temp_tx_buf0+8,ax ; cos = +1
        mov     ax,n0_high_p1[si+12]    ; cosine sample 6
        add     ax,n1_high_p1[di+12]
        add     ax,n2_high_p1[bx+12]
        neg     ax                      ; cos = -1
        and     ax,cx
        mov     temp_tx_buf0+12,ax
        mov     ax,n0_high_p1[si+16]    ; cosine sample 8
        add     ax,n1_high_p1[di+16]
        add     ax,n2_high_p1[bx+16]
        and     ax,cx
        mov     temp_tx_buf0+16,ax      ; cos = +1
        mov     ax,n0_high_p1[si+20]    ; cosine sample 10
        add     ax,n1_high_p1[di+20]
        add     ax,n2_high_p1[bx+20]
        neg     ax                      ; cos = -1
        and     ax,cx
        mov     temp_tx_buf0+20,ax
        mov     ax,n0_high_p1[si+24]    ; cosine sample 12
        add     ax,n1_high_p1[di+24]
        add     ax,n2_high_p1[bx+24]
        and     ax,cx
        mov     temp_tx_buf0+24,ax      cos = +1
        mov     ax,n0_high_p1[si+28]    ; cosine sample 14
        add     ax,n1_high_p1[di+28]
        add     ax,n2_high_p1[bx+28]
        neg     ax                      cos = -1
        and     ax,cx
        mov     temp_tx_buf0+28,ax
        mov     si,bn0_ptr              ; SI = BN0 pointer
        mov     di,bn1_ptr              ; DI = BN1 pointer
        mov     bx,bn2_ptr              ; BX = BN2 pointer
        mov     ax,n0_high_p1[si+2]     ; sine sample 0
        add     ax,n1_high_p1[di+2]
        add     ax.n2_high_p1[bx+2]
        neg     ax
        and     ax,cx
```

```
            mov     temp_tx_buf0+2,ax
            mov     ax,n0_high_p1[si+6]     ; sine sample 1
            add     ax,n1_high_p1[di+6]
            add     ax,n2_high_p1[bx+6]
            and     ax,cx
            mov     temp_tx_buf0+6,ax
            mov     ax,n0_high_p1[si+10]    ; sine sample 2
            add     ax,n1_high_p1[di+10]
            add     ax,n2_high_p1[bx+10]
            neg     ax
            and     ax,cx
            mov     temp_tx_buf0+10,ax
            mov     ax,n0_high_p1[si+14]    ; sine sample 3
            add     ax,n1_high_p1[di+14]
            add     ax,n2_high_p1[bx+14]
            and     ax,cx
            mov     temp_tx_buf0+14,ax
            mov     ax,n0_high_p1[si+18]    ; sine sample 4
            add     ax,n1_high_p1[di+18]
            add     ax,n2_high_p1[bx+18]
            neg     ax
            and     ax,cx
            mov     temp_tx_buf0+18,ax
            mov     ax,n0_high_p1[si+22]    ; sine sample 5
            add     ax,n1_high_p1[di+22]
            add     ax,n2_high_p1[bx+22]
            and     ax,cx
            mov     temp_tx_buf0+22,ax
            mov     ax,n0_high_p1[si+26]    ; sine sample 6
            add     ax,n1_high_p1[di+26]
            add     ax,n2_high_p1[bx+26]
            neg     ax
            and     ax,cx
            mov     temp_tx_buf0+26,ax
            mov     ax,n0_high_p1[si+30]    ; sine sample 7
            add     ax,n1_high_p1[di+30]
            add     ax,n2_high_p1[bx+30]
            and     ax,cx
            mov     temp_tx_buf0+30,ax
;
;           All the transmit samples are in the temp buffer.
;           Now shift them over to the transmit buffer.
;
            mov     cx,16
            lea     si,temp_tx_buf0
            mov     es,tx_sample_segment
            mov     di,tx_in_ptr
            rep     movsw
            cmp     di,buf_len
            jne     save_in_ptr
            xor     di,di
save_in_ptr:
            mov     tx_in_ptr,di
; shift the an,bn delay lines
            mov     ax,an1_ptr
            mov     an2_ptr,ax
            mov     ax,an0_ptr
            mov     an1_ptr,ax
            mov     ax,bn1_ptr
            mov     bn2_ptr,ax
            mov     ax,bn0_ptr
            mov     bn1_ptr,ax
            inc     tx_baud_count
            cmp     tx_baud_count,2
            jl      ok_leave_high
; enable DMA channel 1
            call    tx_dma_on
ok_leave_high:
            ret
.data
reverse_table   db      00h
            db      08h
            db      04h
            db      0ch
            db      02h
            db      0ah
            db      06h
            db      0eh
            db      01h
```

-continued

```
              db    09h
              db    05h
              db    0dh
              db    03h
              db    0bh
              db    07h
              db    0fh
;
;%%%%%%%%%%%%%%%%%%%%%%%%%%%%%%%%%%%%%%%%
;
high_band_an  dw    n0_high_p1 - n0_high_p1
              dw    n0_high_p3 - n0_high_p1
              dw    n0_high_p1 - n0_high_p1
              dw    n0_high_p3 - n0_high_p1
              dw    n0_high_m1 - n0_high_p1
              dw    n0_high_m1 - n0_high_p1
              dw    n0_high_m3 - n0_high_p1
              dw    n0_high_m3 - n0_high_p1
              dw    n0_high_m1 - n0_high_p1
              dw    n0_high_m3 - n0_high_p1
              dw    n0_high_m1 - n0_high_p1
              dw    n0_high_m3 - n0_high_p1
              dw    n0_high_p1 - n0_high_p1
              dw    n0_high_p1 - n0_high_p1
              dw    n0_high_p3 - n0_high_p1
              dw    n0_high_p3 - n0_high_p1
high_band_bn  dw    n0_high_p1 - n0_high_p1
              dw    n0_high_p1 - n0_high_p1
              dw    n0_high_p3 - n0_high_p1
              dw    n0_high_p3 - n0_high_p1
              dw    n0_high_p1 - n0_high_p1
              dw    n0_high_p3 - n0_high_p1
              dw    n0_high_p1 - n0_high_p1
              dw    n0_high_p3 - n0_high_p1
              dw    n0_high_m1 - n0_high_p1
              dw    n0_high_m1 - n0_high_p1
              dw    n0_high_m3 - n0_high_p1
              dw    n0_high_m3 - n0_high_p1
              dw    n0_high_m1 - n0_high_p1
              dw    n0_high_m3 - n0_high_p1
              dw    n0_high_m1 - n0_high_p1
              dw    n0_high_m3 - n0_high_p1
low_band_an   dw    n0_low_p1 - n0_low_p1
              dw    n0_low_p3 - n0_low_p1
              dw    n0_low_p1 - n0_low_p1
              dw    n0_low_p3 - n0_low_p1
              dw    n0_low_m1 - n0_low_p1
              dw    n0_low_m1 - n0_low_p1
              dw    n0_low_m3 - n0_low_p1
              dw    n0_low_m3 - n0_low_p1
              dw    n0_low_m1 - n0_low_p1
              dw    n0_low_m3 - n0_low_p1
              dw    n0_low_m1 - n0_low_p1
              dw    n0_low_m3 - n0_low_p1
              dw    n0_low_p1 - n0_low_p1
              dw    n0_low_p1 - n0_low_p1
              dw    n0_low_p3 - n0_low_p1
              dw    n0_low_p3 - n0_low_p1
low_band_bn   dw    n0_low_p1 - n0_low_p1
              dw    n0_low_p1 - n0_low_p1
              dw    n0_low_p3 - n0_low_p1
              dw    n0_low_p3 - n0_low_p1
              dw    n0_low_p1 - n0_low_p1
              dw    n0_low_p3 - n0_low_p1
              dw    n0_low_p1 - n0_low_p1
              dw    n0_low_p3 - n0_low_p1
              dw    n0_low_m1 - n0_low_p1
              dw    n0_low_m1 - n0_low_p1
              dw    n0_low_m3 - n0_low_p1
              dw    n0_low_m3 - n0_low_p1
              dw    n0_low_m1 - n0_low_p1
              dw    n0_low_m3 - n0_low_p1
              dw    n0_low_m1 - n0_low_p1
              dw    n0_low_m3 - n0_low_p1
;
;%%%%%%%%%%%%%%%%%%%%%%%%%%%%%%%%%%%%%%%%
;
n0_high_p1    dw    −4        ; high band +1 point
              dw    −12
```

```
            dw   -28
            dw   -52
            dw   -84
            dw   -120
            dw   -152
            dw   -180
            dw   -192
            dw   -180
            dw   -140
            dw   -56
            dw   68
            dw   244
            dw   464
            dw   728
n0_high_m1  dw   4           ; high band -1 point
            dw   12
            dw   28
            dw   52
            dw   84
            dw   120
            dw   152
            dw   180
            dw   192
            dw   180
            dw   140
            dw   56
            dw   -68
            dw   -244
            dw   -464
            dw   -728
n0_high_p3  dw   3 * -4      ; high band +3 point
            dw   3 * -12
            dw   3 * -28
            dw   3 * -52
            dw   3 * -84
            dw   3 * -120
            dw   3 * -152
            dw   3 * -180
            dw   3 * -192
            dw   3 * -180
            dw   3 * -140
            dw   3 * -56
            dw   3 * 68
            dw   3 * 244
            dw   3 * 464
            dw   3 * 728
n0_high_m3  dw   3 * 4       ; high band -3 point
            dw   3 * 12
            dw   3 * 28
            dw   3 * 52
            dw   3 * 84
            dw   3 * 120
            dw   3 * 152
            dw   3 * 180
            dw   3 * 192
            dw   3 * 180
            dw   3 * 140
            dw   3 * 56
            dw   3 * -68
            dw   3 * -244
            dw   3 * -464
            dw   3 * -728
;
;%%%%%%%%%%%%%%%%%%%%%%%%%%%%%%%%%%%%%%%%
;
n1_high_p1  dw   1028        ; high band an1 +1 point
            dw   1344
            dw   1668
            dw   1976
            dw   2248
            dw   2472
            dw   2628
            dw   2712
            dw   2712
            dw   2628
            dw   2472
            dw   2248
            dw   1976
            dw   1668
```

-continued

```
            dw      1344
            dw      1028
n1_high_m1  dw      −1028       ; high band an1 −1 point
            dw      −1344
            dw      −1668
            dw      −1976
            dw      −2248
            dw      −2472
            dw      −2628
            dw      −2712
            dw      −2712
            dw      −2628
            dw      −2472
            dw      −2248
            dw      −1976
            dw      −1668
            dw      −1344
            dw      −1028
n1_high_p3  dw      3 * 1028    ; high band an1 +3 point
            dw      3 * 1344
            dw      3 * 1668
            dw      3 * 1976
            dw      3 * 2248
            dw      3 * 2472
            dw      3 * 2628
            dw      3 * 2712
            dw      3 * 2712
            dw      3 * 2628
            dw      3 * 2472
            dw      3 * 2248
            dw      3 * 1976
            dw      3 * 1668
            dw      3 * 1344
            dw      3 * 1028
n1_high_m3  dw      3 * −1028   ; high band an1 −3 point
            dw      3 * −1344
            dw      3 * −1668
            dw      3 * −1976
            dw      3 * −2248
            dw      3 * −2472
            dw      3 * −2628
            dw      3 * −2712
            dw      3 * −2712
            dw      3 * −2628
            dw      3 * −2472
            dw      3 * −2248
            dw      3 * −1976
            dw      3 * −1668
            dw      3 * −1344
            dw      3 * −1028
;
;%%%%%%%%%%%%%%%%%%%%%%%%%%%%%%%%%%%%%%%%
;
n2_high_p1  dw      728         ; an2,bn2 +1 points
            dw      464
            dw      244
            dw      68
            dw      −56
            dw      −140
            dw      −180
            dw      −192
            dw      −180
            dw      −152
            dw      −120
            dw      −84
            dw      −52
            dw      −28
            dw      −12
            dw      −4
n2_high_m1  dw      −728        ; an2,bn2 −1 points
            dw      −464
            dw      −244
            dw      −68
            dw      56
            dw      140
            dw      180
            dw      192
            dw      180
            dw      152
```

-continued

```
            dw      120
            dw      84
            dw      52
            dw      28
            dw      12
            dw      4
n2_high_p3  dw      3 * 728     ; an2,bn2 +3 points
            dw      3 * 464
            dw      3 * 244
            dw      3 * 68
            dw      3 * -56
            dw      3 * -140
            dw      3 * -180
            dw      3 * -192
            dw      3 * -180
            dw      3 * -152
            dw      3 * -120
            dw      3 * -84
            dw      3 * -52
            dw      3 * -28
            dw      3 * -12
            dw      3 * -4
n2_high_m3  dw      3 * -728    ; an2,bn2 -3 points
            dw      3 * -464
            dw      3 * -244
            dw      3 * -68
            dw      3 * 56
            dw      3 * 140
            dw      3 * 180
            dw      3 * 192
            dw      3 * 180
            dw      3 * 152
            dw      3 * 120
            dw      3 * 84
            dw      3 * 52
            dw      3 * 28
            dw      3 * 12
            dw      3 * 4
;
;%%%%%%%%%%%%%%%%%%%%%%%%%%%%%%%%%%%%%%%%
;
n0_low_p1   dw      -8          ; an0,bn0 +1 points
            dw      -40
            dw      -100
            dw      -168
            dw      -188
            dw      -104
            dw      152
            dw      592
n0_low_m1   dw      8           ; an0,bn0 -1 points
            dw      40
            dw      100
            dw      168
            dw      188
            dw      104
            dw      -152
            dw      -592
n0_low_p3   dw      3 * -8      ; an0,bn0 +3 points
            dw      3 * -40
            dw      3 * -100
            dw      3 * -168
            dw      3 * -188
            dw      3 * -104
            dw      3 * 152
            dw      3 * 592
n0_low_m3   dw      3 * 8       ; an0,bn0 -3 points
            dw      3 * 40
            dw      3 * 100
            dw      3 * 168
            dw      3 * 188
            dw      3 * 104
            dw      3 * -152
            dw      3 * -592
;
;%%%%%%%%%%%%%%%%%%%%%%%%%%%%%%%%%%%%%%%%
;
n1_low_p1   dw      1184        ; an1,bn1 +1 points
            dw      1824
            dw      2368
```

```
                dw      2680
                dw      2680
                dw      2368
                dw      1824
                dw      1184
n1_low_m1   dw  -1184       ; an1,bn1 -1 points
                dw      -1824
                dw      -2368
                dw      -2680
                dw      -2680
                dw      -2368
                dw      -1824
                dw      -1184
n1_low_p3   dw  3 * 1184    ; an1,bn1 +3 points
                dw      3 * 1824
                dw      3 * 2368
                dw      3 * 2680
                dw      3 * 2680
                dw      3 * 2368
                dw      3 * 1824
                dw      3 * 1184
n1_low_m3   dw  3 * -1184   ; an1,bn1 -3 points
                dw      3 * -1824
                dw      3 * -2368
                dw      3 * -2680
                dw      3 * -2680
                dw      3 * -2368
                dw      3 * -1824
                dw      3 * -1184
;
;%%%%%%%%%%%%%%%%%%%%%%%%%%%%%%%%%%%%%%
;
n2_low_p1   dw      592         ; an2,bn2 +1 points
                dw      152
                dw      -104
                dw      -188
                dw      -168
                dw      -100
                dw      -40
                dw      -8
n2_low_m1   dw      -592        ; an2,bn2 -1 points
                dw      -152
                dw      104
                dw      188
                dw      168
                dw      100
                dw      40
                dw      8
n2_low_p3   dw      3 * 592     ; an2,bn2 +3 points
                dw      3 * 152
                dw      3 * -104
                dw      3 * -188
                dw      3 * -168
                dw      3 * -100
                dw      3 * -40
                dw      3 * -8
n2_low_m3   dw      3 * -592    ; an2,bn2 -3 points
                dw      3 * -152
                dw      3 * 104
                dw      3 * 188
                dw      3 * 168
                dw      3 * 100
                dw      3 * 40
                dw      3 * 8
TX1224      ENDP
;
;%%%%%%%%%%%%%%%%%%%%%%%%%%%%%%%%%%%%%%
;
.code
PARSE_DATA PROC NEAR
parse_4_0_data:
        mov     t_parse_jmp,0
        jmp     short parse_it
parse_4_2_data:
        mov     t_parse_jmp,offset parse_2_data
        jmp     short parse_it
parse_4_4_data:
        mov     t_parse_jmp,offset parse_4_0_data
        jmp     short parse_it
```

-continued

```
parse_it:
        mov     al,send_data
        mov     bl,al
        shr     al,4
        or      al,0f0h
        mov     send_data,al
        ret
parse_2_data:
        mov     al,send_data
        or      al,0eh              insert stop bits
        mov     bl,al
        mov     ax,tx_char_in       ; any more chars to go out?
        mov     si,tx_char_out
        sub     ax,si
        jnz     get_next_char
        mov     t_parse_jmp,0
        ret
get_next_char:
        lodsb                       ; get the character to transmit
        cmp     si,offset tx_char_buf_end
        jne     ok_done
        lea     si,tx_char_buf_start
ok_done:
        mov     tx_char_out,si
        and     bl,03h
        shl     ax,3                ; insert start bit into ax.2
        or      bl,al
        shr     ax,4
        or      al,80h              ; insert the stop bit
        mov     send_data,al
        mov     t_parse_jmp,offset parse_4_4_data
        ret
PARSE_DATA      ENDP
;
;%%%%%%%%%%%%%%%%%%%%%%%%%%%%%%%%%%%%%%
;
TX_COMMANDS PROC NEAR
send_s1:
        and     tx_flags,1111111111001001b   ; 1200, no_scrambler, no marks
        or      tx_flags,0000000000100000b
        ret
send_scr_marks:
        and     tx_flags,1111111111001011b   ; no S1
        or      tx_flags,0000000000010100b   ; scrambler on , send marks
        ret
tx_data_on:
        and     tx_flags,1111111111001111b
        ret
TX_COMMANDS ENDP
        END
.model small
.286
;%%%%%%%%%%%%%%%%%%%%%%%%%%%%%%%%%%%%%%
;
;       Tone generation
;
;       This program generates all sine waves.
;       The cosine and sine are read from two tables each 256
;       words long.
;
;%%%%%%%%%%%%%%%%%%%%%%%%%%%%%%%%%%%%%%
        include   equates
        public    cosine_table,sine_table
        public    send_tones,freq,dial,freq_sum,tone_int
        public    freq2,freq_sum2,dtmf_int,dtmf
        extrn     set_aic_bands:near,init_dma:near
        extrn     setup_sample_cnt:near,init_timer:near
        extrn     speaker_on:near,speaker_off:near
        extrn     on_hook:near,off_hook:near
        extrn     tx_dma_off:near,nul_routine:near
        extrn     window_flip:near,tx_dma_on:near
        extrn     tx_flags:word,tx_vector:word
        extrn     tx_in_ptr:word,tx_sample_segment:word
        extrn     sample_count:word,tx_dma_ala16:word
        extrn     timer_10ms:word,recv_flags:word
        extrn     display_segment:word,tx_out_ptr:word
        extrn     dial_menu:byte
        extrn     processed:byte
.data
```

```
                freq            dw  ?
                freq2           dw  ?
                freq_sum        dw  ?
                freq_sum2       dw  ?
.code
;
;%%%%%%%%%%%%%%%%%%%%%%%%%%%%%%%%%%%%%%%%
;
SEND_TONES PROC NEAR
; upon entry freq will hold the desired frequency to be sent
        push    ax
        mov     freq_sum,0
        or      tx_flags,1          ; high band
        call    setup_sample_cnt
        mov     tx_in_ptr,0
    IF board
        call    set_aic_bands
        call    init_dma
        pop     ax
        call    init_timer
        mov     tx_vector,offset tone_int
    ELSE
        pop     ax
    ENDIF
tone_loop:
    IF board
        test    recv_flags,b5
        jnz     end_tone
    ELSE
        call    tone_int
    ENDIF
        mov     ah,1
        int     16h
        jz      tone_loop
        mov     ah,0
        int     16h
    IF board
end_tone:
        call    tx_dma_off
        mov     tx_vector,offset nul_routine
    ENDIF
        ret
SEND_TONES      ENDP
;
;%%%%%%%%%%%%%%%%%%%%%%%%%%%%%%%%%%%%%%%%
;
TONE_INT        PROC NEAR
    IF board
        call    tx_buf_cnt
        jc      do_tone
        ret
    ELSE
        mov     ax,tx_in_ptr
        sub     ax,tx_out_ptr
        jns     no_rollover
        add     ax,buf_len
no_rollover:
        shr     ax,1
        cmp     ax,16
        jl      do_tone
        ret
    ENDIF
do_tone:
        mov     processed,0ffh
        mov     es,tx_sample_segment
        mov     di,tx_in_tr
        mov     cx,16           ; loop counter
        mov     dx,0fffch
sample_loop:
        mov     bx,freq_sum
        add     bx,freq
        mov     freq_sum,bx
        mov     bl,bh
        xor     bh,bh
        sal     bx,1
        mov     ax, cosine_table [bx]
        sar     ax,1
        and     ax,dx
        stosw
```

-continued

```
            loop        sample_loop
            cmp         di,buf_len
            jne         save_ptr
            xor         di,di
save_ptr:
            mov         tx_in_ptr,di
        IF board
; enable DMA channel 1
            call        tx_dma_on
        ENDIF
            ret
TONE_INT        ENDP
;
;%%%%%%%%%%%%%%%%%%%%%%%%%%%%%%%%%%%%%%%%%
;
DTMF PROC NEAR
; BX contains the digit to send
; AX contains the time to send the tone in 10ms counts
; This routine will abort if a key is hit and Carry will be set
            push        ax
            sal         bx,1
            mov         ax,low_table[bx]
            mov         freq,ax
            mov         ax,high_table[bx]
            mov         freq2,ax
            mov         freq_sum,0
            mov         freq_sum2,0
            or          tx_flags,1      ; high band
            call        setup_sample_cnt
            mov         tx_in_ptr,0
        IF board
            call        set_aic_bands
            call        init_dma
            pop         ax              ; get the timer value
            call        init_timer
            mov         tx_vector,offset dtmf_int
        ENDIF
wait_loop:
            test        recv_flags,b5
            jnz         timed_out
        IFE board
            call        dtmf_int
        ENDIF
            mov         ah,1
            int         16h
            jz          wait_loop
            mov         ah,0
            int         16h
            stc
            jmp         short dtmf_done
timed_out:
            clc
dtmf_done:
        IF board
            call        tx_dma_off
            mov         tx_vector,offset nul_routine    ; turn off the tone
        ENDIF
            ret
.data
low_table       dw      1941            ; 0
                dw      1697            ; 1
                dw      1697            ; 2
                dw      1697            ; 3
                dw      1770            ; 4
                dw      1770            ; 5
                dw      1770            ; 6
                dw      1852            ; 7
                dw      1852            ; 8
                dw      1852            ; 9
                dw      1941            ; #
                dw      1941            ; *
                dw      1697            ; a
                dw      1770            ; b
                dw      1852            ; c
                dw      1941            ; d
high_table      dw      h1336           ; 0
                dw      h1209           ; 1
                dw      h1336           ; 2
                dw      h1477           ; 3
```

```
            dw      h1209           ; 4
            dw      h1336           ; 5
            dw      h1477           ; 6
            dw      h1209           ; 7
            dw      h1336           ; 8
            dw      h1477           ; 9
            dw      h1477           ; #
            dw      h1209           ; *
            dw      h1663           ; a
            dw      h1663           ; b
            dw      h1663           ; c
            dw      h1663           ; d
DTMF ENDP
;
;%%%%%%%%%%%%%%%%%%%%%%%%%%%%%%%%%%%%%%%
;
.code
DTMF_INT        PROC NEAR
    IF board
            call    tx_buf_cnt
            jc      do_dtmf
            ret
do_dtmf:
    ENDIF
            mov     processed,0ffh
            mov     es,tx_sample_segment
            mov     di,tx_in_ptr
            mov     cx,16           ; loop counter
dtmf_loop:
            mov     bx,freq_sum
            add     bx,freq
            mov     freq_sum,bx
            mov     bl,bh
            xor     bh,bh
            sal     bx,1
            mov     dx,cosine_table[bx]
            sar     dx,1            ; 1/2
            mov     bx,freq_sum2
            add     bx,freq2
            mov     freq_sum2,bx
            mov     bl,bh
            xor     bh,bh
            sal     bx,1
            mov     ax,cosine_table[bx]
            sar     ax,1            ; 1/2
            add     ax,dx
            and     ax,0fffch
            stosw
            loop    dtmf_loop
            cmp     di,buf_len
            jne     save_in_ptr
            xor     di,di
save_in_ptr:
            mov     tx_in_ptr,di
    IF board
; enable DMA channel 1
            call    tx_dma_on
    ENDIF
            ret
DTMF_INT        ENDP
;
;%%%%%%%%%%%%%%%%%%%%%%%%%%%%%%%%%%%%%%%
;
TX_BUF_CNT PROC NEAR
    IF board
            mov     dx,wr_clr_byte_ptr      ; init flag to low byte
            out     dx,al
            jmp     $+2
            mov     dx,dma_5_address
            in      al,dx
            mov     cl,al
            jmp     $+2
            in      al,dx
            mov     ch,al
            jmp     $+2
; check for low byte roll over
            mov     dx,wr_clr_byte_ptr      ; init flag to low byte
            out     dx,al
            jmp     $+2
```

-continued

```
            mov     dx,dma_5_address
            in      al,dx
            cmp     al,cl
            je      no_roll
            mov     cl,al
            jmp     $+2
            in      al,dx
            mov     ch,al
            jmp     $+2
no_roll:
            mov     ax,tx_in_ptr          ; calculate the tx buffer address
            shr     ax,1                  ; word address
            add     ax,tx_dma_ala16
            sub     ax,cx
            jns     pos_diff
            add     ax,( buf_len / 2 )
pos_diff:
            cmp     ax,sample_count
            jl      do_buf
            clc
            ret
do_buf:
            stc
            ret
        ENDIF
TX_BUF_CNT  ENDP
;
;%%%%%%%%%%%%%%%%%%%%%%%%%%%%%%%%%%%%%%
;
.data
cosine_table  dw    32767,32757,32728,32678,32609,32521
              dw    32412,32285,32137,31971,31785
              dw    31580,31356,31113,30852,30571
              dw    30273,29956,29621,29268,28898
              dw    28510,28105,27683,27245,26790
              dw    26319,25832,25329,24811,24279
              dw    23731,23170,22594,22005,21403
              dw    20787,20159,19519,18868,18204
              dw    17530,16846,16151,15446,14732
              dw    14010,13279,12539,11793,11039
              dw    10278,9512,8739,7962,7179
              dw    6393,5602,4808,4011,3212
              dw    2410,1608,804,0,−803
              dw    −1607,−2410,−3211,−4010,−4807
              dw    −5601,−6392,−7179,−7961,−8739
              dw    −9511,−10278,−11038,−11792,−12539
              dw    −13278,−14009,−14732,−15446,−16150
              dw    −16845,−17530,−18204,−18867,−19519
              dw    −20159,−20787,−21402,−22005,−22594
              dw    −23169,−23731,−24278,−24811,−25329
              dw    −25832,−26319,−26790,−27245,−27683
              dw    −28105,−28510,−28898,−29268,−29621
              dw    −29956,−30273,−30571,−30852,−31113
              dw    −31356,−31580,−31785,−31971,−32137
              dw    −32285,−32412,−32521,−32609,−32678
              dw    −32728,−32757,−32767,−32757,−32728
              dw    −32678,−32609,−32521,−32412,−32285
              dw    −32137,−31971,−31785,−31580,−31356
              dw    −31113,−30852,−30571,−30273,−29956
              dw    −29621,−29268,−28898,−28510,−28105
              dw    −27683,−27245,−26790,−26319,−25832
              dw    −25329,−24811,−24278,−23731,−23169
              dw    −22594,−22005,−21402,−20787,−20159
              dw    −19519,−18867,−18204,−17530,−16845
              dw    −16150,−15446,−14732,−14009,−13278
              dw    −12539,−11792,−11038,−10278,−9511
              dw    −8739,−7961,−7179,−6392,−5601
              dw    −4807,−4010,−3211,−2410,−1607
              dw    −803,0,804,1608,2410
              dw    3212,4011,4808,5602,6393
              dw    7179,7962,8739,9512,10278
              dw    11039,11793,12539,13279,14010
              dw    14732,15446,16151,16846,17530
              dw    18204,18868,19519,20159,20787
              dw    21403,22005,22594,23170,23731
              dw    24279,24811,25329,25832,26319
              dw    26790,27245,27683,28105,28510
              dw    28898,29268,29621,29956,30273
              dw    30571,30852,31113,31356,31580
```

```
                dw      31785,31971,32137,32285,32412
                dw      32521,32609,32678,32728,32757
sine_table      dw      0,804,1608,2410,3212,4011
                dw      4808,5602,6393,7179,7962
                dw      8739,9512,10278,11039,11793
                dw      12539,13279,14010,14732,15446
                dw      16151,16846,17530,18204,18868
                dw      19519,20159,20787,21403,22005
                dw      22594,23170,23731,24279,24811
                dw      25329,25832,26319,26790,27245
                dw      27683,28105,28510,28898,29268
                dw      29621,29956,30273,30571,30852
                dw      31113,31356,31580,31785,31971
                dw      32137,32285,32412,32521,32609
                dw      32678,32728,32757,32767,32757
                dw      32728,32678,32609,32521,32412
                dw      32285,32137,31971,31785,31580
                dw      31356,31113,30852,30571,30273
                dw      29956,29621,29268,28898,28510
                dw      28105,27683,27245,26790,26319
                dw      25832,25329,24811,24279,23731
                dw      23170,22594,22005,21403,20787
                dw      20159,19519,18868,18204,17530
                dw      16846,16151,15446,14732,14010
                dw      13279,12539,11793,11039,10278
                dw      9512,8739,7962,7179,6393
                dw      5602,4808,4011,3212,2410
                dw      1608,804,0,-803,-1607
                dw      -2410,-3211,-4010,-4807,-5601
                dw      -6392,-7179,-7961,-8739,-9511
                dw      -10278,-11038,-11792,-12539,-13278
                dw      -14009,-14732,-15446,-16150,-16845
                dw      -17530,-18204,-18867,-19519,-20159
                dw      -20787,-21402,-22005,-22594,-23169
                dw      -23731,-24278,-24811,-25329,-25832
                dw      -26319,-26790,-27245,-27683,-28105
                dw      -28510,-28898,-29268,-29621,-29956
                dw      -30273,-30571,-30852,-31113,-31356
                dw      -31580,-31785,-31971,-32137,-32285
                dw      -32412,-32521,-32609,-32678,-32728
                dw      -32757,-32767,-32757,-32728,-32678
                dw      -32609,-32521,-32412,-32285,-32137
                dw      -31971,-31785,-31580,-31356,-31113
                dw      -30852,-30571,-30273,-29956,-29621
                dw      -29268,-28898,-28510,-28105,-27683
                dw      -27245,-26790,-26319,-25832,-25329
                dw      -24811,-24278,-23731,-23169,-22594
                dw      -22005,-21402,-20787,-20159,-19519
                dw      -18867,-18204,-17530,-16845,-16150
                dw      -15446,-14732,-14009,-13278,-12539
                dw      -11792,-11038,-10278,-9511,-8739
                dw      -7961,-7179,-6392,-5601,-4807
                dw      -4010,-3211,-2410,-1607,-803
;
;%%%%%%%%%%%%%%%%%%%%%%%%%%%%%%%%%%%%%%%%%
;
.code
DIAL PROC NEAR
.data
        dial_buffer db      41 dup(?)
        buffer_pointer     dw      ?
.code
        lea     si,dial_menu
        call    window_flip
; position the cursor
        mov     ah,02h
        xor     bh,bh
        mov     dh,8
        mov     dl,31
        int     10h
        mov     es,display_segment
        mov     di,((( 8 * 80 ) + 31 ) * 2 )
        xor     bx,bx
key_loop:
        mov     ah,0
        int     16h
        mov     cl,al           ; for printing
        cmp     al,cr
        je      dial_string_done
```

```
                cmp         al,bs
                jne         no_backspace
                cmp         bx,0
                je          key_loop
                mov         al,' '
                sub         di,2
                mov         es: [di],al
                dec         dl
                mov         ah,02h
                int         10h
                dec         bx
                jmp         short key_loop
no_backspace:
                cmp         al,'0'
                jb          not_digit
                cmp         al,'9'
                ja          not_digit
                sub         al,'0'
                jmp         short buffer_insert
not_digit:
                cmp         al,'#'
                jne         chk_star
                mov         al,0ah
                jmp         short buffer_insert
chk_star:
                cmp         al,'*'
                jne         chk_letter
                mov         al,0bh
                jmp         short buffer_insert
chk_letter:
                cmp         al,'A'
                jb          key_loop
                cmp         al,'D'
                ja          chk_lower
                sub         al,'A' - 0ch
                jmp         short buffer_insert
chk_lower:
                cmp         al,'a'
                jb          key_loop
                cmp         al,'d'
                ja          key_loop
                sub         al,'a' - 0ch
buffer_insert:
                cmp         bx,40
                je          key_loop
                mov         dial_buffer[bx],al
                inc         bx
                mov         al,cl
                stosb                           ; print the character to the screen
                inc         di
; move the cursor
                mov         ah,02h
                inc         dl
                int         10h
;               cmp         bx,40
;               jne         key_loop
;               dec         bx
;               dec         dl
;               int         10h
;               sub         di,2
                jmp         key_loop
dial_string_done:
                mov         dial_buffer[bx],0ffh
        IF board
                call        off_hook
                call        speaker_on
                mov         ax,2 *100       ; 2 sec.
                call        init_timer
off_hook_wait:
                test        recv_flags,b5
                jz          off_hook_wait
                mov         buffer_pointer,0
dial_loop:
                mov         bx, buffer_pointer
                mov         bl,dial_buffer[bx]
                inc         buffer_pointer
                cmp         bl,0ffh
                je          dial_done
                mov         ax,7            ; 70 ms
```

```
            call    dtmf
            jc      dial_done
            mov     ax,7            ; 70 ms
            call    init_timer
inter_digit_wait:
            test    recv_flags,b5
            jz      inter_digit_wait
            jmp     short dial_loop
dial_done:
        ENDIF
; clear out the input line.
            mov     es,display_segment
            mov     di,((( 8 * 80 ) + 30 ) * 2 )
            mov     al,' '
            mov     cx,41
clear_loop:
            stosb
            inc     di
            loop    clear_loop
            lea     si,dial_menu
            call    window_flip
; hide the cursor
            mov     ah,02h
            xor     bh,bh
            mov     dh,25
            mov     dl,0
            int     10h
            ret
DIAL    ENDP
        END
.model small
.286
;%%%%%%%%%%%%%%%%%%%%%%%%%%%%%%%%%%%%%%%
;
;       Callp Progress
;
;       This program does all the call progress finctions.
;       It uses a 7200 Hz. receive sample to detect answer tone,
;       busy, ringing, voice, and dial tone.
;       This file also contains all the filter routines.
;
;%%%%%%%%%%%%%%%%%%%%%%%%%%%%%%%%%%%%%%%
            include equates
            public  callp_main,touch_tone_detect
            public  aic_cmd1,aic_cmd2,init_callp,get_callp
            public  get_touch_tone
            extrn   init_aic:near,init_dma:near
            extrn   window_flip:near,nul_routine:near
            extrn   tone_int:near,get_tx_data:near
            extrn   tx1224:near,init_tx:near,setup_sample_cnt:near
            extrn   init_tx_dma:near,tx_dma_off:near
            extrn   rx_dma_on:near,rx_dma_off:near
            extrn   dtmf_int:near
            extrn   rx_sample_segment:word,rx_out:word
            extrn   init_aic_tx48_rx72:word,recv_flags:word
            extrn   recv_vector:word,rx_dma_ala16:word
            extrn   display_segment:word,freq:word,freq_sum:word
            extrn   rx_in:word,tx_in_ptr:word,tx_out_ptr:word
            extrn   recv_sample_count:word,timer_10ms:word
            extrn   sreg:word,tx_flags:word,tx_vector:word
            extrn   freq2:word,freq_sum2:word
            extrn   ttone_detect_win:byte
            extrn   callp_win:byte
            extrn   timer_tic:byte,timer_reload:byte
.data
;**************** DC NOTCH COEFF
            notch0_1scalar  dw      7979h
            notch0_1b1  dw  7333h
            ;**************** CALL PROGRESS COEFF
            callp_1scalar   dw      0db2h
            callp_1a1  dw  -578fh
            callp_1b1  dw  5db0h       ; 1/2
            callp_1b2  dw  -4dd8h
            callp_2scalar   dw      1333h
            callp_2a1  dw  4240h
            callp_2b1  dw  5b20h       ; 1/2
            callp_2b2  dw  -6e18h
            comment !
;**************** VOICE COEFF
```

-continued

```
            voice_1scalar      dw      4873h
            voice_1a1     dw   -6470h         ; 1/2
            voice_1b1     dw   63f8h
            voice_1b2     dw   -43bah
            voice_2scalar      dw      347bh
            voice_2a1     dw   -7464h         ; 1/2
            voice_2b1     dw   4ffch          ; 1/2
            voice_2b2     dw   -72b6h
            voice_3scalar      dw      49fch
            !
;**************** ANSWER TONE COEFF
            ans_tone_1scalar dw         251h
            ans_tone_1b1  dw   -6208h
            ans_tone_1b2  dw   -7c28h
            ans_tone_2scalar dw         10a4h
            ans_tone_2b1  dw   -59b0h
            ans_tone_2b2  dw   -7c28h
;**************** TOUCH TONE DETECT COEFF
            hz697_770_1scalar dw        1c29h
            hz697_770_1a1  dw  -6fc3h        ; 1/2
            hz697_770_1b1  dw  67bfh         ; 1/2
            hz697_770_1b2  dw  -7b23h
            hz697_770_2scalar dw        3852h
            hz697_770_2a1  dw  -5bceh        : 1/2
            hz697_770_2b1  dw  6184h         ; 1/2
            hz697_770_2b2  dw  -7b23h
            hz1209_1336_1scalar dw      199ah
            hz1209_1336_1a1  dw  -4db3h      ; 1/2
            hz1209_1336_1b1  dw  7df0h
            hz1209_1336_1b2  dw  -799ah
            hz1209_1336_2scalar dw      4148h
            hz1209_1336_2a1  dw  -43e0h
            hz1209_1336_2b1  dw  5f36h
            hz1209_1336_2b2  dw  -799ah
            sample        dw   ?
; call progress delay line variables
            notch0_10     dw   ?
            notch0_11     dw   ?
            notch0_21     dw   ?
            comment       !
            voice_11      dw   ?
            voice_12      dw   ?
            voice_21      dw   ?
            voice_22      dw   ?
            voice_31      dw   ?
            voice_32      dw   ?
            voice_41      dw   ?
            voice_42      dw   ?
            voice_51      dw   ?
            !
            callp_11      dw   ?
            callp_12      dw   ?
            callp_21      dw   ?
            callp_22      dw   ?
            callp_31      dw   ?
            callp_32      dw   ?
            callp_41      dw   ?
            callp_42      dw   ?
            ans_tone_11   dw   ?
            ans_tone_12   dw   ?
            ans_tone_21   dw   ?
            ans_tone_22   dw   ?
            ans_tone_31   dw   ?
            ans_tone_32   dw   ?
            ans_tone_41   dw   ?
            ans_tone_42   dw   ?
            no_filter_sum_high      dw   ?
            no_filter_sum_low dw    ?
;           voice_sum_high dw ?
;           voice_sum_low dw ?
            callp_sum_high dw ?
            callp_sum_low dw ?
            ans_tone_sum_high dw ?
            ans_tone_sum_low dw ?
            old_no_filt_high dw ?
            old_no_filt_low dw ?
;           old_voice_high dw ?
;           old_voice_low dw ?
            old_callp_high dw ?
```

-continued

```
            old_callp_low dw ?
            old_atone_high dw ?
            old_atone_low dw ?
            sample_count   dw      ?
            scount_reload  dw      ?
; Touch Tone detect variables
            hz697_770_11        dw  ?
            hz697_770_12        dw  ?
            hz697_770_21        dw  ?
            hz697_770_22        dw  ?
            hz697_770_31        dw  ?
            hz697_770_32        dw  ?
            hz697_770_41        dw  ?
            hz697_770_42        dw  ?
            hz1209_1336_11      dw  ?
            hz1209_1336_12      dw  ?
            hz1209_1336_21      dw  ?
            hz1209_1336_22      dw  ?
            hz1209_1336_31      dw  ?
            hz1209_1336_32      dw  ?
            hz1209_1336_41      dw  ?
            hz1209_1336_42      dw  ?
            fil697_sum_high     dw  ?
            fil697_sum_low      dw  ?
            old_fil697_high     dw  ?
            old_fil697_low      dw  ?
            fil1209_sum_high    dw  ?
            fil1209_sum_low     dw  ?
            old_fil1209_high    dw  ?
            old_fil1209_low     dw  ?
ascii_converter          db    '0','1','2','3','4','5','6','7','8','9'
                         db    'A','B','C','D','E','F'
            aic_cmd1     dw    ?
            aic_cmd2     dw    ?
.code
;
;%%%%%%%%%%%%%%%%%%%%%%%%%%%%%%%%%%%%%%%%%%%
;
CALLP_FILTERS    PROC NEAR
            call      chk_sample_count
            jnc       do_callp
            ret
end_atone_routine:
; answer tone mean square
            mov       ax,bx          ; output ^ 2
            imul      bx
            mov       bx,dx          ; DX:AX already divided by 2
            and       bx,0fh         ; shift right by 4 to get one 32nd
            rol       bx,4
            sar       dx,4
            shr       ax,4
            or        ah,bl
            add       ans_tone_sum_low,ax
            adc       ans_tone_sum_high,dx
            jmp       count_it
do_callp:
            mov       es,rx_sample_segment
            mov       si,rx_out      ; filter sample pointer
filter_loop:
            mov       ax,es:[si]     ; input sample
            add       si,2
            mov       sample,ax
            test      recv_flags,b8
            jnz       answer_tone_filter
; Remove any DC from the sample - - - - NOTCH 0
            mov       bx,notch0_11
            neg       bx             ; -1
            imul      notch0_1scalar
            sal       dx,1
            mov       notch0_11,dx
            add       bx,dx
            mov       ax,notch0_21
            imul      notch0_1b1
            sal       dx,1
            add       bx,dx
            mov       notch0_21,bx
            mov       sample,bx
; No filter averaging
            mov       ax,bx          ; output ^ 2
```

```
        imul      bx
        sal       ax,1          ; adjust for the multiply
        rcl       dx,1
        mov       al,ah         ; divide by 256
        mov       ah,dl
        mov       dl,dh
        xor       dh,dh         ; result is positive
        add       no_filter_sum_low,ax
        adc       no_filter_sum_high,dx
; Answer tone filter
answer_tone_filter:
        mov       bx,ans_tone_12
        mov       ax,ans_tone_11
        mov       ans_tone_12,ax
        sar       ax,2
        neg       ax
        add       ax,ans_tone_11    ; .75 * ans_tone_11
        sub       bx,ax
        mov       ax,sample
        imul      ans_tone_1scalar
        sal       dx,1
        mov       ans_tone_11,dx
        add       bx,dx
        mov       ax,ans_tone_22
        imul      ans_tone_1b2
        sal       dx,1
        add       bx,dx
        mov       ax,ans_tone_21
        mov       ans_tone_22,ax
        imul      ans_tone_1b1
        sal       dx,1
        add       bx,dx
        mov       ans_tone_21,bx    ; output of the first filter stage
        mov       ax,bx
        imul      ans_tone_2scalar
        sal       dx,1
        mov       bx,ans_tone_32
        mov       ax,ans_tone_31
        mov       ans_tone_32,ax
        sar       ax,2
        add       ax,ans_tone_31
        add       bx,ax
        mov       ans_tone_31,dx
        add       bx,dx
        mov       ax,ans_tone_42
        imul      ans_tone_2b2
        sal       dx,1
        add       bx,dx
        mov       ax,ans_tone_41
        mov       ans_tone_42,ax
        imul      ans_tone_2b1
        sal       dx,1
        add       bx,dx         ; second stage output BX = output
        mov       ans_tone_41,bx
        test      recv_flags,b8
        jz        do_mean_square
        jmp       end_atone_routine
do_mean_square:
; answer tone mean square
        mov       ax,bx         ; output ^ 2
        imul      bx
        sal       ax,1          ; adjust for the multiply
        rcl       dx,1
        mov       al,ah         ; divide by 256
        mov       ah,dl
        mov       dl,dh
        xor       dh,dh         ; result is positive
        add       ans_tone_sum_lov,ax
        adc       ans_tone_sum_high,dx
        comment   !
; Voice filter
        mov       bx,voice_12
        mov       ax,voice_11
        mov       voice_12,ax
        imul      voice_1a1
        sal       dx,2          ; * 2
        add       bx,dx
        mov       ax,sample
        imul      voice_1scalar
```

```
        sal     dx,1
        mov     voice_11,dx
        add     bx,dx
        mov     ax,voice_22
        imul    voice_1b2
        sal     dx,1
        add     bx,dx
        mov     ax,voice_21
        mov     voice_22,ax
        imul    voice_1b1
        sal     dx,1
        add     bx,dx           ; 1st stage output
        mov     voice_21,bx
        mov     ax,bx
        imul    voice_2scalar
        sal     dx,1
        mov     bx,voice_32
        mov     ax,voice_31
        mov     voice_32,ax
        mov     voice_31,dx
        add     bx,dx
        imul    voice_2a1
        sal     dx,2            ; * 2
        add     bx,dx
        mov     ax,voice_42
        imul    voice_2b2
        sal     dx,1
        add     bx,dx
        mov     ax,voice_41
        mov     voice_42,ax
        imul    voice_2b1
        sal     dx,2            ; * 2
        add     bx,dx           ; 2nd stage output
        mov     voice_41,bx
        mov     ax,bx
        imul    voice_3scalar
        sal     dx,2            ; * 2
        mov     ax,voice_51
        mov     voice_51,dx
        sub     dx,ax           ; dx = output
; voice mean square
        mov     ax,dx           ; output ^ 2
        imul    dx
        sal     ax,1            ; adjust for the multiply
        rcl     dx,1
        mov     al,ah           ; divide by 256
        mov     ah,dl
        mov     dl,dh
        xor     dh,dh           ; result is positive
        add     voice_sum_low,ax
        adc     voice_sum_high,dx
        !
; Call Progress filter
        mov     bx,callp_12
        mov     ax,callp_11
        mov     callp_12,ax
        imul    callp_1a1
        sal     dx,1
        add     bx,dx
        mov     ax,sample
        imul    callp_1scalar
        sal     dx,1
        mov     callp_11,dx
        add     bx,dx
        mov     ax,callp_22
        imul    callp_1b2
        sal     dx,1
        add     bx,dx
        mov     ax,callp_21
        mov     callp_22,ax
        imul    callp_1b1
        sal     dx,2
        add     bx,dx
        mov     callp_21,bx     ; 1st stage output
        mov     ax,bx
        imul    callp_2scalar
        sal     dx,1
        mov     bx,callp_32
        mov     ax,callp_31
```

```
            mov     callp_32,ax
            mov     callp_31,dx
            add     bx,dx
            imul    callp_2a1
            sal     dx,1
            add     bx,dx
            mov     ax,callp_42
            imul    callp_2b2
            sal     dx,1
            add     bx,dx
            mov     ax,callp_41
            mov     callp_42,ax
            imul    callp_2b1
            sal     dx,2
            add     bx,dx
            mov     callp_41,bx     ; BX = output
; call progress mean square
            mov     ax,bx           ; output ^ 2
            imul    bx
            sal     ax,1            ; adjust for the multiply
            rcl     dx,1
            mov     a1,ah           ; divide by 256
            mov     ah,d1
            mov     d1,dh
            xor     dh,dh           ; result is positive
            add     callp_sum_low,ax
            adc     callp_sum_high,dx
count_it:
            dec     sample_count
            jnz     check_samples
            or      recv_flags,b7
            mov     ax, scount_reload
            mov     sample_count, ax
            xor     dx,dx
            mov     ax,no_filter_sum_low
            mov     bx,no_filter_sum_high
            mov     old_no_filt_low,ax
            mov     old_no_filt_high,bx
            mov     no_filter_sum_low,dx
            mov     no_filter_sum_high,dx
            comment !
            mov     ax,voice_sum_low
            mov     bx,voice_sum_high
            mov     old_voice_low,ax
            mov     old_voice_high,bx
            mov     voice_sum_low,dx
            mov     voice_sum_high,dx
            !
            mov     ax,callp_sum_low
            mov     bx,callp_sum_high
            mov     old_callp_low,ax
            mov     old_callp_high,bx
            mov     callp_sum_low,dx
            mov     callp_sum_high,dx
            mov     ax,ans_tone_sum_low
            mov     bx,ans_tone_sum_high
            mov     old_atone_low,ax
            mov     old_atone_high,bx
            mov     ans_tone_sum_low,dx
            mov     ans_tone_sum_high,dx
check_samples:
            cmp     si,rx_samples_length
            jne     no_wrap
            xor     si,si
no_wrap:
            dec     cx
            jcxz    no_samples
            jmp     filter_loop
no_samples:
            mov     rx_out,si
            ret
CALLP_FILTERS   ENDP
;
;%%%%%%%%%%%%%%%%%%%%%%%%%%%%%%%%%%%%%%%%%%%%%%%
;
DTMF_FILTERS    PROC NEAR
            call    chk_sample_count
            jnc     do_ttone
            ret
```

-continued

```
do_ttone:
        mov     es,rx_sample_segment
        mov     si,rx_out           ; filter sample pointer
ttone_filter_loop:
        mov     ax,es:[si]          ; input sample
        add     si,2
        mov     sample,ax
; Remove any DC from the sample ---- NOTCH 0
        mov     bx1notch0_11
        neg     bx                  ; -1
        imul    notch0_1scalar
        sal     dx,1
        mov     notch0_11,dx
        add     bx,dx
        mov     ax,notch0_21
        imul    notch0_1b1
        sal     dx,1
        add     bx,dx
        mov     notch0_21,bx
        mov     sample,bx
; No filter averaging
        mov     ax,hx               ; output ^ 2
        imul    bx
        sal     ax,1                ; adjust for the multiply
        rcl     dx,1
        wov     a1,ah               ; divide by 256
        mov     ah,d1
        mov     d1,dh
        xor     dh,dh               ; result is positive
        add     no_filter_sum_low,ax
        add     no_filter_sum_high,dx
; 697–770 Hz filter
filter_697:
        mov     bx,hz697_770_12
        mov     ax,hz697_770_11
        mov     hz697_770_12,ax
        imul    hz697_770_1a1
        sal     dx,2                ; * 2
        add     bx,dx
        mov     ax,sample
        imul    hz697_770_1scalar
        sal     dx,1
        mov     hz697_770_11,dx
        add     bx,dx
        mov     ax,hz697_770_22
        imul    hz697_770_1b2
        sal     dx,1
        add     bx,dx
        mov     ax,hz697_770_21
        mov     hz697_770_22,ax
        imul    hz697_770_1bl
        sal     dx,2                : * 2
        add     bx,dx
        mov     hz697_770_21,bx     ; output of the first filter stage
        mov     ax,bx
        imul    hz697_770_2scalar
        sal     dx,1
        mov     bx,hz697_770_32
        mov     ax,hz697_770_31     ; shift the delay line
        mov     hz697_770_32,ax
        add     bx,dx
        mov     hz697_770_31,dx     ; store the input * scalar
        imul    hz697_770_2a1
        sal     dx,2                ; * 2
        add     bx,dx
        mov     ax,hz697_770_42
        imul    hz697_770_2b2
        sal     dx,1
        add     bx,dx
        mov     ax,hz697_770_41
        mov     hz697_770_42,ax
        imul    hz697_770_2b1
        sal     dx,2    ; * 2
        add     bx,dx
        mov     hz697_770_41,bx     ; second stage output BX = output
; fil 697–770 mean square
        mov     ax,bx               ; output ^ 2
        imul    bx
        sal     ax,1    ; adjust for the multiply
```

-continued

```
        rcl     dx,1
        mov     al,ah       ; divide by 256
        mov     ah,dl
        mov     dl,dh
        xor     dh,dh       ; result is positive
        add     fil697_sum_low,ax
        adc     fil697_sum_high,dx
; 1209–1336 Hz filter
filter_1209:
        mov     bx,hz1209_1336_12
        mov     ax,hz1209_1336_11
        mov     hz1209_1336_12,ax
        imul    hz12O9_1336_1a1
        sal     dx,2        ; * 2
        add     bx,dx
        mov     ax,sample
        imul    hz1209_1336_1scalar
        sal     dx,1
        mov     hz1209_1336_11,dx
        add     bx,dx
        mov     ax,hz1209_1336_22
        imul    hz1209_1336_1b2
        sal     dx,1
        add     bx,dx
        mov     ax,hz1209_1336_21
        mov     hz1209_1336_22,ax
        imul    hz1209_1336_1b1
        sal     dx,1
        add     bx,dx
        mov     hz1209_1336_21,bx  ; output of the first filter stage
        mov     ax,bx
        imul    hz1209_1336 2scalar
        sal     dx,1
        mov     bx,hz1209_1336_32
        mov     ax,hz1209_1336_31  ; shift the delay line
        mov     hz1209_1336_32,ax
        mov     hz1209_1336_31,dx  ; store the input * scalar
        add     bx,dx
        imul    hz1209_1336_2a1
        sal     dx,1
        add     bx,dx
        mov     ax,hz1209_1336_42
        imul    hz1209_1336_2b2
        sal     dx,1
        add     bx,dx
        mov     ax,hz1209_1336_41
        mov     hz1209_1336_42,ax
        imul    hz1209_1336_2b1
        sal     dx,1
        add     bx,dx              ; second stage output BX = output
        mov     hz1209_1336_41,bx
; fil 1209–1336 mean square
        mov     ax,bx       ; output ^ 2
        imul    bx
        sal     ax,1        ; adjust for the multiply
        rcl     dx,1
        mov     al,ah       ; divide by 256
        mov     ah,dl
        mov     dl,dh
        xor     dh,dh       ; result is positive
        add     fil1209_sum_low,ax
        adc     fil1209_sum_high,dx
count_sample:
        dec     sample_count
        jnz     check_sample_buf
        or      recv_flags,b7
        mov     ax,scount_reload
        mov     sample_count,ax
        xor     dx,dx
        mov     ax,no_filter_sum_low
        mov     bx1 no_filter_sum_high
        mov     old_no_filt_low,ax
        mov     old_no_filt_high,bx
        mov     no_filter_sum_low,dx
        mov     no_filter_sum_high,dx
        mov     ax,fil697_sum_low
        mov     bx,fil697_sum_high
        mov     old_fil697_low,ax
        mov     old_fil697_high,bx
```

```
                mov     fil697_sum_low,dx
                mov     fil697_sum_high,dx
                mov     ax,fil1209_sum_low
                mov     bx,fil1209_sum_high
                mov     old_fil1209_low,ax
                mov     oid_fil1209_high,bx
                mov     fil1209_sum_low,dx
                mov     fil1209_sum_high,dx
check_sample_buf:
                cmp     si,rx_samples_length
                jne     no_end
                xor     si,si
no_end:
                dec     cx
                jcxz    no_more_samples
                jmp     ttone_filter_loop
no_more_samples:
                mov     rx_out,si
                ret
DTMF_FILTERS    ENDP
;
;%%%%%%%%%%%%%%%%%%%%%%%%%%%%%%%%%%%%%%%%%%%%%
;
CALIP_INIT      PROC NEAR
    IF board
                lea     si,init_aic_tx48_rx72   ; tx 4800 rx 7200
                call    init_aic
                call    init_dma
    ELSE
                xor     ax,ax
                mov     tx_in_ptr,ax
                mov     tx_out_ptr,ax
                mov     rx_in,ax
    ENDIF
                mov     rx_out 0
                mov     sample_count,256
                mov     scount_reload,256
                ret
CALLP_INIT      ENDP
;
;%%%%%%%%%%%%%%%%%%%%%%%%%%%%%%%%%%%%%%%%%%%%%
;
CALLP_MAIN      PROC NEAR
.data
        atone_cnt       dw      ?
.code
                call    callp_init
                lea     si,callp_win
                call    window_flip
    IF board
                mov     ax,sreg+9
                mov     atone_cnt,ax
                mov     ax,sreg+7
                mov     bx,50
                mul     bx
                cli
                mov     timer_10ms,ax
                mov     timer_tic,9
                mov     timer_reload,9
                and     recv__ags,NOT( b5 OR b7 OR b8 )
                mov     recv_vector,offset callp_filters
                sti
; enable DMA channel 2      RECV DMA
                call    rx_dma_on
    ELSE
                mov     recv_sample_count,16
                mov     freq,20252      ; 2225 Hz at a 7200 Hz sample rate
                mov     freq,3231       ; 1210
                mov     fre_sum,0
    ENDIF
callp_loop:
    IFE board
                mov     cx,20000
here:
                loop    here
                call    tone_int
                call    get_tx_data
                call    callp_filters
    ELSE
```

```
                test    recv_flags,b5
                jnz     callp_exit
        ENDIF
                test    recv_flags,b7
                jz      callp_loop
                and     recv_flags,NOT b7
        IF board
; check the thresholds
                cmp     old_atone_high,0
                jne     got_atone
                cmp     old_atone_low,4000h
                jb      no_atone
got_atone:
; is ans_tone > no_filt/4 ?
                mov     ax,old_no_filt_high
                mov     bx,old_no_filt_low
                sar     ax,1
                rcr     bx,1
                sar     ax,1
                rcr     bx,1
                cmp     old_atone_high,ax
                jl      *no_atone
                jg      got it
                cmp     old_atone_low,bx        ; high parts are equal
                jb      no_atone
got_it:
                dec     atone_cnt
                jz      get_end_atone
                jmp     short display_levels
no_atone:
                mov     ax,sreg+9
                mov     atone_cnt,ax
display_levels:
        ENDIF
                call    print_callp
                mov     ah,1
                int     16h
                jz      callp_loop
                mov     ah,0
                int     16h
callp_exit:
                lea     si,callp_win
                call    window_flip
call_exit:
        IF board
; disable DMA channel 2 REGV DMA
                call    rx_dma_off
                mov     recv_vector,offset nul_routine
        ENDIF
                stc
                ret
        IF board
get_end_atone:
; look for 4.44 ms samples
                cli
                mov     sample_count,32
                mov     scount_reload,32
                mov     ans_tone_sum_low,0
                mov     ans_tone_sum_high,0
                or      recv_flags,b8           ; end of answer tone
                sti
                mov     atone_cnt,17            ; this is the success flag
                mov     ax,old_atone_low
                mov     bx,old_atone_high
                sar     bx,1
                rcr     ax,1
                sar     bx,1
                rcr     ax,1                    ; BX,AX holds end answer tone threshold
                push    ax
                push    bx
                lea     si,callp_win
                call    window_flip
                call    init_tx_dma
                and     tx_flags,0fffeh         ; tx low
                call    init_tx
                mov     tx_vector,offset tx1224 ; start the transmitter
                pop     bx
                pop     ax
end_atone_loop:
```

-continued

```
              test      recv_flags,b5
              jnz       callp_exit
              test      recv_flags,b7
              jz        end_atone_loop
              and       recv_flags,NOT b7
              mov       dx,old_atone_high
              mov       cx,old_atone_low
              sub       cx,ax
              sbb       dx,bx
              js        got_end
              push      ax
              mov       ah,1
              int       16h
              pop       ax
              jz        end_atone_loop
              mov       ah,0
              int       16h
              mov       tx_vector,offset nul_routine
              call      tx_dma_off
              jmp       call_exit
got_end:
; disable DMA channel 2 RECV DMA
              call      rx_dma_off
              mov       recv_vector,offset nul_routine
              mov       aic_cmd1,383ch
              mov       aic_cmd2,3c72h
              or        tx_flags,b8
wait1:
              test      tx_flags,b8
              jnz       wait1
wait2:
              test      tx_flags,b9
              jnz       wait2
              clc
              ret
      ENDIF
CALLP_MAIN    ENDP
;
;%%%%%%%%%%%%%%%%%%%%%%%%%%%%%%%%%%%%%%%%%%%%%%%%%%
;
PRINT_WORD    PROC NEAR
; upon entry DI = screen offset, CL = attribute, and DX = word to print
              mov       b1,dh
              ror       b1,4
              and       b1,0fh
              xor       bh,bh
              mov       a1,byte ptr ascii_converter[bx]
              stosw
              mov       bl,dh
              and       bl1Ofh
              mov       al,byte ptr ascii_converter(bx
              stosw
              mov       b1,d1
              ror       b1,4
              and       b1,0fh
              mov       a1,byte ptr_ascii_converter[bx]
              stosw
              mov       b1,d1
              and       b1,0fh
              mov       a1,byte ptr ascii_converter[bx]
              stosw
              ret
PRINT_WORD    ENDP
;
;%%%%%%%%%%%%%%%%%%%%%%%%%%%%%%%%%%%%%%%%%%%%%%%%%%
;
PRINT_CALLP   PROC NEAR
; print the result in the callp progress window
              mov       di,((( 9 * 80 ) + 47 ) * 2 )   ; screen offset
              xor       bx,bx
              mov       es,display_segment
              mov       ah,31h                          ; attribute
              mov       dx,old_no_filt_high
              call      print_word
              mov       dx,old_no_filt_low
              call      print_word
              mov       di,((( 10 * 80 ) + 47 ) * 2 )
              mov       dx,old_callp_high
              call      print_word
```

```
            mov     dx,old_callp_low
            call    print_word
            comment !
            mov     di,((( 9 * 80 ) + 44 ) * 2 )
            mov     dx,old_voice_high
            call    print_word
            mov     dx,old_voice_low
            call    print_word
            mov     di,((( 11 * 80 ) + 47 ) * 2 )
            wov     dx,old_atone_high
            call    print_word
            !
            mov     dx,old_atone_low
            call    print_word
            ret
PRINT_CALIP     ENDP
;
;%%%%%%%%%%%%%%%%%%%%%%%%%%%%%%%%%%%%%%%%%%%%
;
TOUCH_TONE_DETECT   PROC NEAR
            lea     si,ttone_detect_win
            call    window_flip
            call    setup_dtmf_detect
; main loop
ttone_detect_loop:
    IFE board
            mov     cx,40000
here2:
            loop    here2
            call    dtmf_int
            call    get_tx_data
            call    dtmf_filters
    ENDIF
            test    recv_flags,b7
            jz      ttone_detect_loop
            and     recv_flags,NOT b7
            call    print_dtmf
            mov     ah,1
            int     16h
            jz      ttone_detect_loop
            mov     ah,0
            int     16h
            lea     si,ttone_detecr_win
            call    window_flip
    IF board
; disable DMA channel 2 RECV DMA
            call    rx_dma_off
            mov     recv_vector,offset nul_routine
    ENDIF
            stc
            ret
TOUCH_TONE_DETECT   ENDP
;
;%%%%%%%%%%%%%%%%%%%%%%%%%%%%%%%%%%%%%%%%%%%%
;
PRINT_DTMF      PROC NEAR
; print the result in the callp progress window
            mov     di,((( 10 * 80 ) + 47 ) * 2 )  ; screen offset
            xor     bx,bx
            mov     es,display_segment
            mov     ah,31h                          ; attribute
            mov     dx,old_no_filt_high
            call    print_word
            mov     dx,old_no_filt_low
            call    print_word
            mov     di,((( 11 * 80 ) + 47 ) * 2 )  ; screen offset
            xor     bx,bx
            mov     es,display_segment
            mov     ah,31h                          ; attribute
            niov    dx, old_fil697_high
            call    print_word
            mov     dx,old_fil697_low
            call    print_word
            mov     di,((( 12 * 80 ) + 47 ) * 2 )  ; screen offset
            xor     bx,bx
            mov     es,display_segment
            mov     ah,31h                          ; attribute
            mov     dx,old_fil1209_high
            call    print_word
```

```
            mov      dx,old_fil1209_low
            call     print_word
            ret
PRINT_DTMF         ENDP
;
;%%%%%%%%%%%%%%%%%%%%%%%%%%%%%%%%%%%%%%%%%%%
;
CHK_SAMPLE_COUNT  PROC NEAR
       IF board
            mov      dx,wr_clr_byte_ptr        ; init flag to low byte
            out      dx,a1
            jmp      $+2
; how many words are there in the receive buffer?
            mov      dx,dma_6_address          ; get RX in
            in       a1,dx
            mov      c1,a1
            jmp      $+2
            in       a1,dx
            uov      ch,a1
            jmp      $+2
            mov      dx,wr_clr_byte_ptr        ; init flag to low byte
            out      dx,a1
            jmp      $+2
            mov      dx,dma_6_address
            in       a1,dx
            cmp      c1,a1
            je       read_ok
            mov      c1,a1
            in       a1,dx
            mov      ch,a1
read_ok:
            mov      ax,rx_out
            shr      ax,1
            add      ax,rx_dma_a1a16
            sub      cx,ax
            jns      pos_diff
            add      cx,(rx_samples_length/2)
pos_diff:
            jnz      do_funct
            stc
            ret
       ELSE
            mov      cx,rx_in
            sub      cx,rx_out
            jns      no_rollover
            add      cx,rx_samples_length
no rollover:
            shr      cx,1                      ; word count
            jnz      do_funct
            stc
            ret
       ENDIF
do_funct:
            clc
            ret
CHK_SAMPLE COUNT   ENDP
;
;%%%%%%%%%%%%%%%%%%%%%%%%%%%%%%%%%%%%%%%%%%%
;
INIT_CALLP         PROC NEAR
            call     callp_init
            cli
            and      recv_flags,NOT( b5 OR b7 OR b8 )
            mov      recv_vector,offset callp_filters
            sti
; enable DMA channel 2     RECV DMA
            call     rx_dma_on
            ret
INIT_CALLP         ENDP
;
;%%%%%%%%%%%%%%%%%%%%%%%%%%%%%%%%%%%%%%%%%%%
;
GET_CALLP          PROC NEAR
answer_loop:
            test     recv_flags,b7
            jz       answer_loop
            and      recv_flags,NOT b7
            call     print_callp
            xor      a1,a1
```

```
                mov     bx,old_callp_high
                cmp     bx,0h
                je      no_callp
                or      a1,1
no_callp:
                ret
GET_CALLP       ENDP
;
;%%%%%%%%%%%%%%%%%%%%%%%%%%%%%%%%%%%%%%%%%%%%%%
;
SETUP_DTMF_DETECT  PROC NEAR
                call    callp_init
                mov     recv_sample_count,16
        IFE board
                mov     freq,1697_72s
;               mov     freq,0
                mov     freq2,h1336_72s
;               mov     freq2,0
;               mov     freq,tone_2225_72s
;               mov     freq2,tone_2225_72s-200
                mov     fre_sum,0
                mov     fre_sum2,0
        ELSE
                cli
                and     recv_flags,NOT( b5 OR b7 OR b8 )
                mov     recv_vector,offset dtmf_filters
                sti
; enable DMA channel 2          RECV DMA
                call    rx_dma_on
        ENDIF
                ret
SETUP_DTMF_DETECT  ENDP
;
;%%%%%%%%%%%%%%%%%%%%%%%%%%%%%%%%%%%%%%%%%%%%%%
;
GET TOUCH_TONE  PROC NEAR
                call    setup_dtmf_detect
; main loop
detect_loop:
                mov     ah,1
                int     16h
                jnz     abort_out
                test    recv_flags,b7
                jz      detect_loop
                and     recv_flags,NOT b7
; check the thresholds
                cmp     old_fil697_high,100h
                jl      detect_loop
got_ttone:
; is ans_tone > no_filt/4 ?
                mov     ax,old_no_filt_high
                mov     bx,old_no_filt_low
                sar     ax,1
                rcr     bx,1
                sar     ax,1
                rcr     bx,1
                cmp     old_fil697_high,ax
                jl      detect_loop
got_697:
                cmp     old_fil1209_high,ax
                jl      detect loop
end_loop:
                mov     ah,1
                int     16h
                jnz     abort_out
                test    recv_flags,b7
                jz      end_loop
                and     recv_flags,NOT b7
; check the thresholds
                cmp     old_fil697_high,100h
                jg      end_loop
                jmp     short ok_end
abort_out:
                mov     ah,0
                int     16h
ok_end:
        IF board
; disable DMA channel 2 RECV DMA
                call    rx_dma_off
```

-continued

```
            mov     recv_vector,offset nul_routine
        ENDIF
            stc
            ret
GET_TOUCH_TONE      ENDP
            END
.286
.model      small
;
;%%%%%%%%%%%%%%%%%%%%%%%%%%%%%%%%%%%%%%%%%%%%%
;
;       WIN is the pop-up window manager
;       WIN uses window_init to decompress the windows into RAM.
;       Window_flip and window_up actually print the desired window to the
;       screen.
;
;%%%%%%%%%%%%%%%%%%%%%%%%%%%%%%%%%%%%%%%%%%%%%
;
            include equates
            public      init_screen
            public      window_flip
            public      main_menu,start message,end_message
            public      dial_menu,online_msg,vindow_up
            public      outgoing_msg,recording_msg,callp_win
            public      ttone_detect_win
            extrn display_segment:word
            extrn attribute:byte
window      macro corner_x,corner_,x,y
            db          corner_x,corner_y,x,y
            dw          x*y dup (?)
            endm
; definitions for the compress window macros
.data
            corner      dw  ?
            include     sft_wins.inc
.code
;
;%%%%%%%%%%%%%%%%%%%%%%%%%%%%%%%%%%%%%%%%%%%%%
;
INIT_SCREEN     PROC NEAR
            mov     al,'X'
            mov     ah,attribute
            call    fill_screen
            lea     si,top_menu
            call    window_up
            lea     si,bottom_menu
            call    window_up
            ret
INIT_SCREEN     ENDP
;
;%%%%%%%%%%%%%%%%%%%%%%%%%%%%%%%%%%%%%%%%%%%%%
;
FILL_SCREEN     PROC NEAR
            mov     cx,2000
            mov     es,display_segment
            xor     di,di
            rep     stosw
            ret
FILL_SCREEN     ENDP
;
;%%%%%%%%%%%%%%%%%%%%%%%%%%%%%%%%%%%%%%%%%%%%%
;
WINDOW_FLIP     PROC NEAR
            mov     bx,si
; calculate the offset into the display
            xor     ax,ax
            mov     al,[bx]         ;( row + column) * 2
            mov     cl,80
            imul    cl
            mov     cl,[bx+1]
            xor     ch,ch
            add     ax,cx
            shl     ax,1
            mov     di,ax
            mov     corner,ax
            mov     ax,display_segment
            mov     es,ax
            xor     cx,cx
            mov     cl,[bx][2]      ; window rows
```

```
            add     si,4            ; point to the window
new_row:
            push    cx
            mov     cl,[bx][3]      ; columns
mov_loop:
            lodsw
            xchg    ax,es:[di]
            mov     ds:[si][-2],ax
            add     di,2
            loop    mov_loop
            mov     ax,corner
            add     ax,160          ; add a line
            mov     di,ax
            mov     corner,ax
            pop     cx
            loop    new_row
            ret
WINDOW_FLIP ENDP
;
;%%%%%%%%%%%%%%%%%%%%%%%%%%%%%%%%%%%%%%%%%%%%%%%%%%
;
WINDOW_UP   PROC NEAR
            mov     bx,si
; calculate the offset into the display
            xor     ax,ax
            mov     al,[bx]         ;( row + column) * 2
            wov     cl,80
            imul    cl
            mov     cl,[bx+1]
            xor     ch,ch
            add     ax,cx
            shl     ax,1
            mov     di,ax
            mov     corner,ax
            mov     ax,display_segment
            mov     es,ax
            xor     cx,cx
            mov     cl,[bx][2]      ; window rows
            add     si,4            ; point to the window
new_row2:
            push    cx
            mov     cl,[bx][3]      ; columns
;mov_loop:
;           lodsw
;           xchg    ax,es:[di]
;           mov     ds:[si][-2],ax
;           add     di,2
;           loop    mov_loop
            rep     movsw
            mov     ax,corner
            add     ax,160          ; add a line
            mov     di,ax
            mov     corner,ax
            pop     cx
            loop    new_row2
            ret
WINDOW_UP   ENDP
            END
.data
outfile     db      'sft_wins.inc',0
windows     label byte
; window macro format is:
;       input_str --- label of compressed window
;       name --- name that the application uses for the window
;       corner_x,y -- upper left corner
;       x,y --- rows and columns of the window
top_menu    label byte
            window  top_menu_str,'top_menu',0,0,1,80
                                    ; format is w,x,y,z
                                    ; w,x = row,column of the
                                    ; upper left corner
                                    ; y,z = row,column of window
bottom_menu label byte
            window  bottom_menu_str,'bottom_menu',24,0,1,80
main_menu label byte
            window  main_menu_str,'main_menu',7,21,11,38
start_message label byte
            window  start_message_str,'start_message',3,23,3,35
end_message label byte
```

-continued

```
            window  end_message_str,'end_message',3,23,3,34
dial_menu label byte
            window  dial_menu_str,'dial_menu',7,7,3,66
online_msg label byte
            window  online_msg_str,'online_msg',0,0,1,80
outgoing_msg label byte
            window  outgoing_msg_str,'outgoing_msg',7,25,3,27
recording_msg label byte
            window  recording_msg_str,'recording_msg',7,25,3,30
callp_win label byte
            window  callp_win_str,'callp_win',8,24,5,33
ttone_detect_win label byte
            window  ttone_detect_str,'ttone_detect_win',9,24,5,33
                dw   0ffffh
                bottom_menu_str    db   attrib,05bh
                        db   ' USRobotics Softmodem (c)1989       Pate'
                        db   'nt Pending            By: Robert C. Suffern '
                        db   0ffh
top_menu_str            db   attrib,05bh
                        db   '| OffLine | 8bits |    No Parity    |1 '
                        db   'Stop Bit | Auto Answer Mode --- Voice |'
                        db   0ffh
online_msg_str          db   attrib,05bh
                        db   '| On Line | 8 bits |    No Parity   |1 '
                        db   'Stop Bit | 1200 Baud Originate Mode     |'
                        db   0ffh
main_menu_str           db   attrib,01bh
                        db   '┌','copy,36,'┐'
                        db   '|     F1 --- Data Mode' ,copy,17, ' ||'
                        db   '|     F2 --- Record a Message         ||'
                        db   '|     F3 --- Play Back a Message      ||'
                        db   '|     F4 --- Send a Tone' ,copy,15, ' ||'
                        db   '|     F5 --- Dial a Number            ||'
                        db   '|     F6 --- Execute Call Progress    ||'
                        db   '|     F7 --- Execute Touch-Tone Detect||'
                        db   '|     F8 --- Execute Message List     ||'
                        db   '|     F10 -- Exit' ,copy,22, ' ||'
                        db   '└',copy,36,'┘'
                        db   0ffh start_message_str       db   attrib,01bh
                        db   '┌',copy,33,'┐'
                        db   '|   Hit a Key to Begin Recording ||'
                        db   '└',copy,33,'┘'
                        db   0ffh end_message_str         db   attrib,01bh
                        db   '┌',copy,32,'┐'
                        db   '|   Hit a Key to Stop Recording ||'
                        db   '└',copy,32,'┘'
                        db   0ffh dial_menu_str           db   attrib,01bh
                        db   '┌',copy,64,'┐'
                        db   '|   Enter Phone Number:' ,copy,42, ' ||'
                        db   '└',copy,64,'┘'
                        db   0ffh outgoin_msg_str         db   attrib,01bh
                        db   '┌',copy,25,'┐'
                        db   '|   Sending Your Message ||'
                        db   '└',copy,25,'┘'
                        db   0ffh recording_msg_str       db   attrib,01bh
                        db   '┌',copy,28,'┐'
                        db   '|   Recording Your Message ||'
                        db   '└',copy,28,'┘'
                        db   0ffh callp_win_str           db   attrib,01bh
```

-continued

```
            db      '┌',copy,31,'┐'
            db      '│  No Filter Level:        ║'
            db      '│  Call Progress Level:    ║'
            db      '│  Answer Tone Level:      ║'
            db      '└',copy,31,'┘'
            db      0ffh ttone_detect_str    db      attrib,01bh
            db      '┌',copy,31,'┐'
            db      '│  No Filter:              ║'
            db      '│  697-770 Hz Filter:      ║'
            db      '│  1209-1336 Hz Filter:    ║'
            db      '└',copy,31,'┘'
            db      0ffh ; Window output file
.data
top_menu    db      00h,00h,01h,50h
            db      0b3h,5bh,20h,5bh,4fh,5bh,66h,5bh,66h,5bh
            db      20h,5bh,4ch,5bh,69h,5bh,6eh,5bh,65h,5bh
            db      20h,5bh,0b3h,5bh,20h,5bh,38h,5bh,20h,5bh
            db      62h,5bh,69h,5bh,74h,5bh,73h,5bh,20h,5bh
            db      0b3h,5bh,20h,5bh,20h,5bh,20h,5bh,20h,5bh
            db      4eh,5bh,6fh,5bh,20h,5bh,50h,5bh,61h,5bh
            db      72h,5bh,69h,5bh,74h,5bh,79h,5bh,20h,5bh
            db      20h,5bh,20h,5bh,0b3h,5bh,20h,5bh,31h,5bh
            db      20h,5bh,53h,5bh,74h,5bh,6fh,5bh,70h,5bh
            db      20h,5bh,42h,5bh,69h,5bh,74h,5bh,20h,5bh
            db      0b3h,5bh,20h,5bh,41h,5bh,75h,5bh,74h,5bh
            db      6fh,5bh,20h,5bh,41h,5bh,6eh,5bh,73h,5bh
            db      77h,5bh,65h,5bh,72h,5bh,20h,5bh,4dh,5bh
            db      6fh,5bh,64h,5bh,65h,5bh,20h,5bh,2dh,5bh
            db      2dh,5bh,2dh,5bh,20h,5bh,56h,5bh,6fh,5bh
            db      69h,5bh,63h,5bh,65h,5bh,20h,5bh,0b3h,5bh
bottom_menu db      18h,00h,01h,50h
            db      20h,5bh,55h,5bh,53h,5bh,52h,5bh,6fh,5bh
            db      62h,5bh,6fh,5bh,74h,5bh,69h,5bh,63h,5bh
            db      73h,5bh,20h,5bh,53h,5bh,6fh,5bh,66h,5bh
            db      74h,5bh,6dh,5bh,6fh,5bh,64h,5bh,65h,5bh
            db      6dh,5bh,20h,5bh,28h,5bh,63h,5bh,29h,5bh
            db      31h,5bh,39h,5bh,38h,5bh,39h,5bh,20h,5bh
            db      20h,5bh,20h,5bh,20h,5bh,20h,5bh,20h,5bh
            db      20h,5bh,50h,5bh,61h,5bh,74h,5bh,65h,5bh
            db      6eh,5bh,74h,5bh,20h,5bh,50h,5bh,65h,5bh
            db      6eh,5bh,64h,5bh,69h,5bh,6eh,5bh,67h,5bh
            db      20h,5bh,20h,5bh,20h,5bh,20h,5bh,20h,5bh
            db      20h,5bh,20h,5bh,20h,5bh,42h,5bh,79h,5bh
            db      3ah,5bh,20h,5bh,52h,5bh,6fh,5bh,62h,5bh
            db      65h,5bh,72h,5bh,74h,5bh,20h,5bh,43h,5bh
            db      2eh,5bh,20h,5bh,53h,5bh,75h,5bh,66h,5bh
            db      66h,5bh,65h,5bh,72h,5bh,6eh,5bh,20h,5bh
main_menu   db      07h,15h,0bh,26h
            db      0c9h,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0bbh,1bh,0bah,1bh,20h,1bh
            db      20h,1bh,20h,1bh,46h,1bh,31h,1bh,20h,1bh
            db      2dh,1bh,2dh,1bh,2dh,1bh,20h,1bh,44h,1bh
            db      61h,1bh,74h,1bh,61h,1bh,20h,1bh,4dh,1bh
            db      6fh,1bh,64h,1bh,65h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      20h,1bh,20h,1bh,20h,1bh,20h,1bh,20h,1bh
            db      0bah,1bh,0bah,1bh,20h,1bh,20h,1bh,20h,1bh
            db      46h,1bh,32h,1bh,20h,1bh,2dh,1bh,2dh,1bh
            db      2dh,1bh,20h,1bh,52h,1bh,65h,1bh,63h,1bh
            db      6fh,1bh,72h,1bh,64h,1bh,20h,1bh,61h,1bh
            db      20h,1bh,4dh,1bh,65h,1bh,73h,1bh,73h,1bh
            db      61h,1bh,67h,1bh,65h,1bh,20h,1bh,20h,1bh
            db      20h,1bh,20h,1bh,20h,1bh,20h,1bh,20h,1bh
            db      20h,1bh,20h,1bh,20h,1bh,0bah,1bh,0bah,1bh
            db      20h,1bh,20h,1bh,20h,1bh,46h,1bh,33h,1bh
            db      20h,1bh,2dh,1bh,2dh,1bh,2dh,1bh,20h,1bh
```

|  |  |  |
|---|---|---|
|  | db | 50h,1bh,6ch,1bh,61h,1bh,79h,1bh,20h,1bh |
|  | db | 42h,1bh,61h,1bh,63h,1bh,6bh,1bh,20h,1bh |
|  | db | 61h,1bh,20h,1bh,4dh,1bh,65h,1bh,73h,1bh |
|  | db | 73h,1bh,61h,1bh,67h,1bh,65h,1bh,20h,1bh |
|  | db | 20h,1bh,20h,1bh,20h,1bh,20h,1bh,20h,1bh |
|  | db | 20h,1bh,0bah,1bh,0bah,1bh,20h,1bh,20h,1bh |
|  | db | 20h,1bh,46h,1bh,34h,1bh,20h,1bh,2dh,1bh |
|  | db | 2dh,1bh,2dh,1bh,20h,1bh,53h,1bh,65h,1bh |
|  | db | 6eh,1bh,64h,1bh,20h,1bh,61h,1bh,20h,1bh |
|  | db | 54h,1bh,6fh,1bh,6eh,1bh,65h,1bh,20h,1bh |
|  | db | 20h,1bh,20h,1bh,20h,1bh,20h,1bh,20h,1bh |
|  | db | 20h,1bh,20h,1bh,20h,1bh,20h,1bh,20h,1bh |
|  | db | 31h,5bh,39h,5bh,38h,5bh,39h,5bh,20h,5bh |
|  | db | 20h,5bh,20h,5bh,20h,5bh,20h,5bh,20h,5bh |
|  | db | 20h,5bh,50h,5bh,61h,5bh,74h,5bh,65h,5bh |
|  | db | 6eh,5bh,74h,5bh,20h,5bh,50h,5bh,65h,5bh |
|  | db | 6eh,5bh,64h,5bh,69h,5bh,6eh,5bh,67h,5bh |
|  | db | 20h,5bh,20h,5bh,20h,5bh,20h,5bh,20h,5bh |
|  | db | 20h,5bh,20h,5bh,20h,5bh,42h,5bh,79h,5bh |
|  | db | 3ah,5bh,20h,5bh,52h,5bh,6fh,5bh,62h,5bh |
|  | db | 65h,5bh,72h,5bh,74h,5bh,20h,5bh,43h,5bh |
|  | db | 2eh,5bh,20h,5bh,53h,5bh,75h,5bh,66h,5bh |
|  | db | 66h,5bh,65h,5bh,72h,5bh,6eh,5bh,20h,5bh |
| main_menu | db | 07h,15h,0bh,26h |
|  | db | 0c9h,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0cdh,1bh,0cdh,1bh,0cdh,1bh |
|  | db | 0cdh,1bh,0cdh,1bh,0bbh,1bh,0bah,1bh,20h,1bh |
|  | db | 20h,1bh,20h,1bh,46h,1bh,31h,1bh,20h,1bh |
|  | db | 2dh,1bh,2dh,1bh,2dh,1bh,20h,1bh,44h,1bh |
|  | db | 6lh,1bh,74h,1bh,61h,1bh,20h,1bh,4dh,1bh |
|  | db | 6fh,1bh,64h,1bh,65h,1bh,20h,1bh,20h,1bh |
|  | db | 20h,1bh,20h,1bh,20h,1bh,20h,1bh,20h,1bh |
|  | db | 20h,1bh,20h,1bh,20h,1bh,20h,1bh,20h,1bh |
|  | db | 20h,1bh,20h,1bh,20h,1bh,20h,1bh,20h,1bh |
|  | db | 0bah,1bh,0bah,1bh,20h,1bh,20h,1bh,20h,1bh |
|  | db | 46h,1bh,32h,1bh,20h,1bh,2dh,1bh,2dh,1bh |
|  | db | 2dh,1bh,20h,1bh,52h,1bh,65h,1bh,63h,1bh |
|  | db | 6fh,1bh,72h,1bh,64h,1bh,20h,1bh,61h,1bh |
|  | db | 20h,1bh,4dh,1bh,65h,1bh,73h,1bh,73h,1bh |
|  | db | 6lh,1bh,67h,1bh,65h,1bh,20h,1bh,20h,1bh |
|  | db | 20h,1bh,20h,1bh,20h,1bh,20h,1bh,20h,1bh |
|  | db | 20h,1bh,20h,1bh,20h,1bh,0bah,1bh,0bah,1bh |
|  | db | 20h,1bh,20h,1bh,20h,1bh,46h,1bh,33h,4bh |
|  | db | 20h,1bh,2dh,1bh,2dh,1bh,2dh,1bh,20h,1bh |
|  | db | 50h,1bh,6ch,1bh,61h,1bh,79h,1bh,20h,1bh |
|  | db | 42h,1bh,61h,1bh,63h,1bh,6bh,1bh,20h,1bh |
|  | db | 61h,1bh,20h,1bh,4dh,1bh,65h,1bh,73h,1bh |
|  | db | 73h,1bh,61h,1bh,67h,1bh,65h,1bh,20h,1bh |
|  | db | 20h,1bh,20h,1bh,20h,1bh,20h,1bh,20h,1bh |
|  | db | 20h,1bh,0bah,1bh,0bah,1bh,20h,1bh,20h,1bh |
|  | db | 20h,1bh,46h,1bh,34h,1bh,20h,1bh,2dh,1bh |
|  | db | 2dh,1bh,2dh,1bh,20h,1bh,53h,1bh,65h,1bh |
|  | db | 6eh,1bh,64h,1bh,20h,1bh,61h,1bh,20h,1bh |
|  | db | S4h,1bh,6fh,1bh,6eh,1bh,65h,1bh,20h,1bh |
|  | db | 20h,1bh,20h,1bh,20h,1bh,20h,1bh,20h,1bh |
|  | db | 20h,1bh,20h,1bh,20h,1bh,20h,1bh,20h,1bh |
|  | db | 20h,1bh,20h,1bh,20h,1bh,20h,1bh,0bah,1bh |
|  | db | 0bah,1bh,20h,1bh,20h,1bh,20h,1bh,46h,1bh |
|  | db | 35h,1bh,20h,1bh,2dh,1bh,2dh,1bh,2dh,1bh |
|  | db | 20h,1bh,44h,1bh,69h,1bh,61h,1bh,6ch,1bh |
|  | db | 20h,1bh,61h,1bh,20h,1bh,4eh,1bh,75h,1bh |
|  | db | 6dh,1bh,62h,1bh,65h,1bh,72h,1bh,20h,1bh |
|  | db | 20h,1bh,20h,1bh,20h,1bh,20h,1bh,20h,1bh |
|  | db | 20h,1bh,29h,1bh,20h,1bh,20h,1bh,20h,1bh |
|  | db | 20h,1bh,20h,1bh,0bah,1bh,0bah,1bh,20h,1bh |
|  | db | 20h,1bh,20h,1bh,46h,1bh,36h,1bh,20h,1bh |
|  | db | 2dh,1bh,2dh,1bh,2dh,1bh,20h,1bh,45h,1bh |
|  | db | 78h,1bh,65h,1bh,63h,1bh,75h,1bh,74h,1bh |
|  | db | 65h,1bh,20h,1bh,43h,1bh,6ih,1bh,6ch,1bh |
|  | db | 6ch,1bh,20h,1bh,50h,1bh,72h,1bh,6fh,1bh |
|  | db | 67h,1bh,72h,1bh,65h,1bh,73h,1bh,73h,1bh |
|  | db | 20h,1bh,20h,1bh,20h,1bh,20h,1bh,20h,1bh |
|  | db | 0bah,1bh,0bah,1bh,20h,1bh,20h,1bh,20h,1bh |
|  | db | 46h,1bh,37h,1bh,20h,1bh,2dh,1bh,2dh,1bh |

-continued

```
              db    2dh,1bh,20h,1bh,45h,1bh,78h,1bh,65h,1bh
              db    63h,1bh,75h,1bh,74h,1bh,65h,1bh,20h,1bh
              db    54h,1bh,6fb,1bh,75h,1bh,63h,1bh,68h,1bh
              db    2dh,1bh,54h,1bh,6fh,1bh,6eh,1bh,65h,1bh
              db    20h,1bh,44h,1bh,65h,1bh,74h,1bh,65h,1bh
              db    63h,1bh,74h,1bh,20h,1bh,0bah,1bh,0bah,1bh
              db    20h,1bh,20h,1bh,20h,1bh,46h,1bh,38h,1bh
              db    20h,1bh,2dh,1bh,2dh,1bh,2dh,1bh,20h,1bh
              db    45h,1bh,78h,1bh,65h,1bh,63h,1bh,75h,1bh
              db    74h,1bh,65h,1bh,20h,1bh,4dh,1bh,65h,1bh
              db    73h,1bh,73h,1bh,61h,1bh,67h,1bh,65h,1bh
              db    20h,1bh,4ch,1bh,69h,1bh,73h,1bh,74h,1bh
              db    20h,1bh,20h,1bh,20h,1bh,20h,1bh,20h,1bh
              db    20h,1bh,0bah,1bh,0bah,1bh,20h,1bh,20h,1bh
              db    20h,1bh,46h,1bh,31h,1bh,30h,1bh,20h,1bh
              db    2dh,1bh,2dh,1bh,20h,1bh,45h,1bh,78h,1bh
              db    69h,1bh,74h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,0bah,1bh
              db    0c8h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0bch,1bh
start_message db    03h,17h,03h,23h
              db    0c9h,1bh,0cdh,1bh,0cdh,1bh,0cdh,1bh,0cdh,1bh
              db    0cdh,1bh,0cdh,1bh,0cdh,1bh,0cdh,1bh,oCdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0bbh,1bh
              db    0bah,1bh,20h,1bh,20h,1bh,20h,1bh,48h,1bh
              db    69h,1bh,74h,1bh,20h,1bh,61h,1bh,20h,1bh
              db    4bh,1bh,65h,1bh,79h,1bh,20h,1bh,74h,1bh
              db    6fh,1bh,20h,1bh,42h,1bh,65h,1bh,67h,1bh
              db    69h,1bh,6eh,1bh,20h,1bh,52h,1bh,65h,1bh
              db    63h,1bh,6fh,1bh,72h,1bh,64h,1bh,69h,1bh
              db    6eh,1bh,67h,1bh,20h,1bh,20h,1bh,0bah,1bh
              db    0c8h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0bch,1bh
end_message   db    03h,17h,03h,22h
              db    0C9h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0bbh,1bh,0bah,1bh
              db    20h,1bh,20h,1bh,20h,1bh,48h,1bh,69h,1bh
              db    74h,1bh,20h,1bh,61h,1bh,20h,1bh,4bh,1bh
              db    65h,1bh,79h,1bh,20h,1bh,74h,1bh,6fh,1bh
              db    20h,1bh,53h,1bh,74h,1bh,6fh,1bh,70h,1bh
              db    20h,1bh,52h,1bh,65h,1bh,63h,1bh,6fh,1bh
              db    72h,1bh,64h,1bh,69h,1bh,6eh,1bh,67h,1bh
              db    20h,1bh,20h,1bh,0bah,1bh,0c8h,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0bch,1bh
dial_menu     db    07h,07h,03h,42h
              db    0c9h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
```

-continued

```
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdb,1bh,0cdh,1bh
              db    0cdh,1bh,0cdh,1bh,0cdh,1bh,0cdh,1bh,0Cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0bbh,1bh,0bah,1bh,20h,1bh,20h,1bh,20h,1bh
              db    45h,1bh,6eh,1bh,74h,1bh,65h,1bh,72h,1bh
              db    20h,1bh,50h,1bh,68h,1bh,6fh,1bh,6eh,1bh
              db    6Sh,1bh,20h,1bh,4eh,1bh,75h,1bh,6dh,1bh
              db    62h,1bh,65h,1bh,72h,1bh,3ah,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,20h,1bh,20h,1bh,20h,1bh,20h,1bh
              db    20h,1bh,0bah,1bh,0c8h,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0bch,1bh
online_msg    db    00h,00h,01h,50h
              db    0b3h,5bh,20h,5bh,4fh,5bh,6eh,5bh,20h,5bh
              db    4ch,5bh,69h,5bh,6eh,5bh,65h,5bh,20h,5bh
              db    20h,5bh,0b3h,5bh,20h,5bh,38h,5bh,20h,5bh
              db    62h,5bh,69h,5bh,74h,5bh,73h,5bh,20h,5bh
              db    0b3h,5bh,20h,5bh,20h,5bh,20h,5bh,20h,5bh
              db    4eh,5bh,6fh,5bh,20h,5bh,50h,5bh,61h,5bh
              db    72h,5bh,69h,5bh,74h,5bh,79h,5bh,20h,5bh
              db    20h,5bh,20h,5bh,0b3h,5bh,20h,5bh,31h,5bh
              db    20h,5bh,53h,5bh,74h,5bh,6fh,5bh,70h,5bh
              db    20h,5bh,42h,5bh,69h,5bh,74h,5bh,20h,5bh
              db    0b3h,5bh,20h,5bh,31h,5bh,32h,5bh,30h,5bh
              db    30h,5bh,20h,5bh,42h,5bh,61h,5bh,75h,5bh
              db    64h,5bh,20h,5bh,4fh,5bh,72h,5bh,69h,5bh
              db    67h,5bh,69h,5bh,6eh,5bh,61h,5bh,74h,5bh
              db    65h,5bh,2oh,5bh,4dh,5bh,6fh,5bh,64h,5bh
              db    65h,5bh,20h,5bh,20h,5bh,20h,5bh,0b3h,5bh
outgoing_msg  db    07h,19h,03h,1bh
              db    0c9h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0bbh,1bh,0bah,1bh,20h,1bh,20h,1bh
              db    20h,1bh,53h,1bh,65h,1bh,6eh,1bh,64h,1bh
              db    69h,1bh,6eh,1bh,67h,1bh,20h,1bh,59h,1bh
              db    6fh,1bh,75h,1bh,72h,1bh,20h,1bh,4dh,1bh
              db    65h,1bh,73h,1bh,73h,1bh,61h,1bh,67h,1bh
              db    65h,1bh,20h,1bh,20h,1bh,0bah,1bh,0c8h,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0bch,1bh
recording_msg db    07h,19h,03h,1eh
              db    0c9h,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdhp1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0cdh,1bh
              db    0cdh,1bh,0cdh,1bh,0cdh,1bh,0cdh,1bh,0bbh,1bh
              db    0bah,1bh,20h,1bh,20h,1bh,29h,1bh,52h,1bh
              db    65h,1bh,63h,1bh,6fh,1bh,72h,1bh,64h,1bh
```

```
                db   69h,1bh,6eh,1bh,67h,1bh,20h,1bh,59h,1bh
                db   6fh,1bh,75h,1bh,72h,1bh,20h,1bh,4dh,1bh
                db   65h,1bh,73h,1bh,73h,1bh,61h,1bh,67h,1bh
                db   65h,1bh,20h,1bh,20h,1bh,20h,1bh,0bah,1bh
                db   0c8h,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0bch,1bh
callp_win       db   08h,18h,05h,21h
                db   0c9h,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bhI0cdh,1bh,0cdh,1bh,0cdh,1bh
                db   0cdh,1bh,0cdh,1bh,0bbh,1bh,0bah,1bh,20h,1bh
                db   4eh,1bh,6fh,1bh,20h,1bh,46h,1bh,69h,1bh
                db   6ch,1bh,74h,1bh,65h,1bh,72h,1bh,20h,1bh
                db   4ch,1bh,65h,1bh,76h,1bh,65h,1bh,6ch,1bh
                db   3ah,1bh,20h,1bh,20h,1bh,20h,1bh,20h,1bh
                db   20h,1bh,20h,1bh,20h,1bh,20h,1bh,20h,1bh
                db   20h,1bh,20h,1bh,20h,1bh,20h,1bh,20h,1bh
                db   0bah,1bh,0bah,1bh,20h,1bh,43h,1bh,61h,1bh
                db   6ch,1bh,6ch,1bh,20h,1bh,50h,1bh,72h,1bh
                db   6fh,1bh,67h,1bh,72h,1bh,65h,1bh,73h,1bh
                db   73h,1bh,20h,1bh,4ch,1bh,65h,1bh,76h,1bh
                db   65h,1bh,6ch,1bh,3ah,1bh,20h,1bh,20h,1bh
                db   20h,1bh,20h,1bh,20h,1bh,20h,1bh,20h,1bh
                db   20h,1bh,20h,1bh,20h,1bh,0bah,1bh,0bah,1bh
                db   20h,1bh,41h,1bh,6eh,1bh,73h,1bh,77h,1bh
                db   65h,1bh,72h,1bh,20h,1bh,54h,1bh,6fh,1bh
                db   6eh,1bh,65h,1bh,20h,1bh,4ch,1bh,65h,1bh
                db   76h,1bh,65h,1bh,6ch,1bh,3ah,1bh,20h,1bh
                db   20h,1bh,20h,1bh,20h,1bh,20h,1bh,20h,1bh
                db   20h,1bh,20h,1bh,20h,1bh,20h,1bh,20h,1bh
                db   20h,1bh,0bah,1bh,0c8h,1bh,0cdh,1bh,0cdh,1bh
                db   0cdh,1bh,0cdh;1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0bch,1bh
ttone_detect_win   db   09h,18h,05h,21h
                db   0c9h,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0bbh,1bh,0bah,1bh,20h,1bh
                db   4eh,1bh,6fh,1bh,20h,1bh,46h,1bh,69h,1bh
                db   6ch,1bh,74h,1bh,65h,1bh,72h,1bh,3ah,1bh
                db   20h,1bh,20h,1bh,20h,1bh,20h,1bh,20h,1bh
                db   20h,1bh,20h,1bh,20h,1bh,20h,1bh,20h,1bh
                db   20h,1bh,20h,1bh,20h,1bh,20h,1bh,20h,1bh
                db   20h,1bh,20h,1bh,20h,1bh,20h,1bh,20h,1bh
                db   0bah,1bh,0bah,1bh,20h,1bh,36h,1bh,39h,1bh
                db   37h,1bh,2dh,1bh,37h,1bh,37h,1bh,30h,1bh
                db   20h,1bh,48h,1bh,7ah,1bh,20h,1bh,46h,1bh
                db   69h,1bh,6ch,1bh,74h,1bh,65h,1bh,72h,1bh
                db   3ah,1bh,20h,1bh,20h,1bh,20h,1bh,20h,1bh
                db   20h,1bh,20h,1bh,20h,1bh,20h,1bh,20h,1bh
                db   20h,1bh,20h,1bh,20h,1bh,0bah,1bh,0bah,1bh
                db   20h,1bh,31h,1bh,32h,1bh,30h,1bh,39h,1bh
                db   2dh,1bh,31h,1bh,33h,1bh,33h,1bh,36h,1bh
                db   20h,1bh,48h,1bh,7ah,1bh,20h,1bh,46h,1bh
                db   69h,1bh,6ch,1bh,74h,1bh,65h,1bh,72h,1bh
                db   3ah,1bh,20h,1bh,20h,1bh,20h,1bh,20h,1bh
                db   20h,1bh,20h,1bh,20h,1bh,20h,1bh,20h,1bh
                db   20h,1bh,0bah,1bh,0c8h,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0cdh,1bh
                db   0cdh,1bh,0cdh,1bh,0cdh,1bh,0cdh,1bh,0bch,1bh
.286
```

-continued

```
.model small
;%%%%%%%%%%%%%%%%%%%%%%%%%%%%%%%%%%%%%%%%%%%
;
;       Screen driver routines
;
;       This routine writes the receive data to the screen during terminal
;       mode.
;
;%%%%%%%%%%%%%%%%%%%%%%%%%%%%%%%%%%%%%%%%%%%
        include   equates
        public    init_comm_screen,save_screen,restore_screen
        public    screen_out,print_parity
        extrn window_up:near
        extrn display_segment:word,main_flags:word
        extrn online_msg:byte
.data
        screen_buffer    dw   2000 dup(?)
        cursor           dw   ?
        buffer_pos   dw   ?
        out_char     db   ?
        parity_msg   db   '8   No'
                     db   '      '
                     db   '      '
                     db   '      '
                     db   '7 Even'
                     db   '7 Odd'
                     db   '7Space'
                     db   '7 Mark'
.code
;
;%%%%%%%%%%%%%%%%%%%%%%%%%%%%%%%%%%%%%%%%%%%
;
INIT_COMM_SCREEN    PROC NEAR
        lea       si,online_msg
        call      window_up
        call      print_parity
        mov       cursor,100h
        mov       buffer_pos,160
; position the cursor
        mov       dx,cursor
        mov       ah102
        xar       bh,bh
        int       10h
        mov       es,display_segment
        mov       di,160
        mov       cx,(23*80)
        mov       ax,0720h       ; attribute and ' '
        cmp       display_segiient,mono
        je        no_color
        mov       ax,1f20h       ; attribute and ' '
no_color:
        rep       stosw
        call      save_screen
        ret
INIT_COMM_SCREEN    ENDP
;
;%%%%%%%%%%%%%%%%%%%%%%%%%%%%%%%%%%%%%%%%%%%
;
SAVE_SCREEN PROC       NEAR
.data
        cursor_pos   dw   ?
.code
        mov       cx,2000
        lea       di,screen_buffer
        xor       si,si
        mov       ax,display_segment
        push      ds
        pap       es
        push      ds
        mov       ds,ax
        rep       movsw
        pop       ds
        mov       ah,03
        xor       bh,bh
        int       10h
        mov       cursor_pos,dx
        ret
SAVE_SCREEN ENDP
;
```

-continued

```
;%%%%%%%%%%%%%%%%%%%%%%%%%%%%%%%%%%%%%%%%%%%
;
RESTORE_SCREEN   PROC NEAR
        mov     cx,2000
        lea     si,screen_buffer
        7hov    es,display_segment
        xor     di,di
        rep     movsw
        mov     ah,02h
        xor     bh,bh
        mov     dx,cursor_pos
        int     10h
        ret
RESTORE_SCREEN   ENDP
;
;%%%%%%%%%%%%%%%%%%%%%%%%%%%%%%%%%%%%%%%%%%%
;
SCREEN_OUT    PROC NEAR
; AL has the character to print to the screen    0 to 7fh
        cmp     al,' '
        jae     out_it
        cmp     al,cr
        jne     chk_1f
; carriage return
        mov     dx,cursor
        xor     dl,dl
        mov     al,dh
        mov     cl,160
        mul     cl
        mov     buffer_os,ax
        jmp     no_wrap
chk_1f:
        cmp     al,1f
        jne     chk_bs
        mov     dx,cursor
        cmp     dh,23
        je      scroll_it
        inc     dh
        add     buffer_pos,160
        jmp     no_wrap
chk_bs:
        cmp     al,bs
        je      do_bs
        ret
do_bs:
        cmp     buffer_pos,160
        jne     no_top
        ret
no_top:
        sub     buffer_pos,2
        mov     di,buffer_pos
        mov     al,' '
        push    es
        mov     es,display_segment
        mov     es:[di],al
        pop     es
        mov     dx,cursor
        dec     dl
        jns     no_wrap
        mov     dl,79
        dec     dh
        jmp     short no_wrap
out_it:
        push    es
        mov     es,display_segment
        mov     di,buffer_pos
        stosb
        inc     di
        mov     buffer_pos,di
        pop     es
        mov     dx,cursor
        inc     dl
        cmp     dl,80
        jne     no_wrap
        inc     dh
        cmp     dh,24
        jne     no_scroll
        mov     buffer_pos,( 23 * 160 )
        mov     dx,1700h
```

-continued

```
scroll_it:
        mov     di,160
        mov     si,320
        mov     cx,22*80
        mov     ax,display_segment
        push    es
        push    ds
        UOV     ds,ax
        mov     es,ax
        rep     movsw
        pop     ds
        mov     cx,80
        mov     a1,' '
clear_line:
        stosb
        inc     di
        loop    clear_line
        pop     es
        jmp     short no_wrap
no_scroll:
        xor     d1,d1
; get new buffer position
        mov     a1,dh
        mov     c1,160
        mul     c1
        mov     buffer_pos,ax
no_wrap:
        mov     cursor,dx
        xor     bh,bh
        mov     ah,02
        int     10h
        ret
SCREEN_OUT      ENDP
;
;%%%%%%%%%%%%%%%%%%%%%%%%%%%%%%%%%%%%%%%%%%%%%%%
;
PRINT_PARITY    PROC NEAR
        mov     ax,main_flags
        mov     a1,ah
        and     ax,07h
        mov     b1,6
        imul    b1
        mov     bx,ax
        mov     es,display_segment      ; print word length
        mov     di,26
        mov     a1,parity_msg[bx]
        inc     bx
        stosb
        mov     cx,5
        mov     di,44
out_loop:
        mov     a1,parity_msg[bx]
        stosb
        inc     di
        inc     bx
        loop    out_loop
        mov     di,70
        mov     ax,5b20h
        mov     [es:di],ax
        ret
PRINT_PARITY    ENDP
        END
; general equates
; conditional assembly
        board equ       0
        modem_board     equ     35ch
        buf_len         equ     8192 * 2        ; TX and RX buffers
        rx_samples_length equ   8192 * 2        ; byte size
        mono    equ     0b000h
        color_seg equ   0b800h
        b0      equ     1
        b1      equ     2
        b2      equ     4
        b3      equ     8
        b4      equ     10h
        b5      equ     20h
        b6      equ     40h
        b7      equ     80h
        b8      equ     100h
```

-continued

```
        b9          equ     200h
        b10         equ     400h
        b11         equ     800h
        b12         equ     1000h
        b13         equ     2000h
        b14         equ     4000h
        b15         equ     8000h
        cr          equ     13
        if          equ     10
        bs          equ     8
        F1          equ     3b00h
        F2          equ     3c00h
        F3          equ     3d00h
        F4          equ     3e00h
        F5          equ     3f00h
        F6          equ     4000h
        F7          equ     4100h
        F8          equ     4200h
        F9          equ     4300h
        F10         equ     4400h
        ALT_A       equ     1e00h
        ALT_H       equ     2300h
        ALT_P       equ     1900h
        ALT_S       equ     1f00h
        UP_ARROW    equ             4800h
        DOWN_ARROW          equ     5000h
; DMA channels 5 and 6 equates
        dma_5_page          equ     8bh
        dma_6_page          equ     89h
        dma_5_address               equ     0c4h
        dma_5_count         equ     0c6h
        dma_6_address               equ     0c8h
        dma_6_count         equ     0cah
        rd_status                   equ     0d0h
        rd_temp                     equ     0dah
        vr_cmd                      equ     0d0h
        vr_req                      equ     0d2h
        wr_single_mask              equ     0d4h
        wr_mode                     equ     0d6h
        wr_clr_byte_tr              equ     0d8h
        wr_master_clr               equ     0dah
        wr_clr_mask         equ     0dch
        wr_all_mask         equ     0deh
        tone_2225           equ     15189           ; 2 * freq / 9600
        tone_2225_72s               equ     20252
        tone_1500           equ     10240
        1941        equ     6424
        1852        equ     5816
        1770        equ     5257
        1697        equ     4758
        h1663       equ     11148
        h1477       equ     10083
        h1336       equ     9120
        h1209       equ     8253
        1941_72s            equ     8565
        1852_*72s           equ     7755
        1770_72s            equ     7009
        1697_72s            equ     6344
        h1663_72s           equ     14864
        h1477_72s           equ     13444
        h1336_72s           equ     12160
        h1209_72s           equ     11004
               END OF ASSEMBLY LANGUAGE LISTING
```

What is claimed is:

1. A modem for communicating in real-time between a computer and a remote device via a communications link, the computer having a host processor and a memory, the remote device operating at a remote baud rate, the modem comprising, in combination:

a telephone interface circuit connectable to the communications link for (i) receiving from the communications link an incoming signal representative of a communication from a remote device and (ii) delivering to the communications link an outgoing signal representative of a communication from the computer;

an interpolation routine executable by the host-processor to interpolate a stream of incoming digital sample values representative of the incoming signal into a modified stream of incoming digital sample values synchronized to the remote baud rate;

a modem demodulation routine executable by the host-processor to translate the modified stream of incoming digital sample values into digital input data;

a modem modulation routine executable by the host-processor to translate digital output data into digital sample amplitude values representative of the outgoing signal; and a call-answering routine executed by the host processor when the incoming signal represents an analog voice signal from a remote caller, for transmitting an acknowledgement signal over the communications link and for recording an incoming message received over the communications link.

2. A modem as claimed in claim 1, wherein transmitting an acknowledgement signal comprises providing a set of outgoing digital sample values from a storage medium, whereby a digital-to-analog converter receives the set of outgoing digital sample values.

3. A modem as claimed in claim 1, wherein the acknowledgement signal represents a voice signal.

4. A modem as claimed in claim 1, wherein recording an incoming messages comprises storing a set of digital values representative of the analog voice signal.

5. A modem as claimed in claim 1, wherein call-answering routine is stored in the memory.

6. A system for communicating in real-time between a computer and a remote device via a communications link, the computer having a host processor and a memory, the remote device operating at a remote baud rate, the system comprising, in combination:

line interface circuitry connectable to the communications link for (i) receiving from the communications link an incoming signal representative of a communication from a remote device and (ii) delivering to the communications link an outgoing signal representative of a communication from the computer;

an interpolation routine executable by the host-processor to interpolate a stream of digital sample values representative of the incoming signal so as to compensate for baud rate variation and to thereby provide an interpolated stream of digital sample values;

a modem demodulation routine executable by the host-processor to demodulate the interpolated stream of digital sample values, and to thereby provide a stream of digital input data;

a modem modulation routine executable by the host-processor to modulate a stream of digital output data, and to thereby provide a stream of digital sample values representative of the outgoing signal; and a call-answering routine executed by the host processor when the incoming signal represents an analog voice signal from a remote caller, for transmitting an acknowledgement signal over the communications link and for recording an incoming message received over the communications link.

7. A system as claimed in claim 6, wherein recording an incoming message comprises storing a set of digital values representative of the analog voice signal.

8. A system as claimed in claim 6, wherein the call-answering routine is stored in the memory.

9. In combination with a computer of the class comprising a processor, a memory, a system bus composed of conductors interconnecting at least the processor and the memory, an auxiliary circuit for communicating between the computer and a remote device via a communications link, the remote device operating at a remote baud rate, the auxiliary circuit comprising:

interface circuitry connectable to the communications link for (i) receiving from the communications link an incoming signal representative of a communication from a remote device and (ii) delivering to the communications link an outgoing signal representative of a communication from the computer;

an interpolation routine executable by the processor to interpolate a stream of digital sample values representative of the incoming signal so as to compensate for baud rate variation and to thereby provide an interpolated stream of digital sample values;

a modem demodulation routine executable by the processor to demodulate the interpolated stream of digital sample values, and to thereby provide a stream of digital input data;

a modem modulation routine executable by the processor to modulate a stream of digital output data, and to thereby provide a stream of digital sample values representative of the outgoing signal; and a call-answering routine executed by the processor when the incoming signal represents an analog voice signal from a remote caller, for transmitting an acknowledgement signal over the communications link and for recording an incoming message received over the communications link.

10. An auxiliary circuit as claimed in claim 9, wherein recording an incoming message comprises storing a set of digital values representative of the analog voice signal.

11. An auxiliary circuit as claimed in claim 9, wherein call-answering routine is stored in the memory.

* * * * *